(12) United States Patent
Friedman et al.

(10) Patent No.: US 9,538,325 B2
(45) Date of Patent: Jan. 3, 2017

(54) ROTATION BASED ALIGNMENT OF A GROUP OF WIRELESS TAGS

(71) Applicant: Pixie Technology Inc., Los Altos, CA (US)

(72) Inventors: Ofer Friedman, Ganei-Tikva (IL); Noam Lavi, Yokneam (IL)

(73) Assignee: PIXIE TECHNOLOGY INC., Los Altos, CA (US)

( * ) Notice: Subject to any disclaimer, the term of this patent is extended or adjusted under 35 U.S.C. 154(b) by 0 days.

(21) Appl. No.: 14/805,572

(22) Filed: Jul. 22, 2015

(65) Prior Publication Data

US 2015/0362581 A1    Dec. 17, 2015

Related U.S. Application Data

(63) Continuation-in-part of application No. 14/085,844, filed on Nov. 21, 2013.

(60) Provisional application No. 61/729,601, filed on Nov. 25, 2012, provisional application No. 61/803,534, filed on Mar. 20, 2013, provisional application No. 61/832,872, filed on Jun. 9, 2013, provisional application No. 61/868,591, filed on Aug. 22, 2013,
(Continued)

(51) Int. Cl.
| | |
|---|---|
| H04W 4/02 | (2009.01) |
| G01S 5/02 | (2010.01) |
| G01S 13/76 | (2006.01) |
| H04W 4/00 | (2009.01) |
| G01S 5/12 | (2006.01) |
| G06K 7/00 | (2006.01) |
| G06K 7/10 | (2006.01) |
| H04W 4/04 | (2009.01) |

(52) U.S. Cl.
CPC .............. *H04W 4/02* (2013.01); *G01S 5/0289* (2013.01); *G01S 13/767* (2013.01); *H04W 4/008* (2013.01); *H04W 4/023* (2013.01); *G01S 5/12* (2013.01); *G06K 7/0008* (2013.01); *G06K 7/10297* (2013.01); *G06K 7/10366* (2013.01); *H04W 4/04* (2013.01)

(58) Field of Classification Search
CPC ............ G06K 7/10366; G06K 7/10009; G06K 7/10316; G06K 19/0723; G06K 7/10356; G06K 7/10128
USPC ....................................................... 340/10.1
See application file for complete search history.

(56) References Cited

U.S. PATENT DOCUMENTS

| | | |
|---|---|---|
| 5,960,047 A | 9/1999 | Proctor, Jr. |
| 6,771,972 B2 | 8/2004 | McDonnell et al. |
| 7,274,295 B2 | 9/2007 | Koch |

(Continued)

*Primary Examiner* — Mark Blouin
(74) *Attorney, Agent, or Firm* — Reches Patents

(57) ABSTRACT

A method for determining a location of a wireless tag, the method may include generating or receiving, by a tagged mobile device, an estimated location of another tag that communicates with the tagged mobile device; receiving or generating, by the tagged mobile device, multiple distance measurements that are obtained during different points of time; wherein the multiple distance measurements are obtained during a rotational movement of the tagged mobile device and represent distances between the tagged mobile device and the other tag; finding a certain angle of rotation of the mobile device that corresponds to a minimal distance measurement of the multiple distance measurements; and amending the estimated location of the other tag based upon the certain angle of rotation.

22 Claims, 64 Drawing Sheets

Related U.S. Application Data provisional application No. 62/029,598, filed on Jul. 28, 2014.

(56) References Cited

U.S. PATENT DOCUMENTS

| | | | |
|---|---|---|---|
| 7,843,344 B2* | 11/2010 | Feltz | G06K 1/121 |
| | | | 235/432 |
| 8,077,041 B2 | 12/2011 | Stern | |
| 8,258,953 B2 | 9/2012 | Stern | |
| 8,452,868 B2 | 5/2013 | Shafer et al. | |
| 8,519,848 B2 | 8/2013 | Stern | |
| 8,521,620 B2 | 8/2013 | Livingston | |
| 8,624,725 B1 | 1/2014 | MacGregor | |
| 8,672,222 B2* | 3/2014 | Forster | G06K 7/0008 |
| | | | 235/375 |
| 8,823,521 B2 | 9/2014 | Overhultz et al. | |
| 8,928,460 B2 | 1/2015 | Thomas | |
| 9,041,517 B2* | 5/2015 | Tietke | G06K 7/0008 |
| | | | 340/10.5 |
| 9,076,119 B2 | 7/2015 | Jain et al. | |
| 2003/0013146 A1 | 1/2003 | Werb | |
| 2005/0200487 A1 | 9/2005 | O'Donnell | |
| 2006/0033609 A1 | 2/2006 | Bridgelall | |
| 2006/0145815 A1 | 7/2006 | Lanzieri et al. | |
| 2007/0040687 A1 | 2/2007 | Reynolds | |
| 2007/0096909 A1 | 5/2007 | Lally | |
| 2007/0111737 A1 | 5/2007 | Swope et al. | |
| 2007/0262849 A1 | 11/2007 | Ismail | |
| 2008/0012688 A1 | 1/2008 | Ha | |
| 2008/0024365 A1 | 1/2008 | Holmes | |
| 2008/0100423 A1 | 5/2008 | Geissler et al. | |
| 2008/0291090 A1 | 11/2008 | Vandenameele | |
| 2008/0315772 A1* | 12/2008 | Knibbe | G01S 13/825 |
| | | | 315/149 |
| 2008/0315999 A1 | 12/2008 | Braiman | |
| 2009/0212921 A1 | 8/2009 | Wild et al. | |
| 2009/0285124 A1 | 11/2009 | Aguirre et al. | |
| 2009/0326685 A1* | 12/2009 | Meixner | G05B 19/042 |
| | | | 700/83 |
| 2010/0045436 A1 | 2/2010 | Rinkes | |
| 2010/0060452 A1 | 3/2010 | Schuster et al. | |
| 2010/0253481 A1 | 10/2010 | Zand | |
| 2010/0289623 A1 | 11/2010 | Roesner | |
| 2011/0050421 A1 | 3/2011 | Duron et al. | |
| 2011/0074552 A1 | 3/2011 | Norair et al. | |
| 2011/0316676 A1 | 12/2011 | Bajic | |
| 2012/0235812 A1 | 9/2012 | Maia et al. | |
| 2012/0307875 A1 | 12/2012 | Maguire | |
| 2015/0042455 A1* | 2/2015 | Mandava | G08B 21/24 |
| | | | 340/10.1 |

\* cited by examiner

180

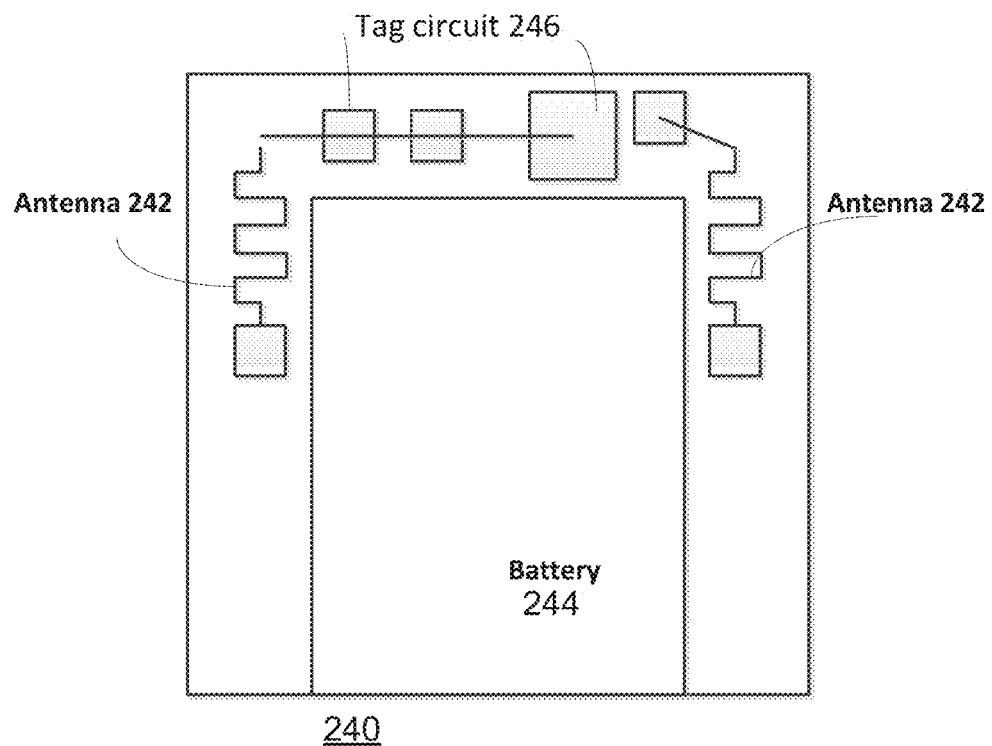
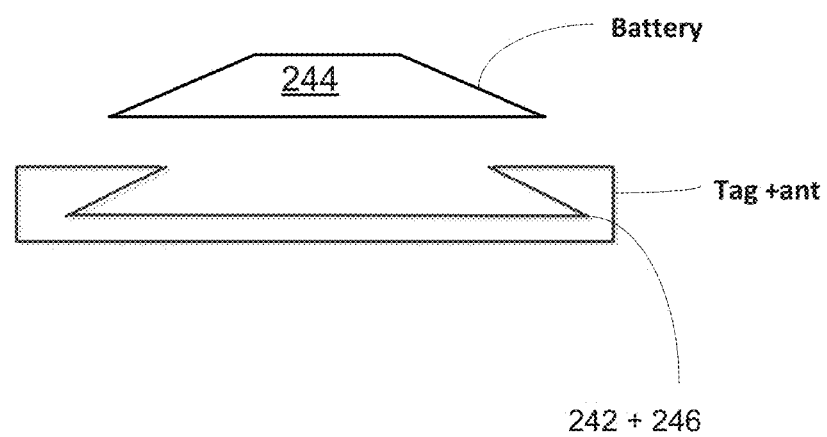
FIG. 24

Participating in multiple sphere check cycles; and operating at an energy saving mode between the multiple sphere check cycles. 452

Searching, by the wireless tag and during a time window, for a preceding wireless tag token from a preceding wireless tag. 453

Transmitting, by the wireless tag, a lack of reception indication indicative of a failure to receive the preceding wireless tag token during the time window. 454

Transmitting a wireless tag token by the wireless tag and to a next wireless tag. 455

Transmitting by the wireless tag an acknowledgement message in response to each reception (or multiple receptions) of the preceding wireless tag token. 456

Generating, by multiple wireless tags, distance information about distances between the multiple wireless tags, the multiple wireless tags are positioned within the indoor space by applying a first type of distance estimation process that may include wirelessly transmitting messages between the multiple wireless tags. 478

Transmitting by the multiple wireless tags ranging beacons, wherein wireless tags ranging bacons transmitted by a wireless tag comprise a unique identifier of the wireless tag. 479

ROTATION BASED ALIGNMENT OF A GROUP OF WIRELESS TAGS

RELATED APPLICATIONS

This application is a continuation in part of U.S. patent application Ser. No. 14/085,844 filing date Nov. 21, 2013 which claims priority U.S. provisional patent Ser. No. 61/729,601 filing date Nov. 25, 2012, U.S. provisional patent Ser. No. 61/803,534 filing date Mar. 20, 2013, U.S. provisional patent Ser. No. 61/832,872 filing date Jun. 9, 2013, and U.S. provisional patent Ser. No. 61/868,591 filing date Aug. 22, 2013, all being incorporated herein by reference in their entirety.

This application also claims priority from U.S. provisional patent 62/029,598 filed Jul. 28, 2014, which is incorporated herein by reference in its entirety.

FIELD OF THE INVENTION

The invention relates to wireless communication.

BACKGROUND OF THE INVENTION

There is a growing need to track users, user devices, monitor items and find locations within indoor spaces in an efficient manner.

SUMMARY OF THE INVENTION

According to various embodiments of the invention there are provided various methods, systems, wireless tags, wireless readers, and non-transitory computerized media.

According to an embodiment of the invention there may be provided a method for determining a location of a wireless tag, the method may include generating or receiving, by a tagged mobile device, an estimated location of another tag that communicates with the tagged mobile device; receiving or generating, by the tagged mobile device, multiple distance measurements that are obtained during different points of time; wherein the multiple distance measurements are obtained during a rotational movement of the tagged mobile device and represent distances between the tagged mobile device and the other tag; finding a certain angle of rotation of the mobile device that corresponds to a minimal distance measurement of the multiple distance measurements; and amending the estimated location of the other tag based upon the certain angle of rotation. The tagged mobile device is a mobile device such as a mobile phone that either comprises a wireless stag or is connected to a wireless tag.

The amending of the estimated location may include aligning between a tagged mobile device axis system and between an estimated location axis system.

The amending of the estimated location may include changing an estimated spatial relationship between estimated locations of two or more tags. This change is made in addition to the alignment. Assuming, that alignment is achieved then the change may include moving the estimate location of one tag in relation to the estimated location of the other tag.

The method may include monitoring by a location and orientation sensor of the tagged mobile device, the rotational movement.

The method may include inducing, by the tagged mobile device, a user to perform the rotational movement.

The method may include displaying, by the tagged mobile device, an indication of the amended estimation location of the other wireless tag.

According to an embodiment of the invention there may be provided a method for determining a location of a wireless tag, the method may include generating or receiving, by a tagged mobile device, estimated locations of a plurality of other tags that communicate with the tagged mobile device; receiving or generating, by the tagged mobile device, multiple distance measurements that are obtained during different points of time; wherein the multiple distance measurements are obtained during a rotational movement of the tagged mobile device; wherein the multiple distance measurements comprise a first set of distance measurements that represent distances between the tagged mobile device and a first tag of the plurality of other tags; finding, a first angle of rotation of the mobile device that corresponds to a minimal distance measurement of the first set of multiple distance measurements; and amending the estimated location of the plurality of other tags based upon the first angle of rotation.

The multiple distance measurements comprise a second set of distance measurements that represent distances between the tagged mobile device and a second tag of the plurality of other tags.

The method may include finding, a second angle of rotation of the mobile device that corresponds to a minimal distance measurement of the second set of multiple distance measurements; and wherein the amending of the estimated location of the plurality of other tags is also based upon the second angle of rotation.

The method may include monitoring a change in distance measurements of the second set of distance measurements; and wherein the amending of the estimated location of the plurality of other tags is also based upon the change in the distance measurements of the second set of distance measurements.

The rotational movement may not include aligning the tagged mobile device with the second tag.

The monitoring of the change in distance measurements of the second set of distance measurements may include comparing a distance measurement obtained at the first angle of rotation to another distance measurement.

The amending of the estimated location may include changing an estimated spatial relationship between estimated locations of the first tag and the second tag.

The amending may be responsive to a confidence level of the estimated locations of the first and second tags and with a confidence level of the first and second sets of distance measurements.

The method may include calculating the confidence level of the first and second sets of distance measurements in response to signal to noise ratio of the first and second sets of distance measurements.

The method may include calculating the confidence level of the first and second sets of distance measurements in response to a smoothness of the first and second sets of distance measurements.

The method may include calculating confidence level of a subset of the first set of distance measurements and a subset of the second set of distance measurements, wherein each subset may include a minimal distance measurement.

The method may include receiving at least one of the confidence level of the first and second sets of distance measurements in response to signal to noise ratio of the first and second sets of distance measurements. A user of the tagged mobile device may provide feedback about the estimated location.

The amending of the estimated location may include aligning between a tagged mobile device axis system and between an estimated location axis system.

The method may include monitoring by a location and orientation sensor of the tagged mobile device, the rotational movement.

The method may include displaying, by the tagged mobile device, an indication of amended estimated locations of the first tag and the second tag.

According to an embodiment of the invention there may be provided a non-transitory computer readable medium may store instructions that when executed by a computer cause the computer to execute the stages of generating or receiving, by a tagged mobile device, an estimated location of another tag that communicates with the tagged mobile device; receiving or generating, by the tagged mobile device, multiple distance measurements that are obtained during different points of time; wherein the multiple distance measurements are obtained during a rotational movement of the tagged mobile device and represent distances between the tagged mobile device and the other tag; finding a certain angle of rotation of the mobile device that corresponds to a minimal distance measurement of the multiple distance measurements; and amending the estimated location of the other tag based upon the certain angle of rotation.

According to an embodiment of the invention there may be provided a tagged mobile device that may include a wireless tag, a processor, and a display; wherein the tagged mobile device is configured to generate or receive, (a) an estimated location of another tag that communicates with the tagged mobile device, and (b) multiple distance measurements that are obtained during different points of time; wherein the multiple distance measurements are obtained during a rotational movement of the tagged mobile device and represent distances between the tagged mobile device and the other tag; wherein the processor is configured to find a certain angle of rotation of the mobile device that corresponds to a minimal distance measurement of the multiple distance measurements and to amend the estimated location of the other tag based upon the certain angle of rotation to provide an amended estimated location; wherein the display may be responsive to display an indication of the amended estimation location of the other wireless tag.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which:

FIGS. 23-25 illustrate a wireless tag according to various embodiments of the invention;

FIGS. 42-50 illustrate methods according to various embodiments of the invention;

DETAILED DESCRIPTION OF THE DRAWINGS

Figure 1:
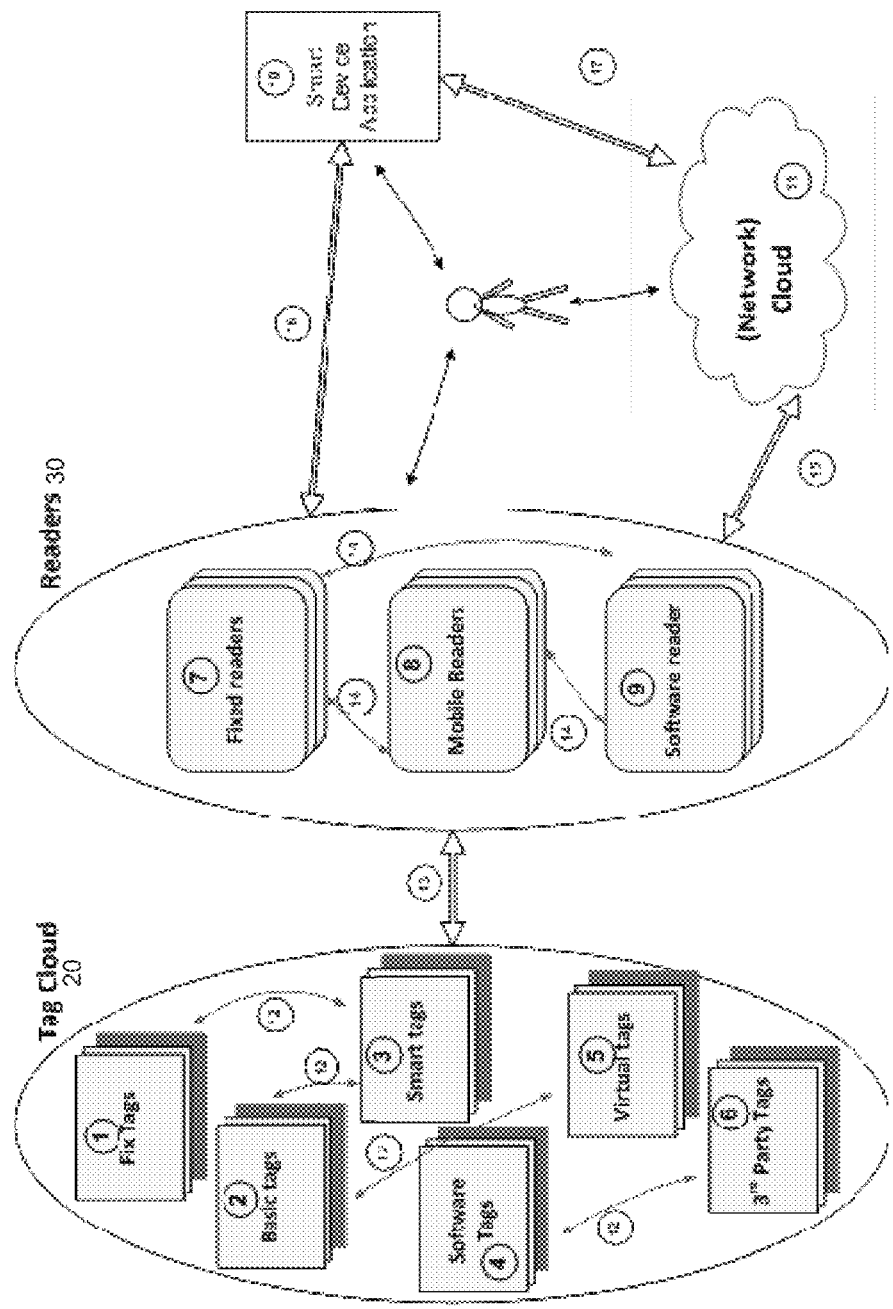
FIG. 1 illustrates wireless tags, wireless readers and their environment according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system, device, apparatus, wireless tag, or wireless reader capable of executing the method and should be applied mutatis mutandis to a non-transitory computer readable medium that stores instructions that once executed by a computer result in the execution of the method.

Any reference in the specification to a system, device, apparatus, wireless tag, or wireless reader should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to system, device, apparatus, wireless tag, or wireless reader capable of executing the instructions stored in the non-transitory computer readable medium and should be applied mutatis mutandis to method that may be executed by a computer that reads the instructions stored in the non-transitory computer readable medium.

Any combination of any methods disclosed in any of the figures (or anywhere in the specification including the summary) may be provided. Any combination of any stages of such methods may be provided.

A system, device, apparatus, wireless tag, or wireless reader capable of performing any method, any combination of any methods disclosed in any of the figures (or anywhere in the specification) or any stages of such methods may be provided.

A non-transitory computer readable medium that stores instructions that once executed cause a computer to execute any method, any combination of methods disclosed in any of the figures (or anywhere in the specification) or any stages of such methods may be provided.

The terms "computer", "processor", "controller" are used in an interchangeable manner.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "processing", "calculating", "computing", "determining", "generating", "setting", "configuring", "selecting", "defining", or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

The terms "tag" and "wireless tag" are used in an interchangeable manner. A tag is a device that includes a wireless transceiver. A tag can include a processor for calculating distances between the tag to other radiating elements (for example—other radiating elements). Alternatively—the tag does not preform distance calculations.

A sphere of wireless tags means a group of wireless tags. It does need to follow a specific shape or arrangement.

The terms "reader" and "wireless reader" are used in an interchangeable manner. A reader is a device that can manipulate (control, program) a wireless tag. A reader can include a transceiver, can perform distance calculations and the like.

The term BLE stands for Bluetooth Low Energy and includes any BLE standard that was in act during November 2013 or any other date.

The "term BLE+" stands for a communication protocol that is capable of supporting one or more of the features illustrated in the specification. For example, it can be a BLE protocol that supports the establishment and maintenance of a sphere.

General System Structure—Reader and Tags' Types

FIG. 1 illustrates a tag cloud 20, readers 30, a smart device application 10 and a cloud computational device (cloud) 11 according to an embodiment of the invention.

Tag cloud 20 can include tags such as fixed tag 1, basic tag 2, smart tag 3, software tag 4, virtual tag 5, and third party tag 6.

Readers can include fixed readers 7, mobile readers 8 and software readers 9.

A Tag cloud 20 is collection of one or several tags of the same type or several tags of different types (system supports several types of tags) that can be manipulated by a reader. Tag is a wireless device or entity that may:
 a. Communicate with a reader, several readers and/or other tags
 b. Indicate an ID, logical information (name. description, etc.), existence and location guidance signal, power level and other value-add information (such as tag sensor information, relaying other tag's data etc.)
 c. May have a privacy assurance method
 d. May have one of several different form factors or other characteristics depending on the Tag Type. Different tags types may exist and function within the same "tag cloud"
 e. Be operated by battery or other power source (direct power or other power harvesting methods)
 f. Be connected to Personal Gear e.g. by glue or other means or be built/embedded into personal gear.
 g. Be in one of several states/modes: un-Initiation ("in-storage"), Sleep, listen, update ID, etc.

Tag Types
(1) Fixed Tag
a. Stationary tag that may enable the system to establish its location with certainty
(2) Basic Tag
 a. Small in size
 b. Physically attached to items
 c. Has an independent power sub system (local energy source or by harvesting)
 d. Communicates existence & signaling supporting location estimation
(3) Smart-Tag
 a. A basic or fixed tag that may additionally provide extended functionality to the system including:
 b. Absolute position using positioning system
 c. Reading from various sensors. Examples: Temperature, pressure, acceleration etc.
 d. State machine that triggers specific events or actions (4) "Software" Tag
a. Basic smart or fixed tag that leverages an existing hardware element and enables communication with the system through software configuration of that hardware (5) Virtual Tag
a. A software tag that is attached to a virtual element such as E-mail message, a doc file etc.

(6) 3$^{rd}$ Party Tag
a. A tag or anything else that is readable by a reader of any kind that exist independently or a-priori of the proposed system
b. E.g. RFid tags or readers of any kind
c. Bluetooth or Bluetooth-Low-Energy (BLE) devices
d. Zigbee devices
e. TV towers
f. Cell towers
g. Wifi enables instruments Readers (or readers cloud) 30 is a collection of one or more Readers that can manipulate tags, communicate with each other, with a smart device or with the network cloud system supports few types of Readers.

Reader is a wireless device that may
a. communicate with tags or other readers
b. communicates with the smart device application
c. Communicates with the network cloud
d. Provides indications and get information and configuration/control from a user, through a GUI or other UI
e. Validates the existence of tags within a certain area
f. Estimates the position, range direction and orientation of tags relative to the reader
g. Gets information from tags (e.g. tag sensor information)
h. Estimates its own position (indoor or outdoor) and orientation, and other value add information required by an application (acceleration, etc.)

A reader can in some situations act as a tag

There are several Reader Types

The reader can be embedded as hardware and/or software module inside a smart device Reader Types (7) Fixed Reader
Stationary reader that could be connected to as power source or have its own. This reader is used to extend the range of the system or to communicate with tags while the mobile readers are not in range.

(8) Mobile Reader
This is a reader that a user can carry around. It is usually connected to the smart device application (9) Software Reader
Mobile or fixed reader that leverages existing hardware and enables communication with the system through Software configuration The smart device application 10 may act as a GUI, control, location estimation and processing unit for the system. The application uses existing hardware and software of the smart device (such as its screen, input method, GPS facility, Location Based Services (LBS), communication facility, sensor data etc.). Examples for a smart device include a Smartphone, a Tablet, a Notebook, a PC, a Smart TV, a Smart Car, a server farm on the internet, a cloud based service app etc.

The application performs few tasks. Among those could be:
a. Configuration and association of tags
b. Estimation and display of tags' position, range, direction
c. Storing historical log of tag position, existence
d. Communication with the reader
e. Communication with the network cloud
f. Management of the user's personal gear
g. Management of sphere mode
h. Providing user interface
i. Providing an absolute location (by using GNSS and also other methods used for indoor/LBS)
j. Storing and implementing policies for tagged items handling
k. Connecting the item location based system to various application The network cloud 11 can provide storage, processing, analytics and other functionality provides value added services such as:

Backup for system data

Synchronization and sharing of information between readers

Synchronization between different smart devices applications

Interfacing the system with cloud based applications

Crowd mapping of tagged items

Issuing a broad "amber alert" for lost items

System Interconnections

Tag-Tag connection 12. Any tag can connect to another tag, regardless of their type. A few connection examples are shown in the diagram for the sake of simplicity. The connection is a two way wireless connection that may
a. Share data between tags, as example—get ID, get sensor data etc.
b. configure a tag—e.g. download hash tables etc. into the tag
c. Support TOF measurements
d. Support RSSI measurements The connection could be set in advance by the reader communicating with the two tags or be established directly between the tags.

Frequency bands that can be used
a. 13.56 MHz ISM band
b. VHF bands
c. UHF bands
d. 2.4 Ghz ISM band
e. 5-6 GHz ISM and UNII bands
f. UWB bands (3.1-5 GHz, 6-10 GHz)
g. 60 GHz ISM band
h. Ultrasound

(13) Readers(s)—Tag(s) Connection.
The tag reader connection is a two way wireless connection that
a. establishes communication w the tag
b. establishes association w the tag
c. maintains communication w the tag
d. Gets response and data from tag, as example—get ID, get sensor data etc.
e. sets data on the tag—logical name, status and more
f. provides assistance information to tags to support tag-tag connection
g. configures a tag—e.g. download hash tables etc. into the tag
h. Transfers data that enables measuring the range and direction between reader and tag
i. Ensures the privacy of the user
j. Supports
  i. TOF measurements
  ii. RSSI measurements
  iii. Phase/AOA measurement
  iv. Directive antenna measurements/maximization k. Multiple Frequency bands can be used including
   i. 13.56 MHz ISM band
   ii. VHF bands
   iii. UHF bands
   iv. 2.4 Ghz ISM band
   v. 5-6 GHz ISM and UNII bands
   vi. UWB bands (3.1-5 GHz, 6-10 GHz)
   vii. 60 GHz ISM band
   viii. Ultrasonic FIG. 1 also illustrates various communication links/connections such as communication links 12, 13, 14, 15 and 16.

Reader-Reader connection 12. Any reader can connect to any other reader, regardless of their types. The connection is a two way wireless connection that may
   a. Share data between readers, as example—Tag addresses and status (existence, location) etc.
   b. configure a reader—e.g. download hash tables etc. into the tag
   c. Use a remote reader as a range extender
   d. Support TOF measurements
   e. Support RSSI measurements
   f. Support Phase measurement
   g. Support Directive antenna measurements/maximization
   h. Frequency bands that can be used
      i. 13.56 MHz ISM band
      ii. VHF bands
      iii. UHF bands
      iv. 2.4 Ghz ISM band
      v. 5-6 GHz ISM and UNII bands
      vi. UWB bands (3.1-5 GHz, 6-10 GHz)
      vii. 60 GHz ISM band
      viii. Ultrasound Readers(s)—Network Cloud Connection 15.

This could be a wireless connection (e.g. through Bluetooth or WLAN connecting to the internet) or a wired connection (e.g. using a USB cable connecting to a device that is connected to the cloud). This connection is used to:
   a. Transfer data from the reader to the cloud
   b. Transfer data from the cloud to the reader
   c. Synchronize data on various readers through the cloud
   d. Control the reader from the cloud
   e. Backup and restore a reader Readers(s)—Smart device/smart device application connection 13. This could be a wireless connection (e.g. through Bluetooth or WLAN) or a wired connection (e.g. using a USB cable).

This connection is used to:
   a. Transfer data collected by the reader(s) to the application or a smart device,
   b. Transfer data from the application to the readers
   c. Control and configure the reader from the application
   d. Get status reports and indications/triggers from the reader
   e. Control and configure the application from the reader The connection can be internal inside the smartphone device—as the reader can be implemented as internal hardware and/or software inside the smart device.

Smart Device Application—Network Cloud Connection 17.

This could be a wireless connection (e.g. through Bluetooth or WLAN connecting to the internet) or a wired connection (e.g. using a USB cable connecting to a device that is connected to the cloud).

This connection is used to:
   a. Transfer data from the application to the cloud
   b. Transfer data from the cloud to the application
   c. Synchronize data for different instances of the application through the cloud
   d. Control the application from the cloud
   e. Backup and restore the relevant smart phone application data As shown in the diagram, the user can interact and control the system either from the smart device, smart device application, the reader(s) or from the network cloud.

Personal Gear Assistance (PGA) System Overview

Personal Gear Assistance (PGA) system provides the user with services like tracking, monitoring and keeping as well as finding or give location for real or virtual previously tagged items (tagged by Wireless tag). The system is designed to enable very low average power consumption of tags resulting in low size and cost as well as long lifetime of the tags. This is done by working in a very low duty-cycle in addition to the reader taking most of the power consumption penalty in any action, optimizing the tag power consumption. Those concepts are described in section (4). A very high level description of the system is illustrated in the Figure below. As can be seen, there are four elements surrounding the user:
   a. Tags (any one or combination of tags 1-6), which are part or a subset of a tag cloud 20 of FIG. 1.
   b. Reader or readers (any one of a combination of readers 7-9) which are part of a reader cloud 30.
   c. Smart Device or Smart device application 10.
   d. The network cloud 11.

System Interconnections

As illustrated from the diagram the system has the following interconnections:
   a. Readers(s)—Tag(s) 13 connection
   b. Readers(s)—Smart device/smart device application connection 14
   c. Readers(s)—Network Cloud connection 15.

Smart Device Application—Network Cloud 17.

The user can interact and control the system either from the smart device application, the reader(s) or from the network cloud High Level Functional Description Un-installed tags—before installation the tag, depending on type, could be connected or disconnected from a power source.

Tags may be associated with the system before being used. This is done through the association process. A tag could come from factory with a pre-defined address or with a generic initial address. Following the association process:
   a. The tag gets a few unique IDs (e.g. system, kit personal etc.) which are set by the reader. The reader can later share or change this information
   b. The user, using the application associates a logical "name" to the tag. This could be a text string, a picture etc. or a combination of the above. The applications "name" corresponds to the Tag ID stored in the reader using an index which is known for both the application and the reader
   c. The reader acquires information on the Tag's slow clock and fast clock offsets compared to its own slow clock and fast clock. This information can be shared with the tag
   d. The Tag gets into Standby state There could be tags that are "public" or un-associated which means any reader can interact with these tags After association, by default all tags are in standby state. In this state the tag wakes up periodically and looks for a "wake up" indication from the reader that is addressed it (using one of the IDs that are stored in the tag). If there is no such indication, the tag gets back to sleep until the next wake up period. The period could change based on internal or external information (e.g.—time since last connection made, absolute time of day, etc.). If a wake up indication is identified the tag moves to "awake" state While in "awake" state the tag acquires the reader's system clock and communication windows period. The tag still wakes up periodically waiting for a command from the reader which is addressed to it. The period could be (although not necessarily) shorter than that of standby state. In this state the reader and tag are synchronized in time, so the reader knows with relative good accuracy when does the tag wake up. Several tags could be in that state together.

While in awake state, the reader can perform few actions:
a. Configure the tag and transfer information (e.g. change IDs, tables etc.)
b. Read information from the tag
c. Move the tag(s) to a different system state Connection states. There are 2 basic connection states containing reader and tag(s): Sphere connection and ranging connection Sphere connection: In the state the reader wakes up a subset of tags (one or more) and while in "listen" mode configures a "star networks" (a Sphere) with the set of tags. The reader then starts a beacon search—periodically sending either a beacon for all tags or individual queries per each tag. Upon reception of the beacon each of the tags sends an acknowledge indication back to the reader. The acknowledge indication can include more information. The reader's beacon can also include information to the tags. If a connection to one of the tags participating in the Sphere is lost for more than few periods the tag is considered "absent" from the sphere. The sphere connection ends upon a command sent from the reader to the participating tags Ranging connection—In this state the reader wakes up a subset of tags (one or more). While in awake mode it sends a timed indication to the tag on a range measurement, following by a ranging signal (this way the ranging measurement is done in a relatively well defined timing hence simplifying the ranging measurement process). This signal is used for a two way time of arrival (TOA) measurement. This measurement could be unidirectional (reader->tag->reader) or bidirectional (reader->tag->reader followed by tag->reader->tag). In addition to the TOA measurement the reader may collect other information such RSSI information from each of its antennas and signal phase information (if multiple antennas are used) of the received tag signals. After the measurement is completed the connection gets into sleep period until the next slot. This process could be done with several tags, either in a round robin fashion (reader send individual ranging signal to each tag) or through timed (sequenced) process—one ranging signal from reader, tags respond one after the other User/Application System states. There are 3 basic system states: sphere, find and background scan.

Sphere: This user driven or event driven mode is using Sphere connection. In this mode the user selects a kit of elements, for example by selecting a pre-defined kit of elements; or by selecting a few elements out of a longer list of elements; or by selecting a group of elements that are present at a given time and acquiring them instantly as a kit, or by another method that specifies the elements that he/she would like to monitor. The selection can be predefined, all the tags that are currently in range or combination with user specification. The system creates an ad-hoc sphere connection between the reader and the selected tags. More tags can be added by the user also after the sphere was created. If a connection to a certain tag is lost (for example when there is no response or the range too far to be read), the system generates an indication in the reader and smart device, and logs the event. The log could take place in the reader, smart device or cloud.

Find: This user or event driven mode. IN case of user driven, the user selects an item he/she would like to find. The system will indicate the last location information it has on the item. It will then enter a ranging connection with the selected tag. Based on the ranging measurements, RSSI, angle of arrival (AOA) estimations and the user recorded movement path (by indoor location and navigation abilities, using sensors like gyro-meters, accelerometers, compass, beacons and etc.) the system will create a 3D model of the user (reader, smart-device, tags) movements and the estimated tag location relative to the user. This will be done by finding the crossing points of the estimated ranging spheres along with the RSSI/AOA information. The system will then provide the user with the estimated range and direction of the tag relative to user Background scan: This is scheduled or event driven mode. Periodically, based on previous setting, or based on location (using GPS in the reader/smart device) or based on proximity to a pre-defined tag with known location or other method (example—connection to a certain WLAN AP, connection to a certain Bluetooth device etc.), the system will enter background scan mode. It will get into ranging connection with a predefined subset of tags ("participating tags" could vary from 1 to any of all associated tags) and perform ranging measurements. It will track the reader movements as described in "find mode" while the starting or reference point is a tag with known location or a last GPS reading or a tag known to the user or any other instrument with position known to the user (could be WLAN AP, a TV etc.). The measurements will continue for a predefined amount of time or until the reader movements create enough uncorrelated measurements enabling triangulation of participating tags. The system will then record the location of all participating tags and go back to sleep.

System States and Protocols

This section describes the wireless tag system flow, highlighting the different states and the different options and paths to move between those states.

Figure 2:
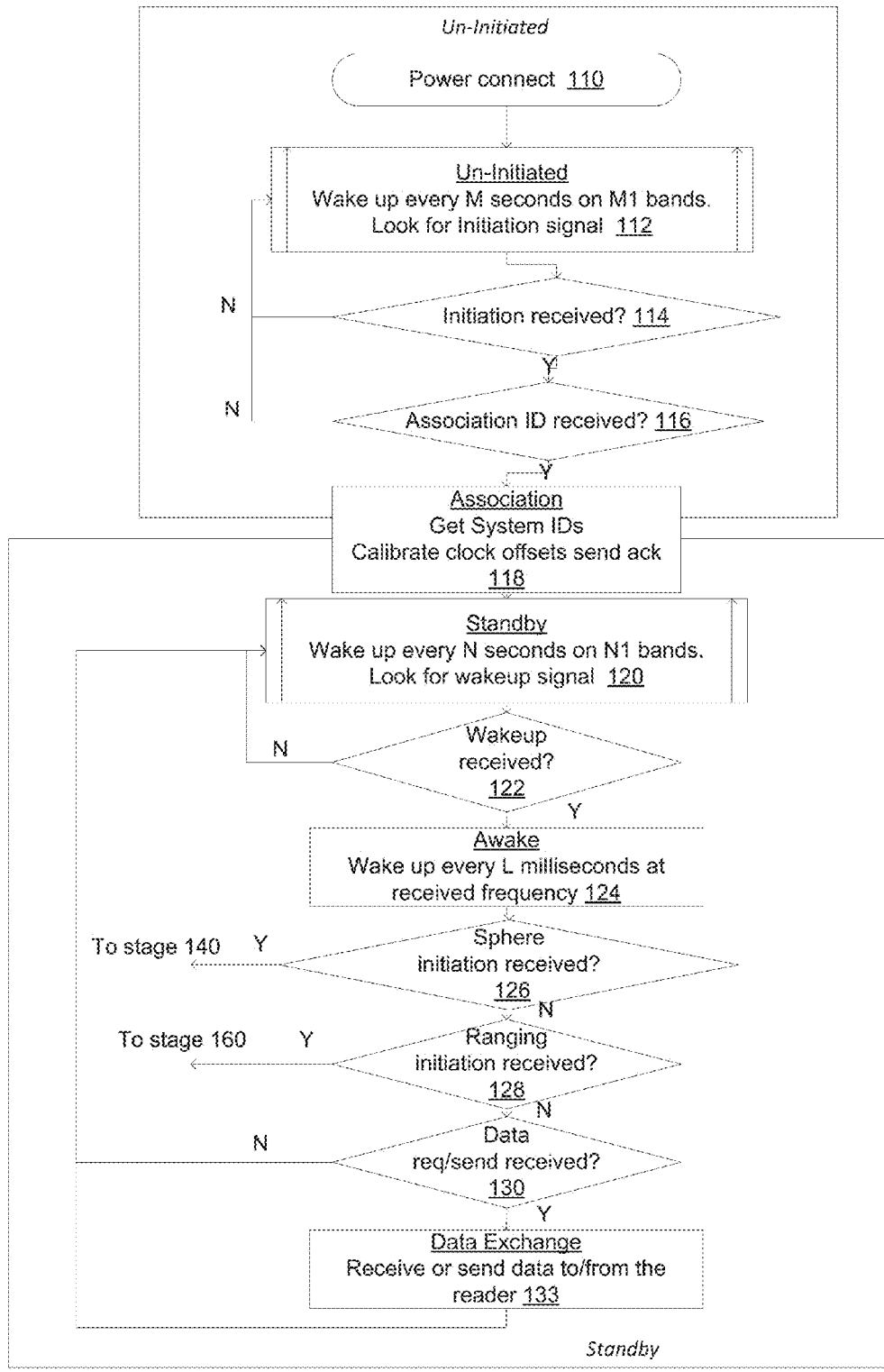
FIGS. 2-4 illustrate a method according to an embodiment of the invention.
Figure 3:
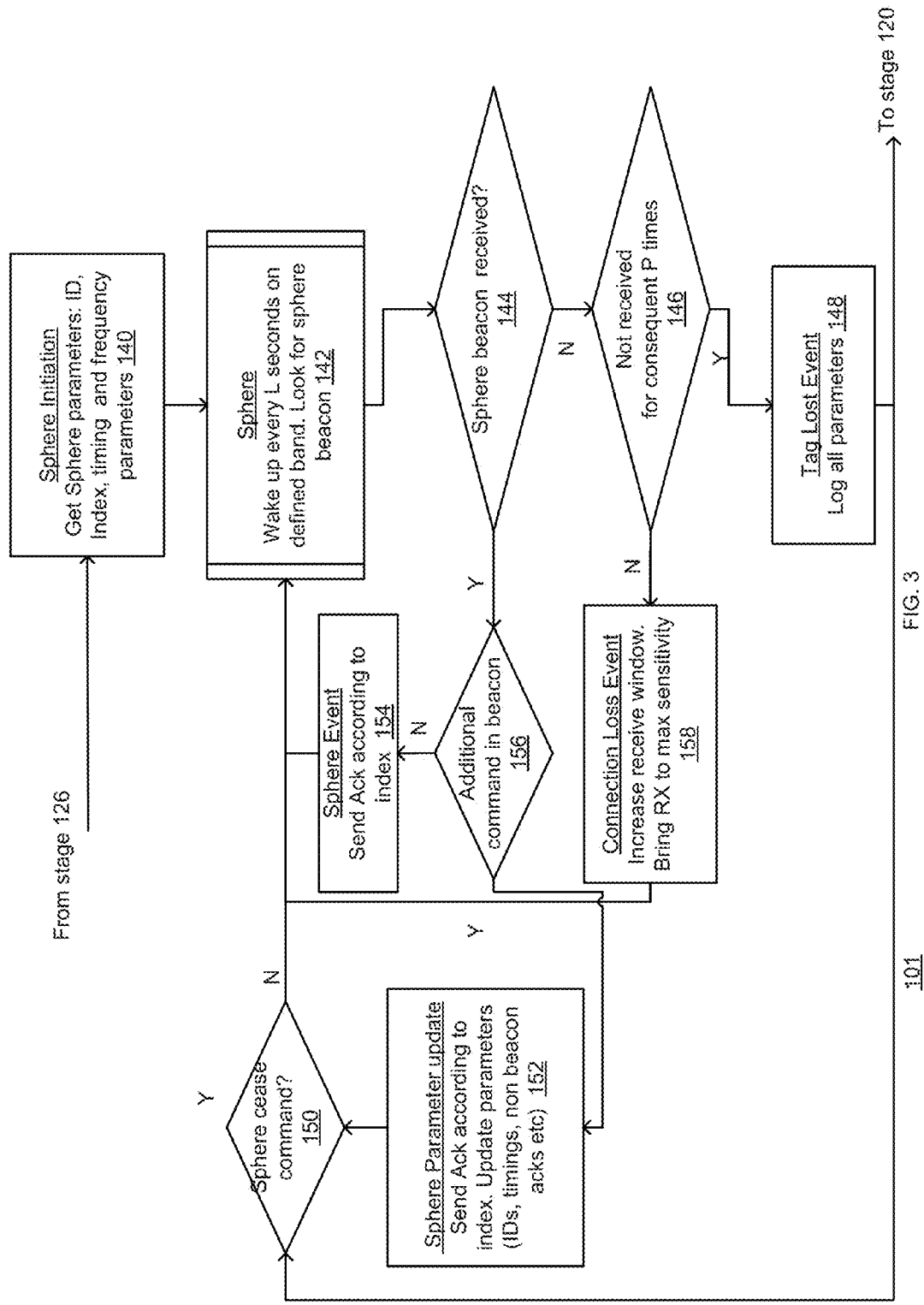
Figure 4:
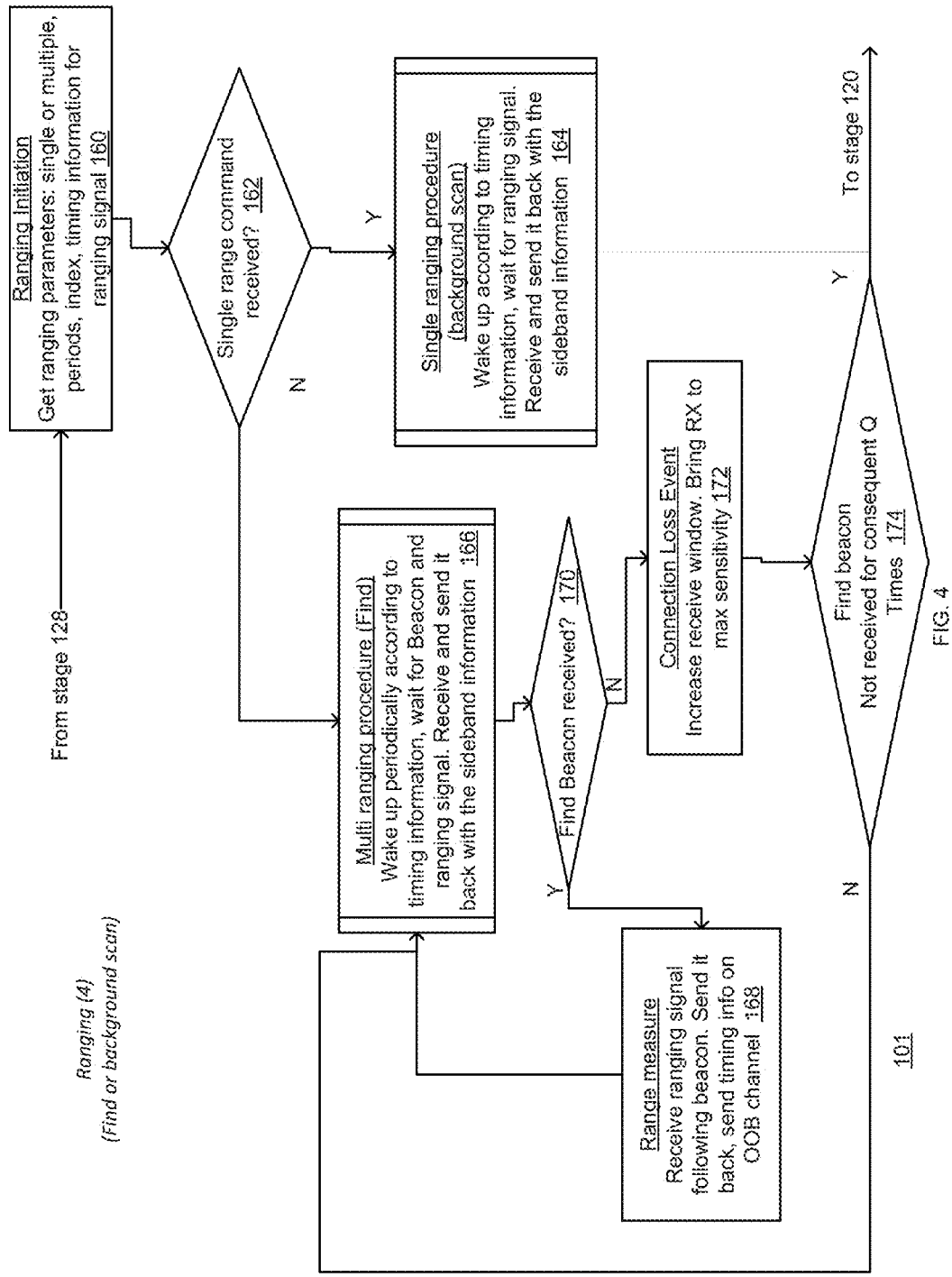

FIGS. 2-3 illustrates a method 800 for operating a wireless tag in various states according to an embodiment of the invention.

These states include:
a. Un-initialized
b. Standby.
c. Sphere.
d. Ranging.

Un-Initiated

This state includes stages 810, 812, 844, and 818. Stage 810 is followed by stage 812 that is followed by query stage 814. A positive answer causes stage 814 to be followed by query stage 816—else to be followed by stage 812. A positive answer causes stage 816 to be followed by stage 820—else to be followed by stage 812.

This is the state the tag gets into after initial power connect (stage 810). It will periodically wake up (stage 812) and get into reception mode, looking for a unique initiation signal. The initiation signal could be a specific one (single phase initiation) or a "generic" one (two phase initiation), depended on the data programmed into the tag during production phase. The advantage in using a generic initiation signal (two phase) is that it could be shorter than a specific one hence requiring shorter reception window resulting in lower power consumption during un-initiated state. Two phase initiation:
 a. If a valid initiation signal is not detected, the tag gets back to sleep till the next reception window
 b. If a valid generic initiation signal is received, the tag moves to a faster periodic reception phase looking for a specific association command with its own ID (stage 816).

The association command also contains timing information enabling the tag to match its reception windows with those of the reader's transmissions. If the association command is received (stage 814) the tag moves to association phase (stage 818). If the command is not received for a certain amount of reception periods, the tag moves back to un-initiated state.

In a single initiation process the first step in skipped, the tag reception windows are longer and the reader starts directly by sending an association command As an example, two phase process may use generic initiating signal of 15 bits only. False detection is low (of the order $[1/2^{15}]$) and with typical 1 Mbps modulation scheme (like Bluetooth low energy for example) and wakeup period of 3 sec the duty cycle of the active TX window will be: DC=2*15*1 usec/3E6 usec=1E-5 or 0.001%. In practice this process could be done in few frequencies, and the overheads of the reception process should be taken into account (synthesizer lock etc.) yet the DC is still extremely low Association process (stage 818): The system gets into that process after a successful reception of an association command by the tag. The tag extracts the timing information from that command and the process begins in the next reception slot. During the association process the tag gets new IDs (replacing production unique IDs as well as adding few broadcast IDs), calibrates its clock offset from the reader's and gets additional parameters. After sending an ACK message the tag moves to Standby mode (stage 820)

Standby.

This state includes stages 818, 820, 822, 824, 826, 828, 830 and 132.

This is the default state of a tag after association. From this state it can move to other states while eventually every state goes back to standby. In standby mode the tag wakes up periodically (stages 820-822) and get into reception mode, looking for a unique wake up signal. The wakeup signal could be a specific one to the tag or a reader "generic" one, depending on the data programmed into the tag during association phase. The advantage in using a generic reader initiation signal is that it could be shorter than a specific one hence requiring shorter reception window during standby state. The wake up period in this state is probably faster than in un-initiate state, yet the operation duty cycle is of the same order of magnitude and the same DC example shown in the previous section could be used here. Waking up could be one or two phase process:

If a valid wakeup signal is not detected stage 822 is followed by stage 820 and the tag gets back to sleep till the next reception window In a two phase wakeup process once a valid wakeup signal is received, the tag moves to awake state (stage 824) which is faster periodic reception phase looking for a specific command. In a single phase wakeup process the wakeup signal contains the reader timing information so the tag is synchronized with the reader while it is looking for the specific commands. The command could be a sphere initiation request (stage 826), ranging request (stage 828) or data exchange request (stage 830). In two phase wakeup the command also contains timing information enabling the tag to match its reception windows with those of the reader's transmissions. If such a command is not received for a certain amount of reception periods, the tag moves back to standby state (to stage 820)

If a sphere command is received, the tag moves (to stage 840) into sphere initiation process which is part of Sphere state.

If a ranging command is received, the tag moves (to stage 860) into ranging initiation process which is part of ranging state.

If a data exchange command is received the tag moves into data exchange process (stage 833). In this process it communicates directly with the reader, can get or send data, parameters etc.

Sphere

This state includes stages 840, 842, 844, 846, 848, 850, 852, 854, 856 and 858.

In this state the reader initiate a sphere of few tags. The purpose of the sphere is to validate the existence of the tag around the reader.

First step in this state is the sphere initiation (840) process. At this phase the relevant tags are already synchronized to the reader. All participating tags get from the reader the sphere parameters (a unique sphere ID, a specific index for every tag, timing parameters, frequency hopping plan etc.). Each tag sends an ACK to the reader and the system moves to Sphere state In Sphere state the tag wakes up synchronically (stage 842) and looks for a reader beacon. The beacon contains the unique sphere ID and may contain additional information (commands).

If the sphere beacon is detected (stage 844) and there is no additional command (negative response to query stage 856), the tag identifies a sphere event (stage 854). It updates its time counting according to the beacon, and sends an ACK message with its index in the right time slot according to its index and sphere initiation parameters. It then goes back to sleep until the next window (back to stage 842).

If the sphere beacon is detected and there is an additional command (positive answer to stage 856), the tag identifies a sphere parameter update (stage 852). It updates its time counting according to the beacon. It also updates the requested parameters (could be an update to the sphere ID, the tag index, timing parameters etc.). It then sends an ACK message with its index in the right time slot according to its index and sphere initiation parameters.

If the parameter update command is a "sphere cease" command (stage 850), the tag gets back to standby mode.

Otherwise the tag stays in Sphere state and goes back to sleep until the next window (stage 842).

If the sphere beacon is not detected the tag check the amount of consequent reception windows a beacon was not detected (stage 846).

If it exceeds a number (P) that was defined in the sphere initiation process, the tag identifies a tag lost event (stage 848). It logs all parameters (time, sphere parameters) and goes back to standby mode If the number was not exceeded, this is a connection loss event (stage 858). The tag increases its reception window (to compensate for timing offsets) and also set parameters to ensure maximum sensitivity. It then goes back to Sphere state going back to sleep until the next window The process describes results in a very low tag power consumption as all tag's active periods are well timed. The reception window narrowed by the tag tracking the reader's clock. In addition, the message itself is short (few tenths of microseconds). The response is very short (tenths of microsecond) and is also timed. The reader activity profile is higher since it is receiving all tag's responses.

Ranging

This state includes stages 860, 862, 864, 866, 868, 870, 872, and 874.

In this state the reader initiates a connection aiming to perform a range/location measurement to the tag using a ranging signal. This could be a single measurement, which is used in background scan or a periodic measurement which is used in a find me mode.

First step in this state is the Ranging initiation (stage 860) process. At this phase the relevant tags (could be one tag) are already synchronized to the reader. Stage 860 is followed by asking if a single range command was received. During the initiating process the reader sends the tags whether this is a single ranging procedure (stage 864) or a multi ranging procedure (stage 866). It also sends the tag relevant parameters (timing, indexes etc.)

If this is a single ranging procedure (864) the ranging initiation command already includes the timing information for the ranging signal. The tag wakes up in a timeslot set by the initiation phase and looks for a ranging signal. Once the ranging signal is identified a range measurement is done and the tag goes back to standby mode.

If this is a multi-ranging procedure (866) the tag wakes up periodically according to the ranging initiating parameters and looks for a find beacon. The find beacon contains the timing information for the ranging measurement If the find beacon is received, the tag moves to range measure (868) process where it looks for the ranging signal in the time slot set by the find beacon. Once identified a range measurement is done and the tag goes back to multi ranging procedure (866), going to sleep until the next wake up slot for a beacon.

If a find beacon is not received (stage 870—negative answer), the tag checks (stage 872) the amount of consequent reception windows a beacon was not detected: (a) If it exceeds a number that was defined in the ranging initiation process, the tag goes back to standby state, and/or (b) If it does not exceed this number the tag increases its reception window and goes back to multi ranging procedure (866) waiting for the next reception slot.

FIGS. 5-10 are various timing diagrams illustrating transmitted signals and reception windows according to various embodiments of the invention. Black boxes illustrate transmissions and boxes with white interior represent reception windows.

Figure 5:
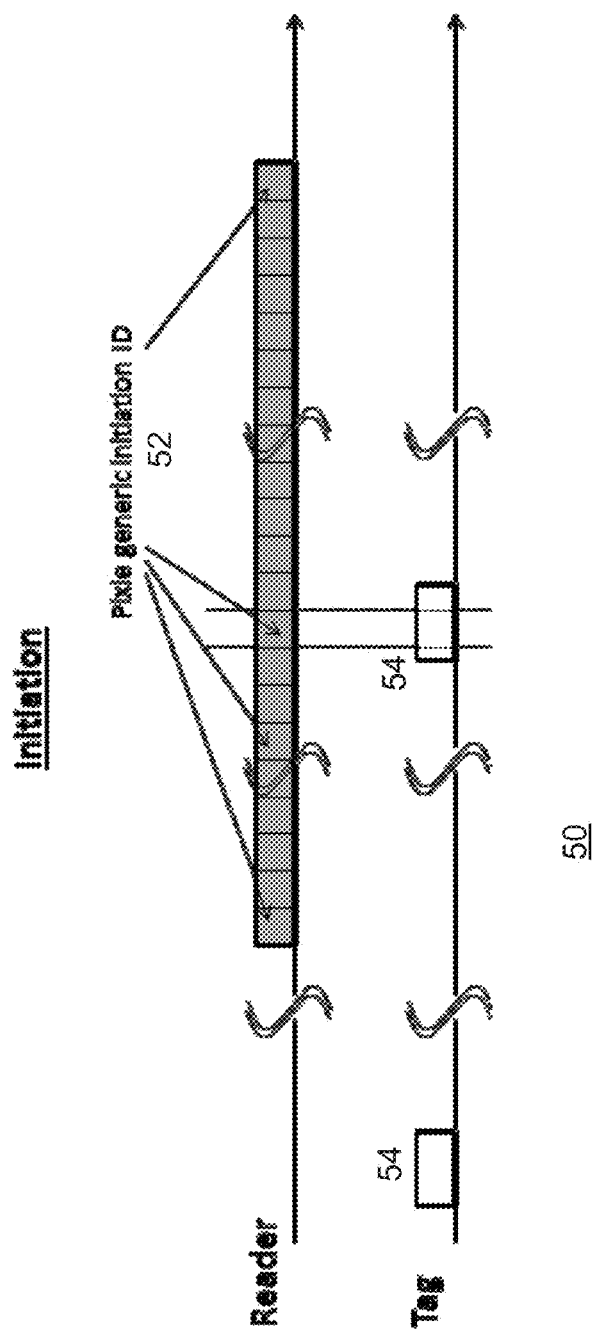
FIGS. 5-17 are timing diagrams according to various embodiments of the invention.

FIG. 5 is a timing diagram 50 of an initiation process (stage 812)—the reader transmits multiple generic initiation identifiers 52 and the tag opens reception windows 54 in a periodical manner.

Figure 6:
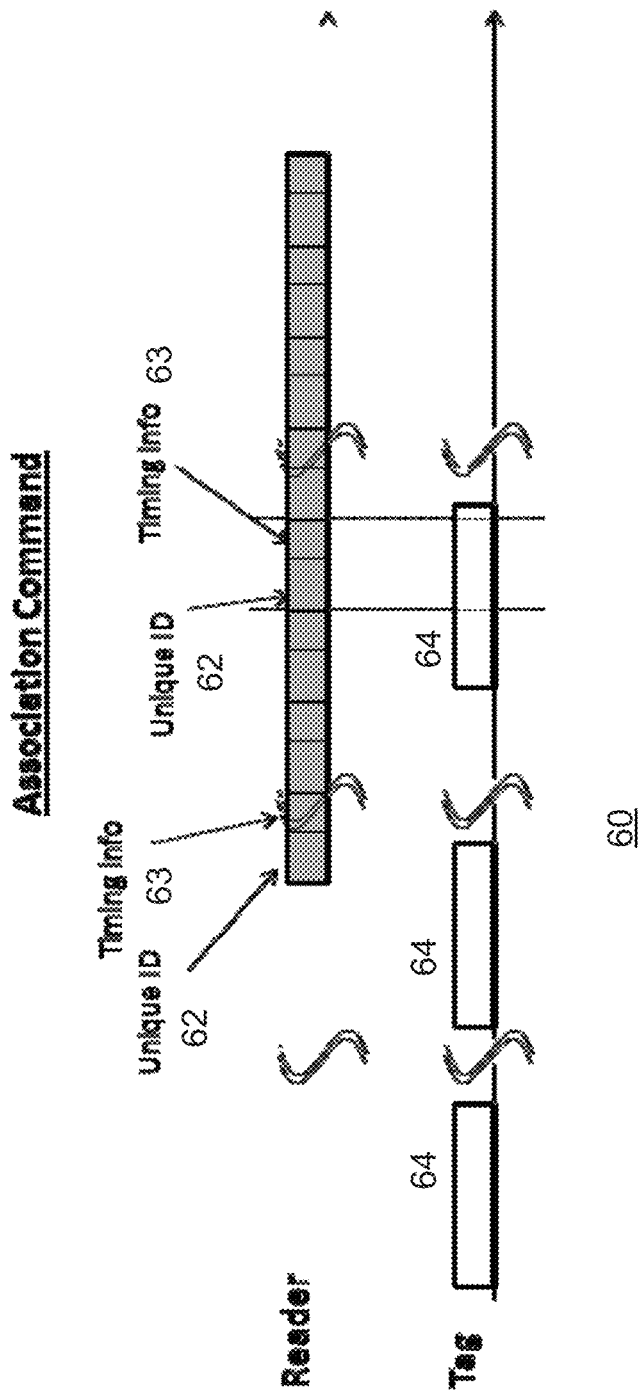

FIG. 6 is a timing diagram 60 of an association stage (stage 818)—the reader transmits multiple pairs of unique identifier 62 and timing information 63 and the tag opens reception windows 54 in a periodical manner.

Figure 7:
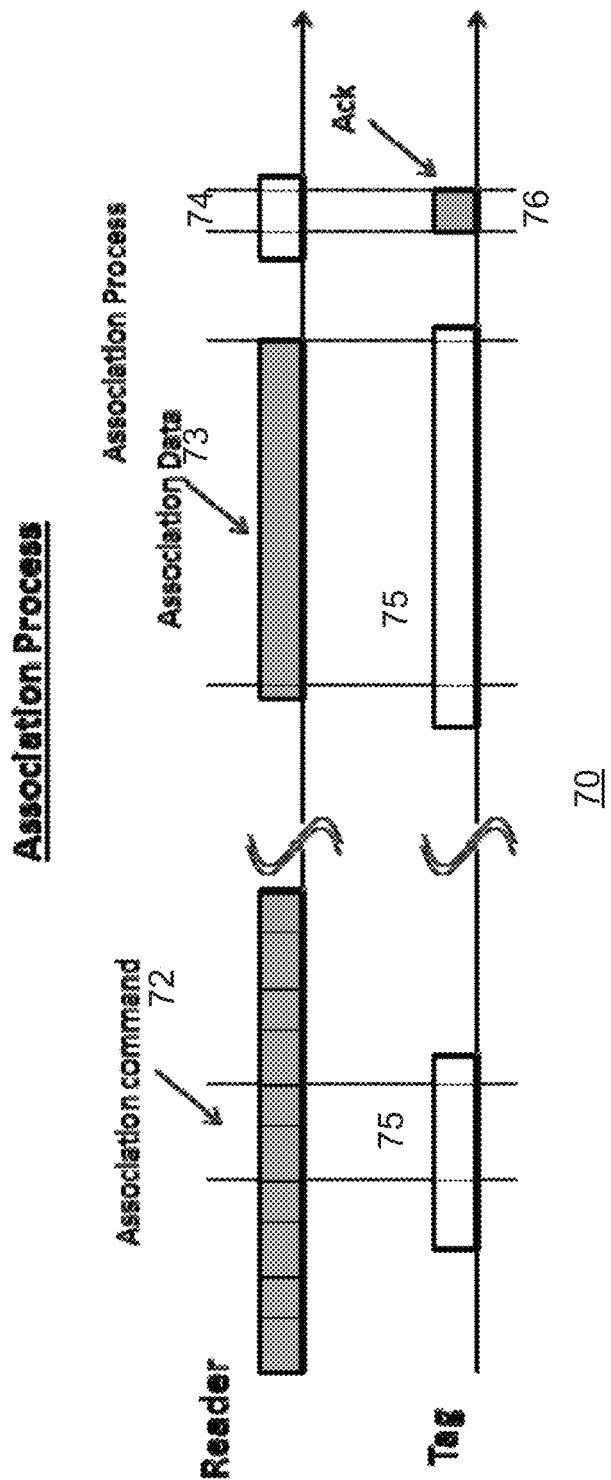

FIG. 7 is a timing diagram 70 of an association process that follows stage 818—the reader transmits an association command 72 that is received during a reception window 75 of the tag. This is followed by having the reader transmit an association data 73 that is received during reception window 75. The process ends with a transmission of an acknowledgement 76 by the tag that is received by reception window 75 of the reader.

Figure 8:
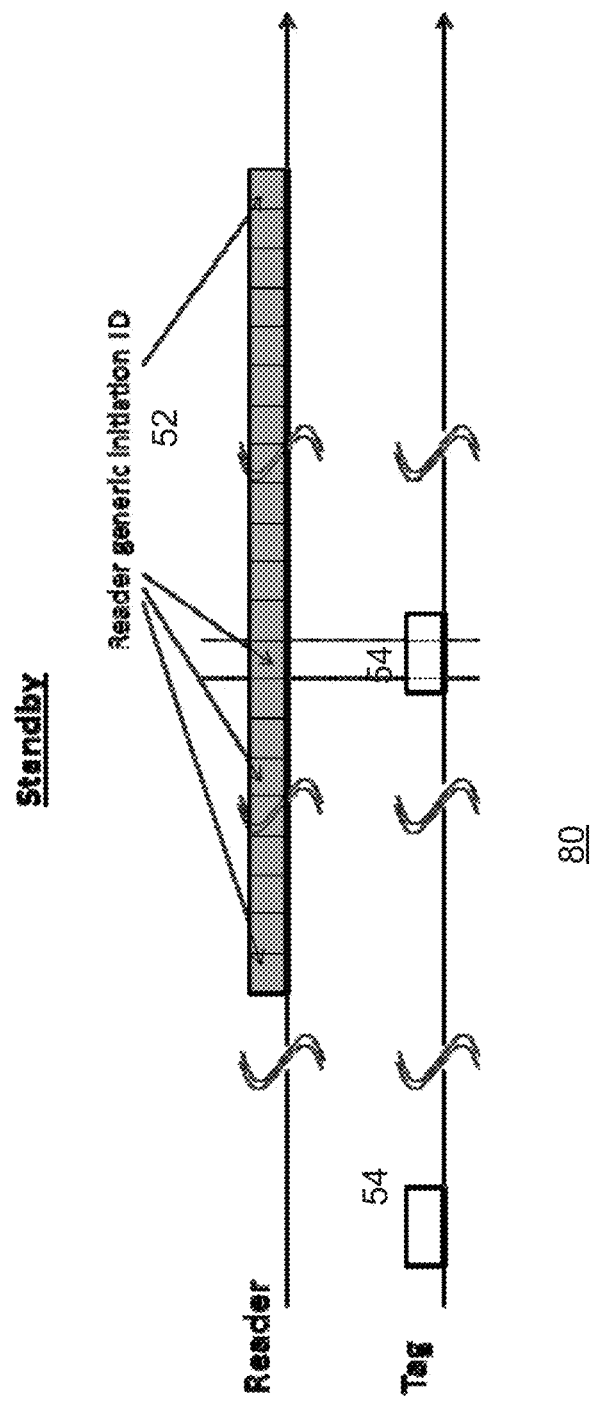

FIG. 8 is a timing diagram 80 of a standby stage (stage 820)—the reader transmits multiple reader generic initiation identifiers 52 and the tag opens reception windows 54 in a periodical manner.

Figure 9:
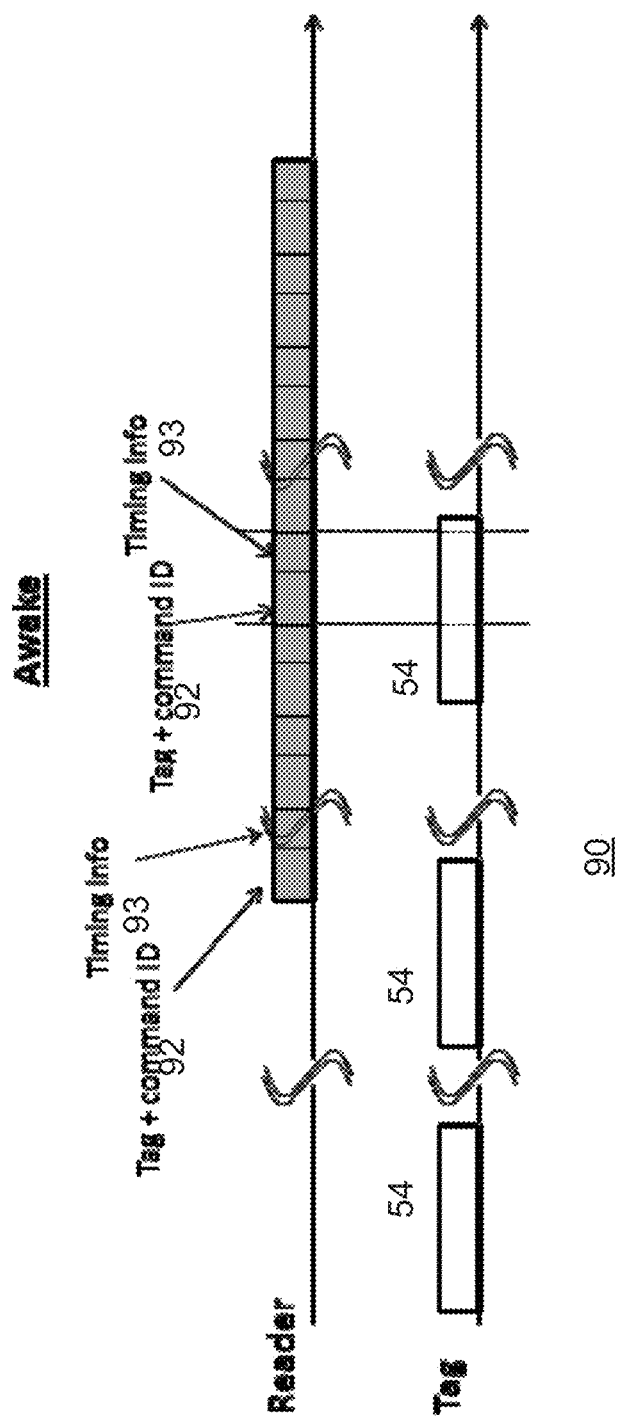

FIG. 9 is a timing diagram 90 of an awake stage (stage 824)—the reader transmits multiple pairs of tag and command identifier 92 followed by timing information 93 and the tag opens reception windows 54 in a periodical manner.

FIG. 9 is a timing diagram 90 of an awake stage (stage 824)—the reader transmits multiple pairs of tag and command identifier 92 followed by timing information 93 and the tag opens reception windows 54 in a periodical manner.

Figure 10:
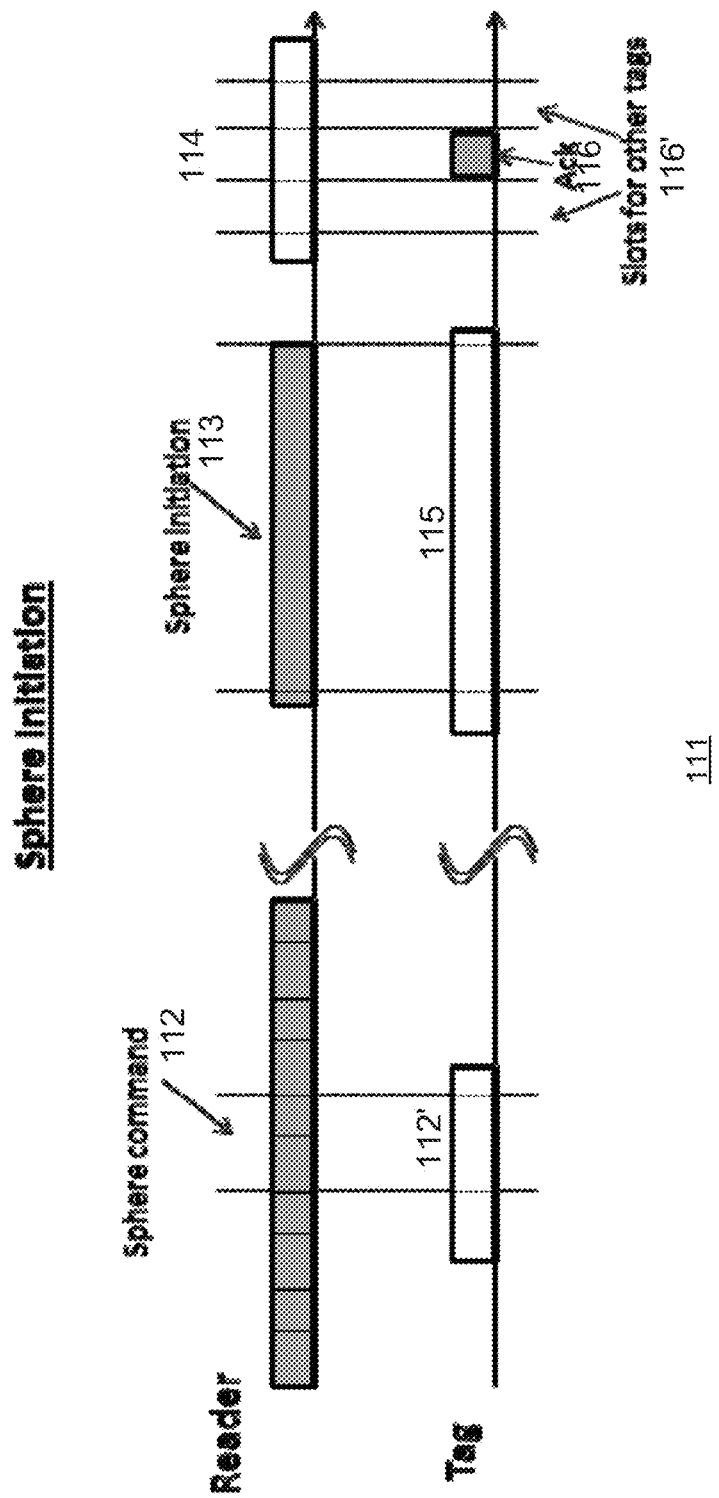

FIG. 10 is a timing diagram 111 of a sphere initiation stage (stage 840)—the reader transmits a sphere command 112 that is received during a reception window 112' of the tag. The sphere command can include pairs of (a) sphere identifier (kit ID) with or without sphere commands and (b) timing information. This is followed by having the reader transmit a sphere initiation 113 that is received during reception window 115. The process ends with a transmission of an acknowledgement 116 by the tag that is received by reception window 114 of the reader. Reception window 114 is wide enough to get acknowledgments from all other tags of the sphere (see slots 116').

Figure 11:
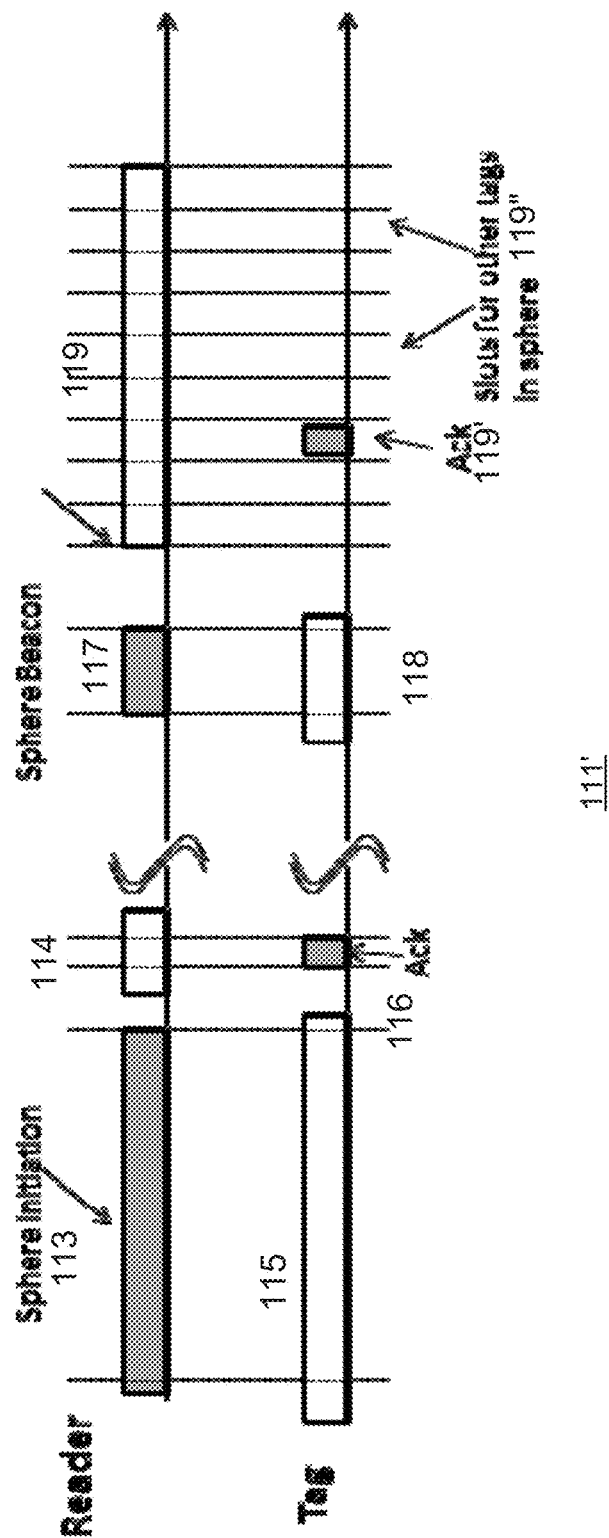

FIG. 11 is a timing diagram 111' of a sphere beacon stage (stage 842)—the reader transmits a sphere initiation 113 that is received during a reception window 115 of the tag. This is followed by having the tag transmit an acknowledgement 116 by the tag that is received by reception window 114 of the reader. After the initiation the following sequence is repeated—the reader transmits a sphere beacon 117 that is received during tag reception window 118. The tag transmits an acknowledgement 119 that is received by a slot 119' of reception window 119 of the reader. Reception window 119 is wide enough to get acknowledgments from all other tags of the sphere (see slots 119").

Figure 12:
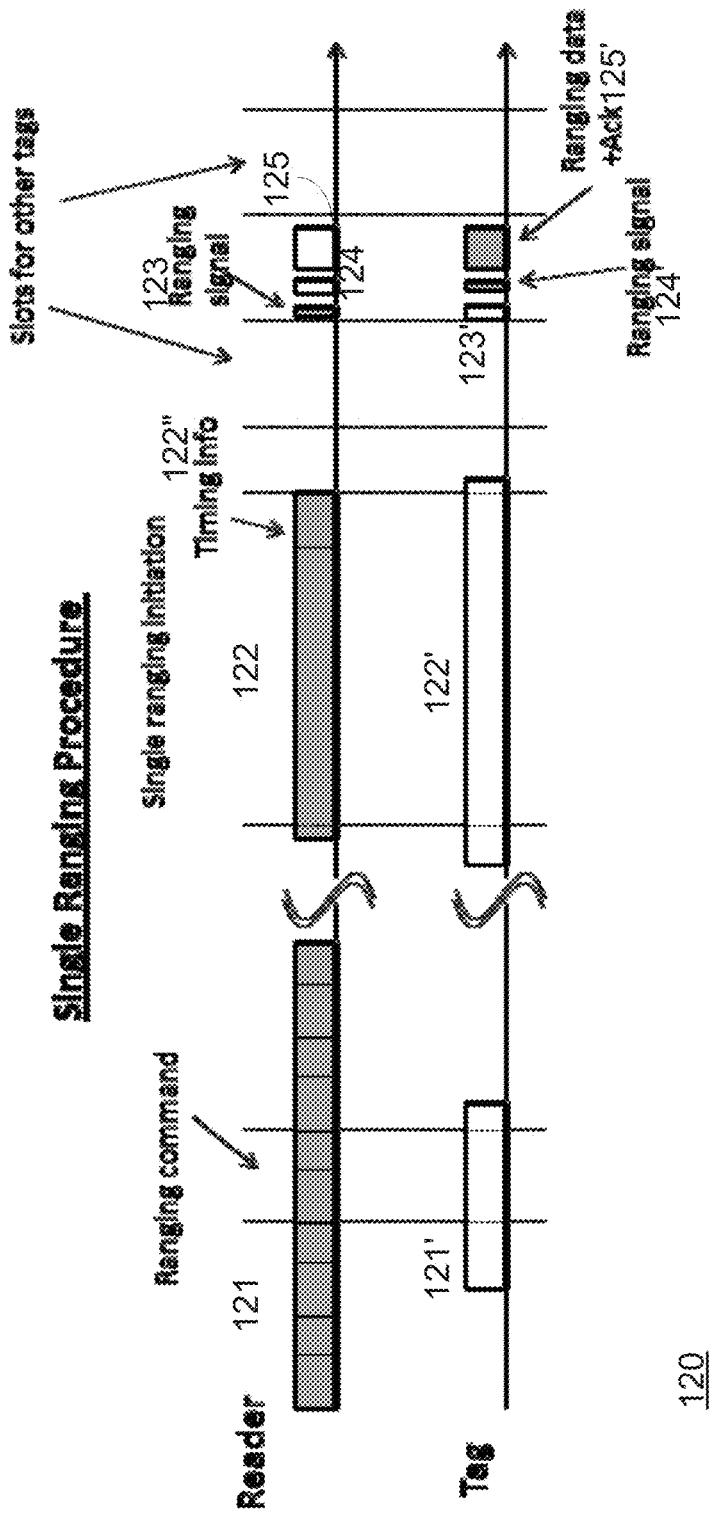

FIG. 12 is a timing diagram 120 of a single ranging procedure (stage 865)—the reader transmits a ranging command 121 that is received during a reception window 121' of the tag. This is followed by having the reader transmit a single ranging initiation 122 (includes timing information 122") that is received during reception window 122' of the tag. The reader then transmits a ranging signal 123 that is received during reception window 123' of the tag. The tag then transmits a ranging signal 124 that is received by the reader during reception window 124' and then transmits ranging data and acknowledgement 125 that is received by the reader during reception window 125'. The latter process (123, 124 and 125) can be repeated for multiple tags.

Figure 13:
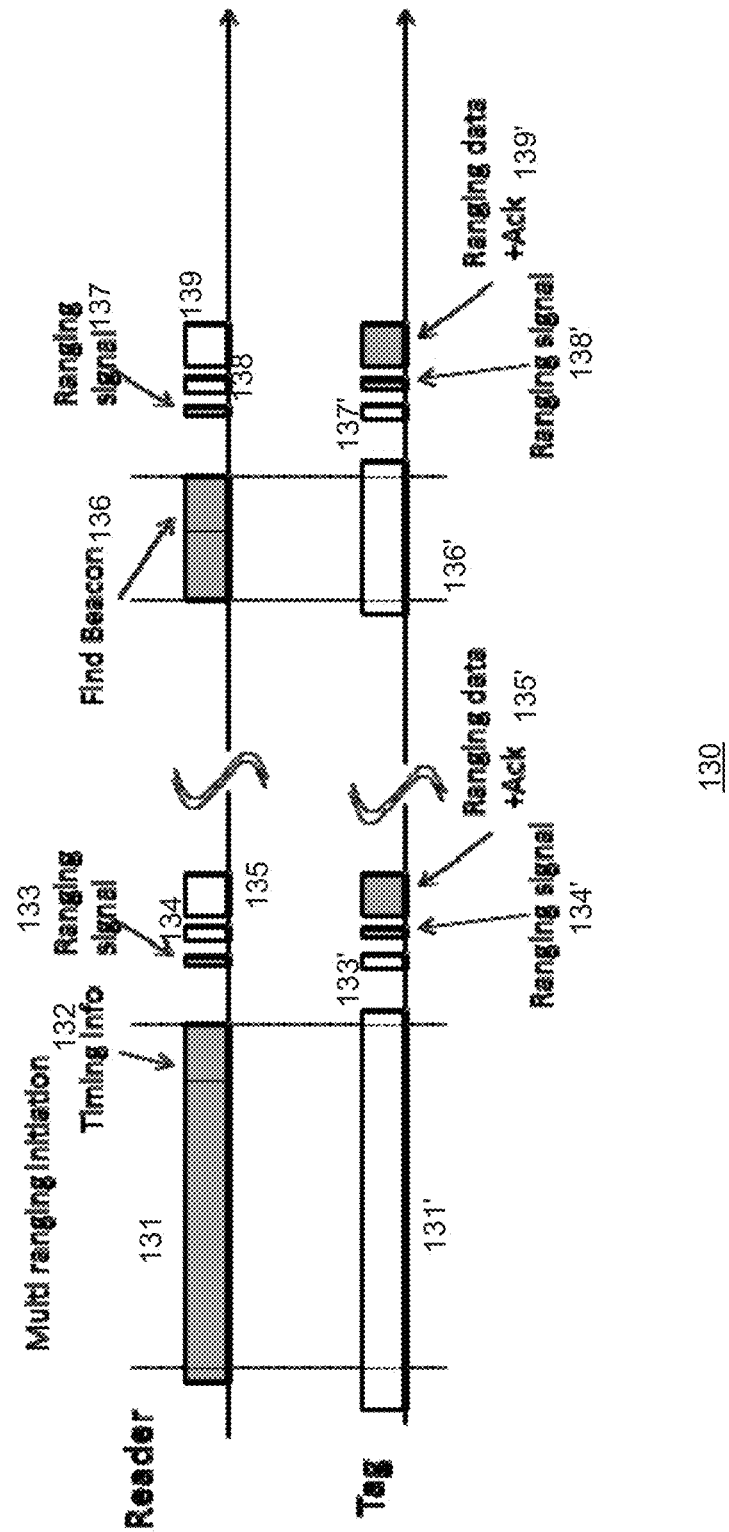

FIG. 13 is a timing diagram 130 of a multiple ranging procedure (stage 866). The timing diagram illustrates events after the transmission (not shown) of a multi ranging command that is received during a reception window of the tag. This is followed by having the reader transmit a multi ranging initiation 131 (includes timing information 132) that is received during reception window 131' of the tag. The reader then transmits a ranging signal 133 that is received during reception window 133' of the tag. The tag then transmits a ranging signal 134 that is received by the reader during reception window 134' and then transmits ranging data and acknowledgement 135 that is received by the reader during reception window 135'. The latter process (133, 134 and 135) can be repeated for multiple tags. The reader can transmit (in a repetitive manner) a find beacon 136 that is received during reception window 136' of the tag. The reader then transmits a ranging signal 137 that is received during reception window 137' of the tag. The tag then transmits a ranging signal 138 that is received by the reader during reception window 138' and then transmits ranging data and acknowledgement 139 that is received by the reader during reception window 135'. The latter process (137, 138 and 139) can be repeated for multiple tags.

Figure 14:
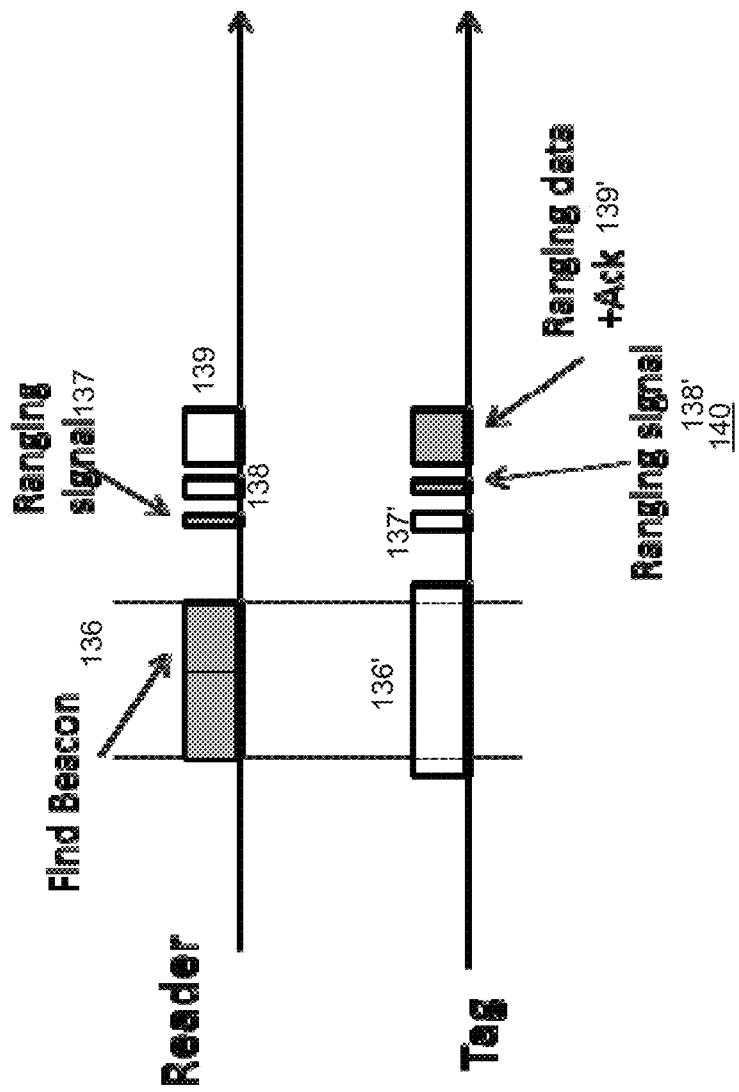

FIG. 14 is a timing diagram 140 of a multiple ranging procedure (stage 866). The reader can transmit (in a repetitive manner) a find beacon 136 that is received during reception window 136' of the tag. The reader then transmits a ranging signal 137 that is received during reception window 137' of the tag. The tag then transmits a ranging signal 138 that is received by the reader during reception window 138' and then transmits ranging data and acknowledgement 139 that is received by the reader during reception window 135'. The latter process (137, 138 and 139) can be repeated for multiple tags.

Ranging Methods

This section describes various ranging procedures according to various embodiments of the invention.

The purpose of the ranging procedure is to measure the direct distance of a tag from the reader. It is using time of flight (TOF) measuring the flight time of wireless signals. As the measurement is done by a single reader, or by few non-synchronized readers the measurement is a two way TOA measurement—the reader estimates the time it takes a signal to travel to the tag, and back to the reader.

Dividing the overall propagating time by 2 gives the flight time and knowing the propagating speed of the signal the reader can estimate the distance. this is described for a single tag but is can be repeated with multiple tags responding to a single ranging beacon and ranging signal from the reader in a pre-defined order The reader initiates the ranging process and controls it The tags are usually slaves, and respond to the reader ranging beacon and ranging signal.

The system also supports ranging process between two tags, while one of them takes the "reader's role"

The smart device application is not involved in the ranging procedure itself. In case of a "find" procedure it acts as a GUI for the user to initiate the process. The reader may report the ranging results to the application at the end of the procedure using the reader-smart device application connection The reader-Tags connection is a wireless connection. The process involves two kind of communication signal:

a. "Narrow band"—those are used for communication. This could be the same kind of signal used for sphere etc.

b. "Wide band"—those are used for the ranging signal, leveraging the fact that wide band signal can achieve better spatial resolution Examples for narrowband methods used for communication: Bluetooth, BLE, 802.15.4 (Zigbee), most cellular standards (GSM etc.). Generally narrow band communication has usually <10 MHZ Bandwidth.

Wideband methods: schemes with enough bandwidth that enables the separation of reflections in an indoor environment: these could be 802.15.4a UWB PHY (500 MHz BW), IEEE802.11ac (latest Wi-Fi standard 80-160 MHZ), 802.11g/n (20-40 MHz)

Ranging Process

After bringing the tag(s) to ranging state (single or multiple) by sending a ranging command, the tag(s) are already synchronized to the reader. The reader sends a ranging beacon, followed by a ranging signal.

The ranging beacon is a narrow band signal which contains the following:

a. The Tag(s) ID b. RSSI information of the tag reception—this helps the tag calibrating its circuits for the ranging signal c. Timing information on when the reader will send the ranging signal. By sending that information the tag can open a very short reception window for the ranging signal (resolution may be a fraction of a narrow band symbol length) reducing its power consumption and implementation complexity.

d. Additional information that can help the tag

The ranging signal is a wide band signal which is sent at a fixed delay after the ranging beacon has been sent. It contains the following:

It may contain the tag system ID

It contains a fixed correlation sequence which is known to all participating tags.

The tag receives the ranging beacon and prepares its wide band circuitry to receive the ranging signal based on the ranging beacon parameters. After successful correlation the tag sends back to the reader the same ranging signal, which the reader correlates. Following that, the tag sends ranging data message or a tag timing message which is a narrow band signal that contains:

a. Timing information from the tag (see details in coming paragraphs):

b. The tag processing time from correlation to ranging signal send completion (Ttag_processing)

c. The estimation of the correlation time error (t_err_tag)

d. The tag->reader->tag estimated flight time in a double two way TOA measurement (T_trip_2)

e. The Tag ID as an Ack f. Additional data required by the reader.

Single Two Way TOA Measurement

Figure 15:
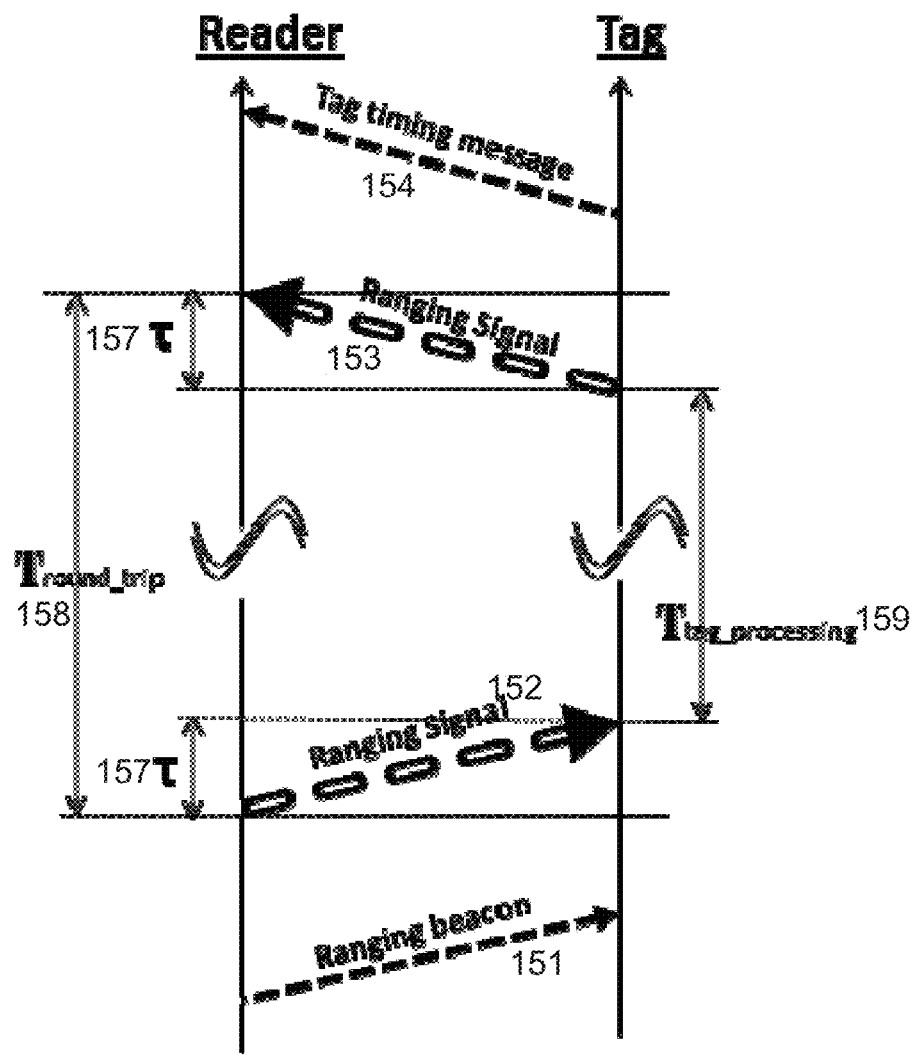
Figure 16:
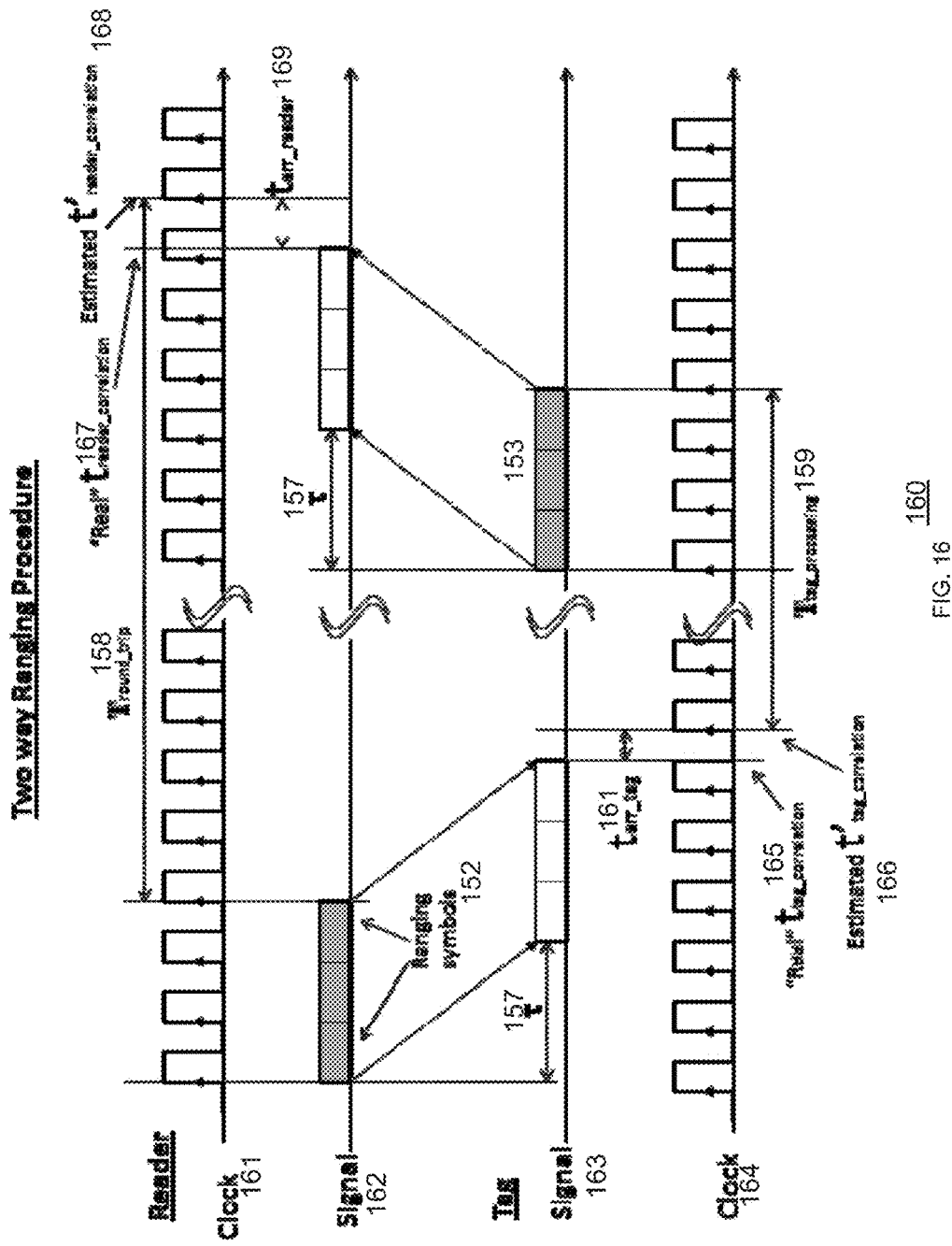

The following text and FIG. 15 describe a timing of the single two way TOA measurement. The fact that it is two way method eliminates the need for clock synchronization between the reader and the tag. This method is sensitive however, to clock frequency difference (drift) between the tag and the reader which results in an error, especially when the tag processing time is. A simplified timing flow is shown in the following diagram:

The reader sends (151) the ranging beacon followed by the ranging signal (152). After sending the ranging signal the reader triggers a timer to measure (count) the overall procedure time. This time is marked T_round_trip 158. The propagation time of the ranging signal from the reader to the tag marked T 157 is the parameter that the procedure aim to estimate. Multiplying T with the propagation speed (c for wireless, sound speed for ultrasonic) will result in the distance estimation.

After receiving the ranging signal the tag start measuring its processing time 159. The processing time is the time from the reception of the correlation sequence of the ranging signal till the tag complete to send its ranging signal response to the reader. This measurement is marked with T_tag_processing 159.

The tag sends back its ranging signal 153. The assumption is that the locations of the tag and the reader as well as the environment are not changing significantly within the time of the measurement, so the propagation time of the signal from the tag to the reader is also T.

After receiving the tag's ranging signal response the reader stop its time measurement. It now has an estimation for T_round_trip 158.

The tag sends a timing message 154 containing its measurement for T_tag_processing 159 as well as the fractional error for the correlation measurement (t_err_tag, see next paragraph).

As T_round_trip=2*T+T_tag_processing, the reader has all the information to extract T.

There are two main error factors in the procedure:
  a. Clock offset between the tag and reader can result in an error, especially in the case where T_tag_processing>>T. This is because T_round_trip is measured with the reader clock and T_tag_processing with the tag clock. This error could be compensated either by the reader measuring the clock offset during the reception of the Tag's timing message of by a double two way TOA measurement (see on following paragraphs).
  b. The time difference between the actual arrival time of the ranging signal to the tag or reader and the time the receiver acknowledges it happen. This is discussed in the next paragraph.

Timing details of two way TOA measurement

This section describes the timing details of the two way TOA measurement, focusing on the ranging signal. The timing diagram is illustrated below:

The reader and tag has the PHY clock frequency (not synchronized). Those clocks (clock 161 of the reader and clock 164 of the tag) could have a small offset which is irrelevant to this paragraph.

The reader sends the ranging signal 152 which is built from a sequence of several ranging symbols. This sequence is naturally synchronized to the reader's clock. The reader triggers a measurement of T_round_trip 158 driven by this PHY clock (161) at the end of the last symbol of the ranging signal.

The tag receives this signal with a delay of T 157. In this example, the received correlation peak happens at the end of the reception of the ranging signal marked with "real t_tag_correlation" 165. The tag PHY identifies this correlation in the next clock cycle, at a time called "estimated t' tag_correlation" 166. This correlation is used to trigger a tag timer measuring T_tag_processing 159.

Depended on the clock frequency, the clock period could be too large compared to the required accuracy of the estimation of T. In this case, the tag estimates the "real t_tag_correlation" 165 time using computational methods, taking into account the data sampled during the entire correlation sequence reception. From that computation the fractional error parameter t_err_tag 161 can be estimated. This parameter is sent back to the reader as part of the tag timing message so this computational task is not timing critical (it has nothing to do with tag processing time from ranging signal reception to transmission) and can be done "offline". The computational methods used to estimate the error may be:
  a. FFT based
  b. Super resolution based
  c. Maximum likelihood estimation After reception, the tag moves from RX to TX and transmits back the ranging signal 153 to the reader. The measurement (counting) of T_tag_processing 159 is completed by the transmission of the last symbol of the ranging signal.

The reader receives this signal with a delay of T 157. In this example, the received correlation peak happens at the end of the reception of the ranging signal marked with "real t_reader_correlation" 167. The reader PHY identifies this correlation in the next clock cycle, at a time called "estimated t' reader_correlation" 168. The correlation of the ranging signal at the reader triggers the freeze of the counter measuring T-round_trip 158.

As with the tag, during the reader's reception of the ranging signal, there is an error in the correlation time estimation called t_err_reader 169, and the reader can estimate that error using similar computational methods as in the tag case (the reader can use a different method).

After the reception of the tag timing message, and using the error estimations of the correlation times the reader can now estimate T with a sub clock period accuracy.

Double Two Way TOA Measurement

Figure 17:
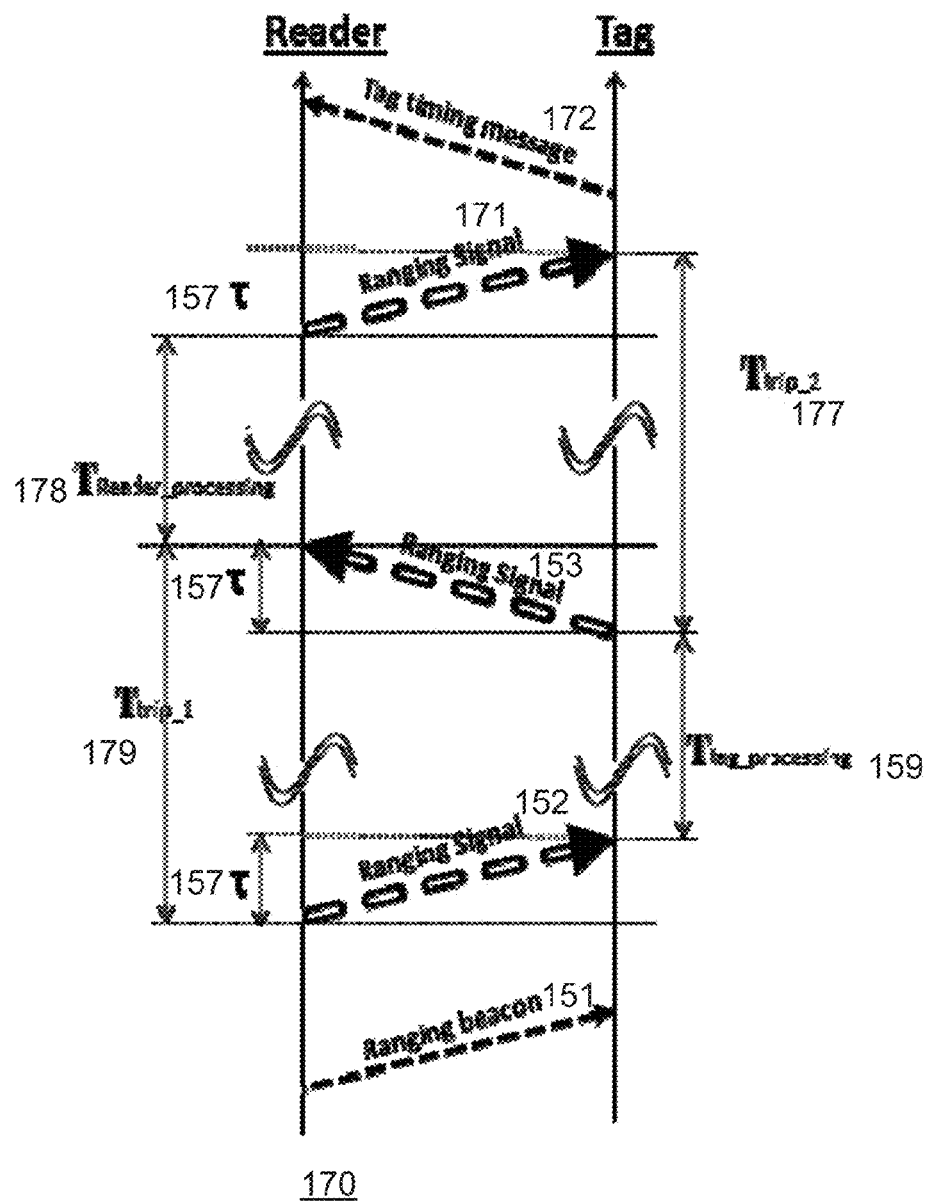

FIG. 17 and the following paragraphs illustrates a method to cancel most of the error which is caused by the drift between the readers and tag's clock. In this method the two way TOA measurement is performed twice—one measurements Reader->Tag->Reader and another one is Tag->Reader->Tag. As the main factor for offset error is with the estimation of the processing period, and as is each measurement the processing period is measured with a different clock, the error eventually cancelled out. The method is illustrated in the diagram below:

The reader sends a ranging beacon 151 that is followed by transmitting the ranging signal 151 and triggers T_trip_1 179 measurement.

The Tag receives the ranging signal and triggers T_tag_processing 159 measurement.

The tag sends back its ranging signal 153, stops T_tag_processing 159 and starts T_trip_2 177 measurement.

The reader receives the ranging signal, stops T_trip_1 179 measurement and starts T_reader_processing 178 measurement.

The reader sends another ranging signal 171, and stops T_reader_processing 178 measurement.

The tag receives the ranging signal and stops T_trip_2 177 measurements.

The tag sends the tag timing message 172 including now also T_trip_2 177.

The reader now performs two calculations based on two equations:

$$T\_trip\_1 = 2*T\_1 + T\_tag\_processing \qquad \text{a.}$$

$$T\_trip\_2 = 2*T\_2 + T\_reader\_processing \qquad \text{b.}$$

Figure 18:
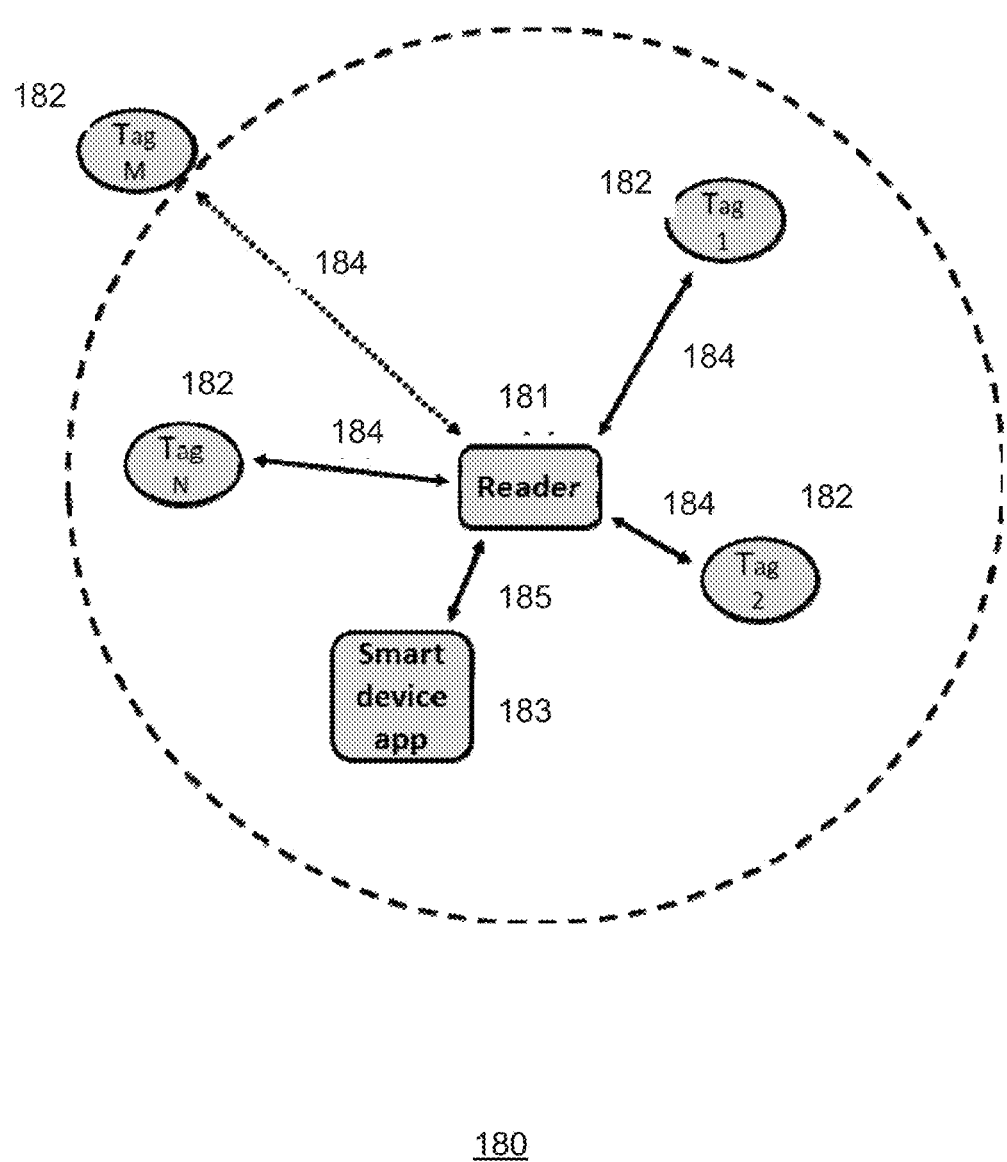
FIG. 18 illustrates a sphere of tags according to an embodiment of the invention.

The estimation T=(T_1+T_2)/2 cancels out, to first order the clock offsets error Sphere Connection This section describes the sphere connection. A sphere is a subset of tags that are connected to a reader or few readers, in a beacon(s) driven centralized network. The main purpose of the sphere is to periodically validate the existence of the tags within the sphere by validating their connection to the reader. An illustration of a sphere 180 is shown in FIG. 18:

The reader 181—initiates the sphere and manages its timing

The tags 182 assume a slave position, i.e. they respond to the reader beacon request. There could be an arbitrary number of tags (N) in a sphere.

The smart device application 183 acts as an additional GUI for the user to initiate a sphere, cease it and get indications The Reader-Tags connection 184 is a wireless connection The Reader-Smart Device Application 185 connection is a wired or wireless connection Sphere Set Up A sphere is set up by the user or by a time/event driven process or by location event (e.g., application sets a certain sphere every day at 8 AM or starts a sphere when we leave home and ends it when we arrive to the office). The user can set up several spheres. The sphere setup could be done in several ways. The following describes options for setting up a sphere by a user using the application:

a. The user selects specific tags (or items which tags are attached to) that the user wants to initiate a sphere with. The application sends the reader the relevant tag indexes
b. The user selects a predefined set of tags (or items which tags are attached to). This set is called "a kit". The kit correlates to one of few broadcast IDs tags could have, and is also known by the reader, so the application only need to sends the reader the kit index
c. The user selects to set up a sphere to all tags with are in proximity (of certain distance for example—one meter) to the reader. The reader then sends a broadcast command to all tags (using one of the broadcast IDs tag gets during initiation) using pre-defined output TX power (to control range). The reader identifies the tags in range and set up a sphere with them. The user can later manipulate manually the set of tags Time/event driven sphere could be set up using the two latter modes (pre-defined kits or all tags within range)

Figure 19:
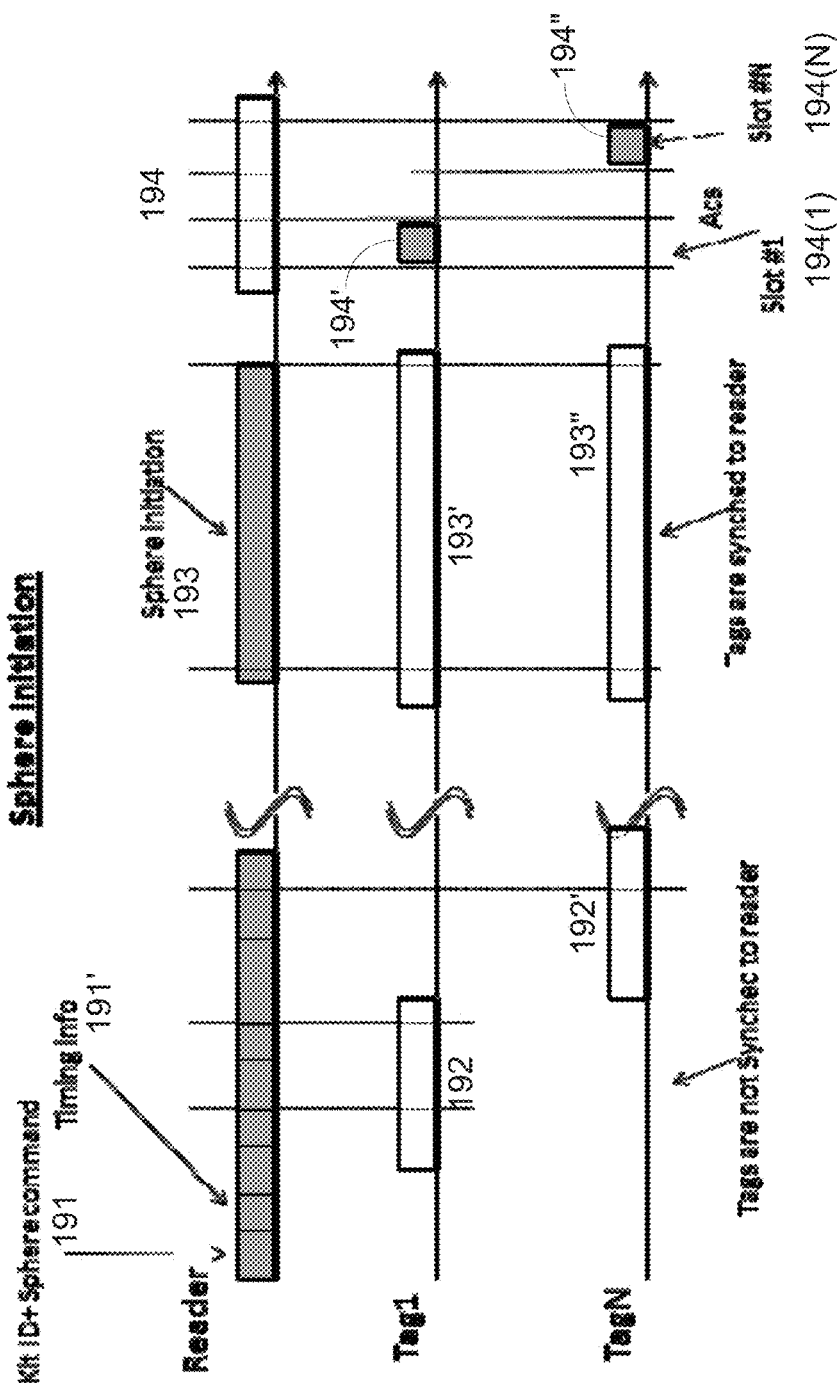
FIGS. 19-22 are timing diagrams according to various embodiments of the invention.

There could be option to add or delete tags from pre-defined KIT during the activation FIG. 19 is a timing diagram 190 of a sphere initiation in which the reader transmits a sphere identifier (sphere ID or kit ID), an optional sphere command (both denoted 191) and timing information 191' that is received during a reception window 192 of tag1 and a spaced apart reception window 192' of tagN. The sphere command can include pairs of (a) sphere identifier (kit ID) with or without sphere commands and (b) timing information. This is followed by having the reader transmit a sphere initiation 193 that is received during overlapping reception windows 193' and 193" of tag1 and tagN. The process ends with a transmission of an acknowledgements 194' and 194" by tag1 and tagN during two out of N timeslots 194(1)-194(N) of reception window 194 allocated by the reader for receiving ACK messages from N wireless tags of the sphere.

Figure 20:
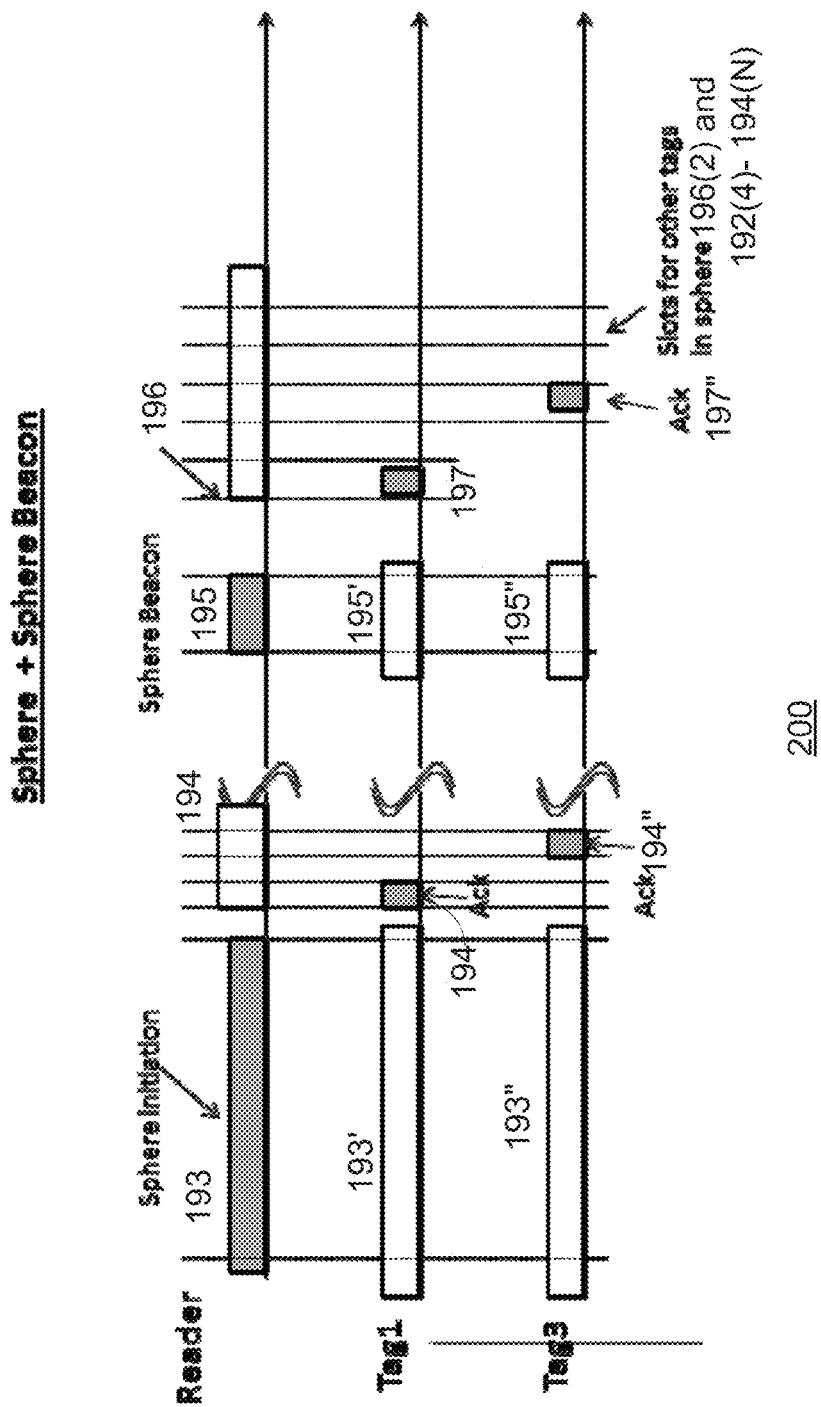

FIG. 20 is a timing diagram 200 of a sphere beacon stage (stage 842)—the reader transmits a sphere initiation 193 that is received during a reception windows 193' of tag 1 and reception window 193" of tag3. This is followed by having tag1 transmit an acknowledgement 194' and having tag 3 transmit an acknowledgement 194" during first and thirds slots out of N slots of reception window 194 of the reader.

After the initiation the following sequence is repeated—the reader transmits a sphere beacon 195 that is received during tag1 reception window 195' and tag3 reception window 195". This is followed by having tag1 transmit an acknowledgement 197' and having tag3 transmit an acknowledgement 197" during first and third slots out of N slots of reception window 196 of the reader.

Figure 21:
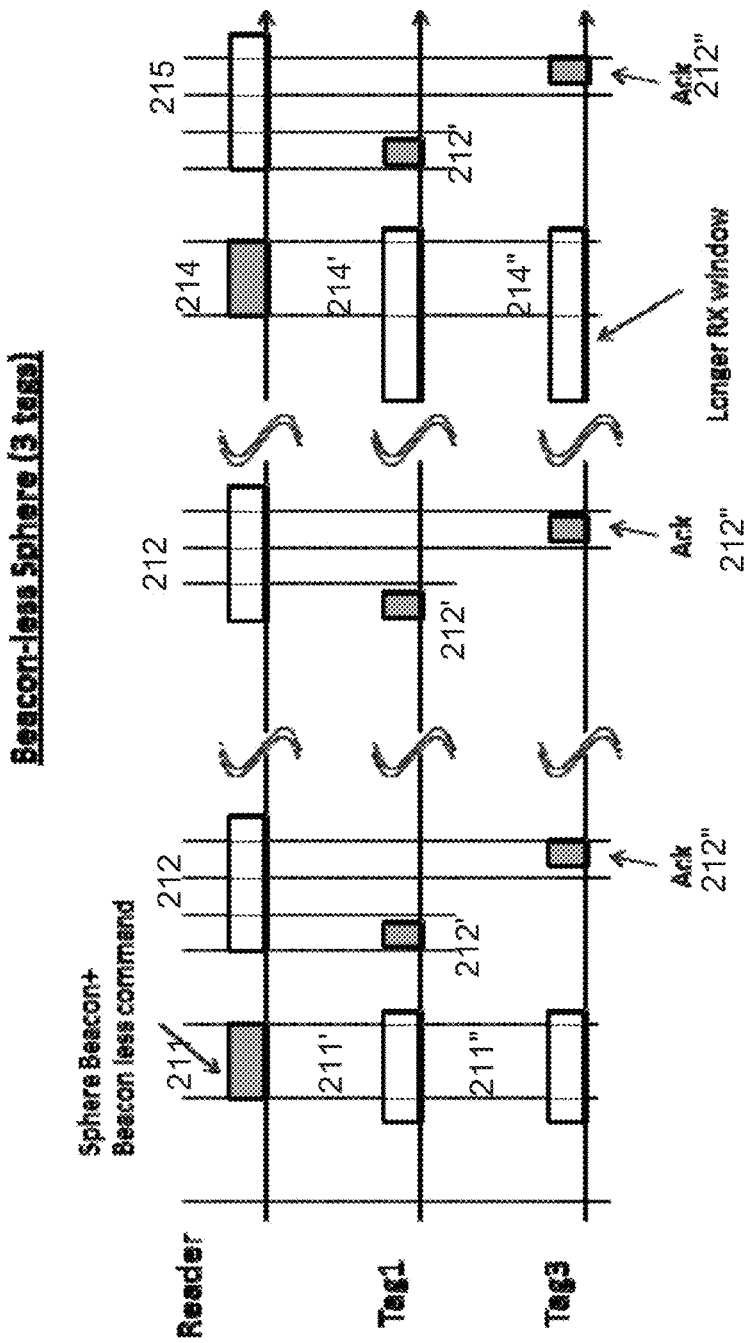

FIG. 21 is a timing diagram 210 of a beaconless state in which a reader transmits a sphere beacon and an instruction to operate in a beaconless mode in which tags transmit ACK messages even without receiving the beacon from the reader- and after an expected time of reception of the beacon.

The reader transmits a sphere beacon 211 that includes a command to enter for few cycles into a beaconless state. This is received during tag1 reception window 211' and tag3 reception window 211".

This is followed by having tag1 transmit an acknowledgement 212' and having tag3 transmit an acknowledgement 212" during first and third slots out of N slots of reception window 212 of the reader.

This process may repeat multiple times. FIG. 21 also illustrates an enlarged reception window 214' and 214" for receiving a beacon 214 from the reader.

This is followed by having tag1 transmit an acknowledgement 212' and having tag3 transmit an acknowledgement 212" during first and third slots out of N slots of reception window 212 of the reader.

Figure 22:
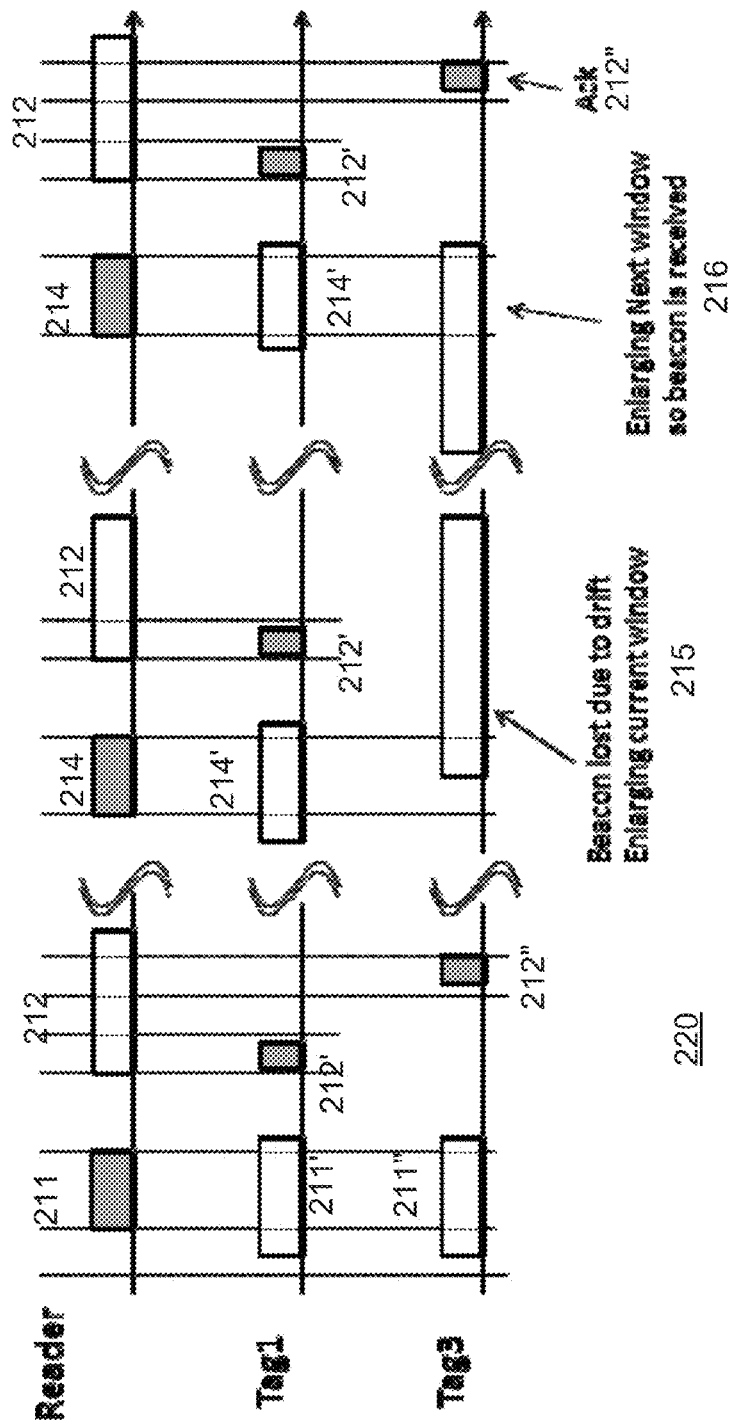

FIG. 22 is a timing diagram 220 that illustrates a lost connection event.

The reader transmits a sphere beacon 211 that includes a command to enter for few cycles into a beaconless state. This is received during tag1 reception window 211' and tag3 reception window 211".

This is followed by having tag1 transmit an acknowledgement 212' and having tag3 transmit an acknowledgement 212" during first and third slots out of N slots of reception window 212 of the reader. This process may repeat multiple times.

FIG. 22 also illustrates a drift of an enlarged receive window 215 opened by tag3—the drift causes tag3 to miss the beacon 214 set by the reader. At the following cycle (or after few cycles) tag 3 opens a further enlarged reception window 216 and receives beacon 214.

This is followed by having tag1 transmit an acknowledgement 212' and having tag3 transmit an acknowledgement 212" during first and third slots out of N slots of reception window 212 of the reader.

User Parameters

In the tag association process, each tag is associated with criticality parameter indicating the expected behavior in case of a "Absent Tag" event while in a sphere. This information is stored in the reader as well as in the smart device application. Few examples for behavior:

By logging the event the reader and smart device application record all parameters during the event (e.g. time, GPS location is available, WLAN AP connection Base station ID, ID, BT connection ID etc)

In case of an "Absent Tag" event—log the event and create a user indication immediately. Try to reconnect to the tag In case of an "Absent Tag" event—log the event, try to reconnect to the tag, yet create a user indication after a certain timeout (example—tag is identified as still absent after 10 sec, the system tries to reconnect and if it fails it generates a user indication after 2 min)

In case of an "AbsentTag" event—log the event, reader tries to reconnect to the tag and create a user indication only after there is a location change trigger by the reader (example—tag is identified lost after 10 sec, the system tries to reconnect and if it fails it will generate a user indicating only if the reader has been moving for more than few min, or the system identifies location change by associating to WLAN, GPS indication from the smart device application etc)

In case of an "Absent Tag" event log the event, try to reconnect to the tag for a predefined amount of time, and if fail do nothing Sphere Initiation and Activity After selecting the tag subset the user and setting up the sphere, the user initiates it:

a. In case of a pre-defined kit the reader will move all tags within range to awake state, it will then send a sphere command with the kit ID. After that the reader will send a sphere initiation command with the kit ID. In the sphere initiation command the reader can change the kit ID to an ad hoc Sphere ID. All kit members have pre-defined indexes (set up during the kit set up). This index defines the ACK slot position. From this stage, the sphere is set up. The reader sends periodically a beacon with the sphere ID, the tags respond according to their indexes.

b. If there is not pre-defined kit, the described process is repeated per tag

The reader can send the tags a command to get into a beaconless respond for few cycles. In this case the tags send their ACK in the estimated time of the next slot even if beacon is not received. Their reception window on the next beacon may be enlarged (see, for example, FIGS. 21 and 22).

The reader can occasionally change the sphere ID (to ensure privacy, or for other reasons) by sending a change command within the beacon.

The frequency where the communication takes place could change (hop) every connection slot. The reader may define the hopping scheme during the sphere initiation phase The tags estimate their clock drift relative to the reader with the reception of each beacon, and compensate for this drift in time counting for the next window. This is done in order to save consumption of current. In the case an expected beacon is not received, the tag increases its current and next reception windows to maximum. To compensate for connection lost because of time and not range If no beacon reception is accomplished in the next L (pre-defined) windows (hence no ACK is sent for those slots), it is a "tag lost" event. The tag goes back to standby mode, the reader and application behaves according to the "user defined parameters".

Tag Description

Wireless tags are designed to be very small form factor, with long life cycle, simple to use, reliable and robust to environment conditions and very cost effective.

Physical Structure

The wireless tag can be of various dimensions, sizes and circuitry. It can be manufactured according to any prior art method.

Wireless tag size—As an example, a tag could have the following dimension 28×14×1-1.5 mm and its weight will be below 2 gr.

The mechanical structure could have up to seven layers. Some tags will be designed with all seven layers and others will be designed with a subset of those layers. On some cases some layers will be merged to a single layer.

Figure 23:
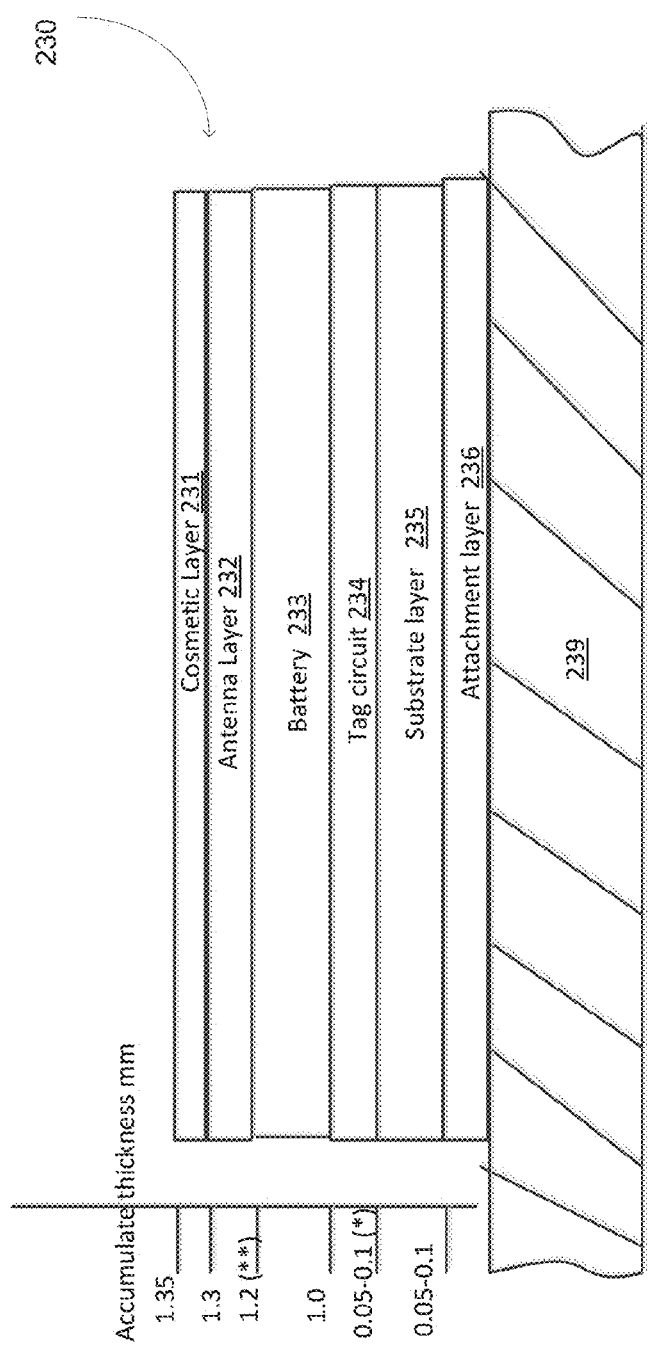

FIG. 23 is a cross section of tag 230 attached to object 239 according to an embodiment of the invention.

The tag 2300 may include layers 231-236.

Attachment layer 236—most common will be universal adhesive sticker, but for some application we might need to develop special solution—sample attachment to my ski gloves, other fabric made objects.

Attachment layer alternative list:
a. Universal glue sticker with cover that the user will remove before sticking to the target item.
b. Mechanical contact for fabric—like plastic tiny nails and nuts.
c. Fast non adhesive sticker
d. Sleeve.
e. Zipper
f. Etc.

Substrate layer 235—some elastic, dielectric isolated material, about 1.2 mm thick use in case of metal tagged object. Antenna may use the battery or object as a ground plane.

Tag circuit layer 234—build on flexible thin FR4 PCB with optional printed antenna. Structure will enable to be encapsulated by the Battery.

Battery layer 233—either a flexible battery or a rigid one with special structure that either will be designed to be non-replaceable or might enable the user to replace the battery. Battery can be primary or secondary.

Printed antenna layer 232—can be separate layer, printed on battery sleeve or printed in Tag circuit.

Cosmetic layer 231—can be part of the battery but might be design to be sticking and enable people to personalize the tag. It might represent a marketing value add.

FIG. 24 illustrates a top view and a cross sectional view of battery 244, and a tag and antenna portion (242 and 246) of a tag according to an embodiment of the invention. The antenna can have a trapezoid cross section and may fit into a fitting opening formed by the antenna and circuit portion.

Figure 25:
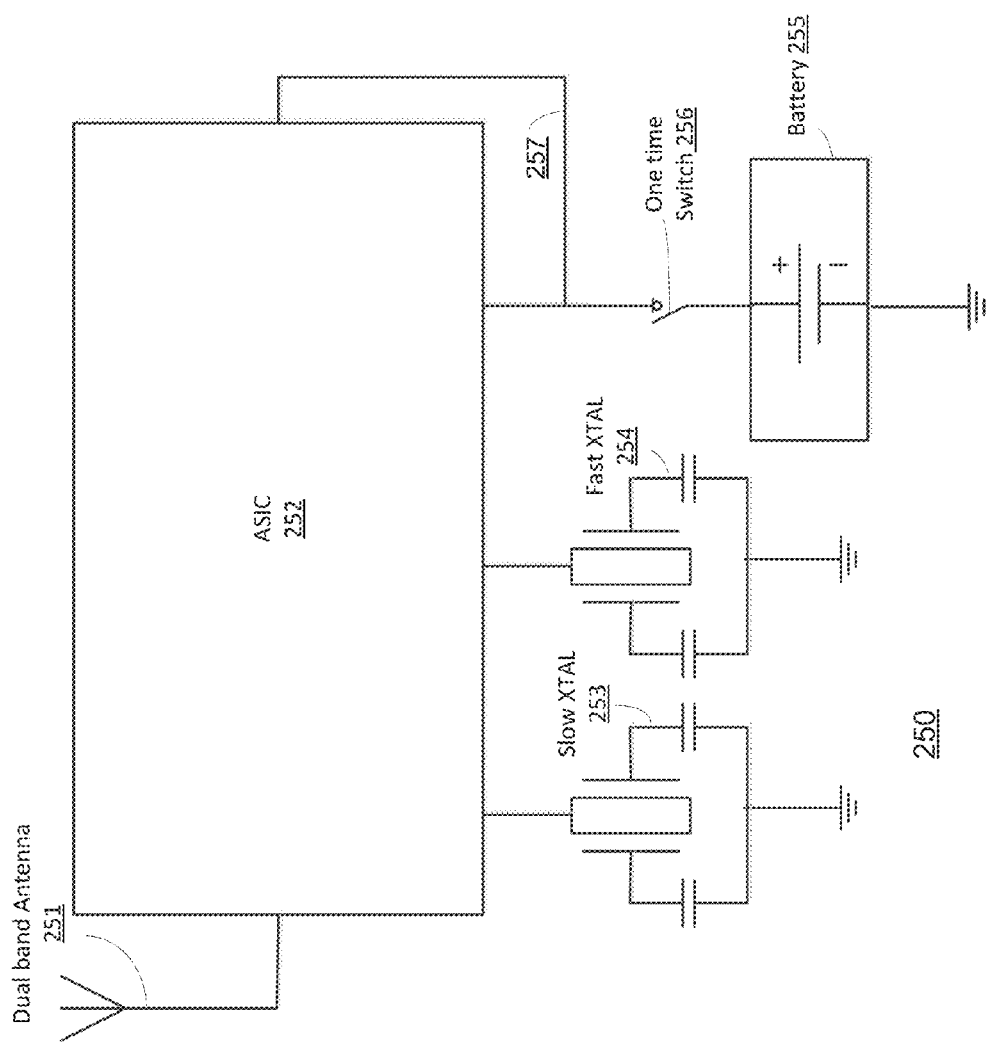

FIG. 25 illustrates various electrical components of the tag according to an embodiment of the invention.

It includes a dual band antenna 251 connected to an ASIC 252. The ASIC is fed by a slow clock (slow XTAL 253) and a fast clock (fats XTAL 254). It is connected via a one-time switch 256 to battery 255. The slow clock can generate a clock signal, for example at 32.768 KHz. The fast clock can generate a megahertz range radio frequency clock signal.

These electrical components can be assembled on a flexible PCB. The ASIC 252 may check the status of the battery 255 after converting analog readings of the battery voltage and/or current using an analog to digital converter 257.

Figure 26:
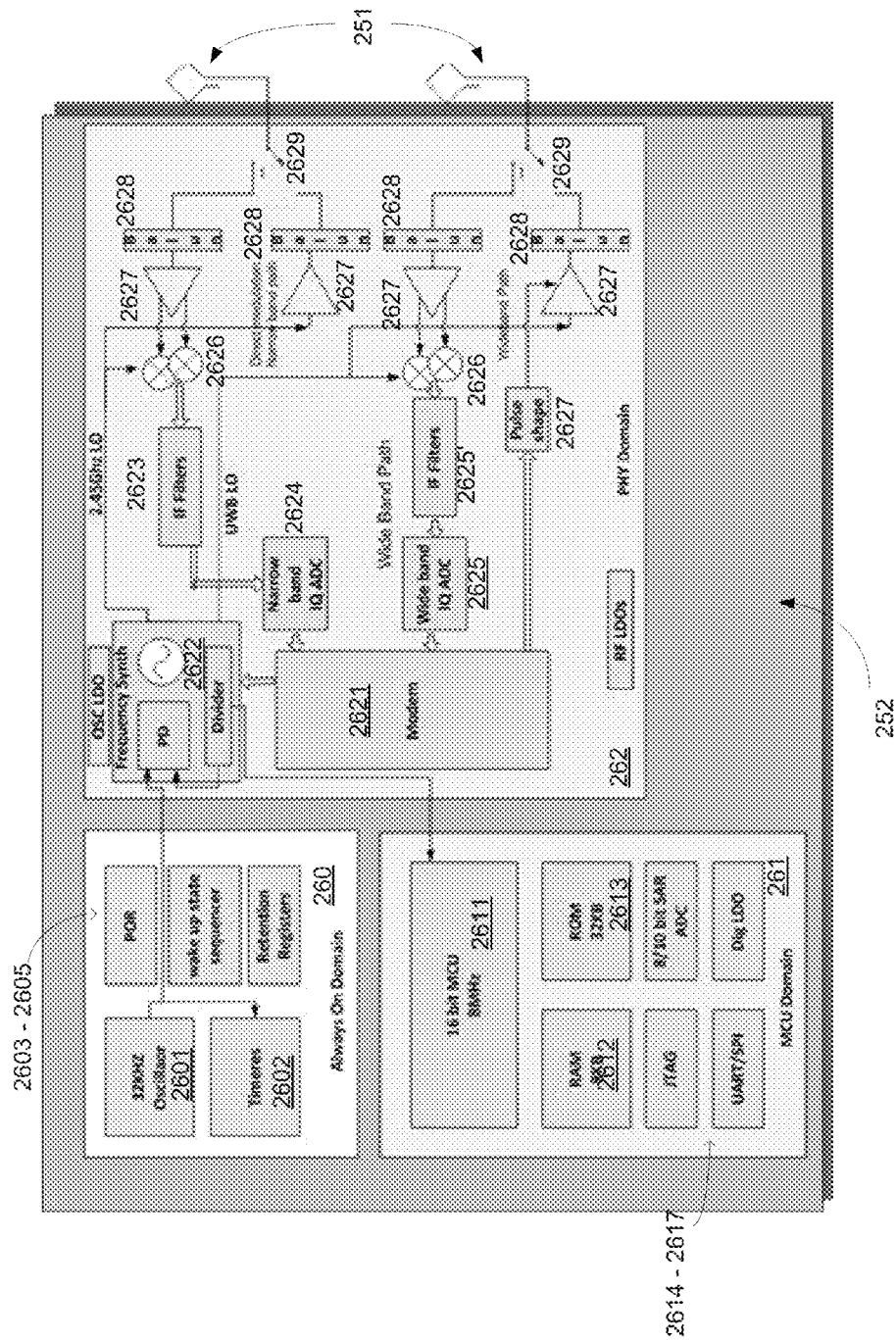
FIG. 26 illustrates an integrated circuit (ASIC) of a wireless tag according to an embodiment of the invention.

FIG. 26 illustrates the ASIC 252 and dual band antenna 251 according to an embodiment of the invention.

ASIC 252 may include a portion 260 that is always open and MCU and PHY domains 261 and 262 that can be selectively shut down when operating in a power saving/low power mode.

Portion 260 includes an oscillator 2601, timers 2602, power on reset 2603, wake up state sequencer 2604 and registration registers 2605.

MCU domain 261 includes MCU 2611, RAM 2612, ROM 2613*m* JTAG module, ADC module, UART/SPI module, LDO 261-2617.

PHY domain 262 includes modem 2621, a wideband reception and transmission circuitries (balun 2628, receive transmit switch 2629, amplifiers 2627, pulse shaper 2627, filters 2623, mixers 2626, and narrowband IQ ADC 2624), a narrowband reception and transmission circuitries (balun 2628, receive transmit switch 2629, amplifiers 2627, filters 2623, mixers 2626 and narrowband IQ ADC 2624)—both are fed by a frequency synthesizer 2622 (includes phase detector PD oscillator and frequency divider).

Both narrowband and wideband circuitries are illustrated as applying quadrature modulation (I and Q channels) but other modulations can be applied.

Reader Description

The reader is part of the PGA (personal Gear assistance) system. The reader is the central unit that communicates with the user's tags on one hand and the smart device/application on the other hand. The reader can estimate the range and direction to the tags. Generally it has two operating modes—Smart device gateway, or stand lone (SA). In gateway mode it sends its estimated data to the application/smart-device, in standalone mode f it works independently and display the results on a local display.

The reader may be designed to be compact, stylish in form factor, with rechargeable batteries, simple to use, reliable and cost effective.

The reader can communicate with the smart-device using Bluetooth, Bluetooth Low Energy, WLAN or any other suitable wireless or wired technology, and with the tags by communication protocol. It can communicate with other readers either using either the smart-device—reader communication technology or communication link depend on the use case.

Figure 27:
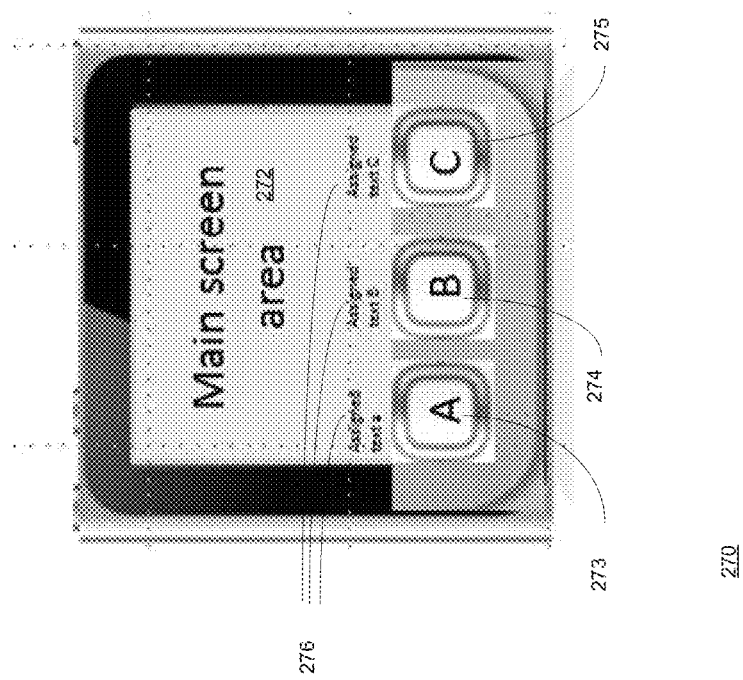
FIG. 27 illustrates a display of a wireless tag according to an embodiment of the invention.

Reader design example:
a. Reader device dimensions are about 70×50×5 mm
b. Slave only version without screen is 60×40×3 mm
c. Weight—20 gr FIG. 27 illustrates reader 270 front panel according to an embodiment of the invention. It includes:
1. Reader case—rectangle box about 70×50×5 mm
2. Main display 272—color LED LCD display with optional touch screen.
3. Three soft keys (273,274,275)—that automatically display user commands options.
4. Three display command windows 276 that display actual command option.

Figure 28:
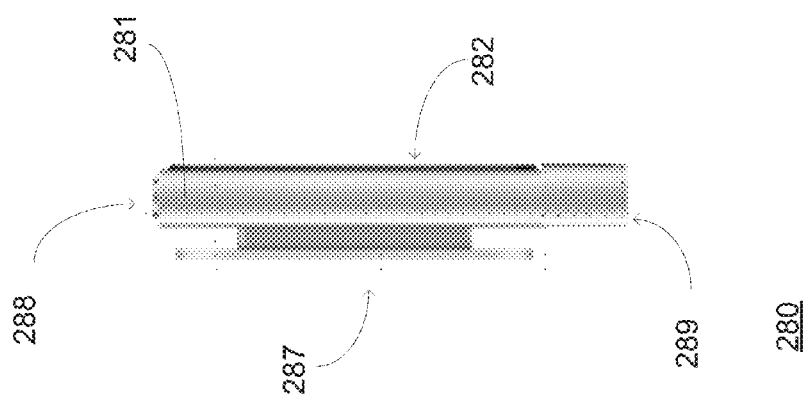
FIG. 28 illustrates a wireless tag according to an embodiment of the invention.
Figure 29:
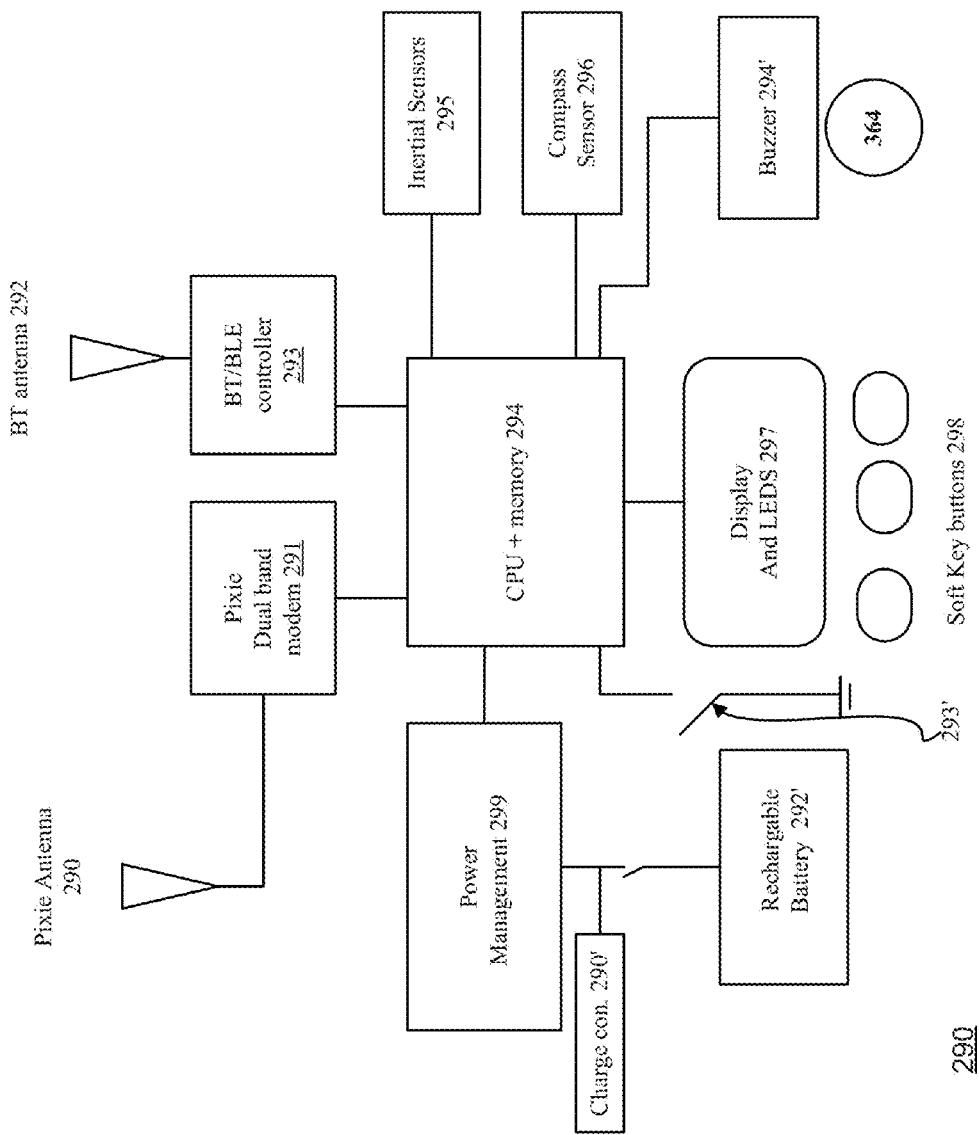
FIG. 29 illustrates electrical components of a wireless tag according to an embodiment of the invention.

FIG. 28 is a side view of the reader and it includes
a. Reader case 281—rectangle box about 70×50×5 mm, and display 282.
b. Sliding element: 287—Sliding element for attached the reader to smart device adaptor (optional)
c. Upper side—Three indication LEDs 288—Power on, Smart device link, and Multi color indication LED.
d. Lower side—two hidden switches 289, on/off switch and slide in micro switch that shut down the LCD for reader attached to Smart device adapter. Also charging jack.

Examples of ID design guidelines and comments.
a. Screen—LED or TFT, low profile.
b. Li Ion Rechargeable battery—built in not replaceable.
c. Fully sealed design. IP65.
d. LCD display will be designed as module—Reader will be fully slave functional without the LCD.
e. Smart device attachment—will be designed with so it can fit easily to new Smart device.
f. Special charger adapter will enable parallel charging of smart device and reader.
g. ID may include always on accessories: Smart device adapters, hand digital clock, belt adapter.
h. spare magazine—optional slot in the reader for 1-2 spare tags that user can add for ad hoc item Reader detailed description of GUI elements and operation buttons
Main Screen GUI Elements
8 Direction Compass Rose
Display window/line—distance in meter 1 digit resolution and direction—I.E "2.7 m NW"
Status/search window—"not found", "item found" "item is missed" etc. and event hour I.E "wallet found, Sep. 23, 2012 10:45" Or—screen is off only status line show—"connected to App"
Optional location window: IE "at home" or "at kitchen"
Optional map display.
Items ICON—ICON for most popular items.
LOGO.
Soft display command—see below
Cold/warm display—graphic two color (faint to bold dark) indication for cold/warm (or close/far) indication.
Up down display—indication for up direction or down direction in multiple floor site.
Wait bar or line or both display I.E "searching now . . . "
Battery indication—status and charging.
Soft keys: up to 4 Letter display. Buttons below is written from left to right. I.E—FIND in (1.) is the most left button and OFF the most right.
Default display—FIND (start find process), SPHR (Start Sphere and auto includes all), MENU FIND operation Select item to FIND—UP, DOWN, SLCT or OK (Up down will scroll items list/icons)
FIND operation, FIND process—FIND (restore same item search), OK/Dismiss (confirm Item found), Main (return to main menu).
Sphere creation option A—ADD (add element to KIT), DEL (delete element from KIT), OK (confirm and lock).
Sphere creation (after add ADD or DEL)—Up/down, OK (OK confirm add or delete and return to (4.)
Sphere maintenance—Mode (default immediate, toggle to quiet), STOP (release sphere)—stop sphere. FIND (start FIND but without stop the sphere—sphere restore automatically after FIND.
MENU operation—Back (return to default display), Configure (select menu option), /Off (soft off .button).
Configure—Sphere option (Kit selection), Buzzer volume, other TBD.

Reader circuit block diagram
Ant 290—multi band antenna.
Dual band Modem 291—chip—PHY for TAG or inter reader communication.
Bluetooth/BLE Ant 292—BT/BLE antenna for Smart Device or other reader communication.
BT/BLE controller 293—Smart device/reader communication device.
Main CPU and Memories 294—low power high performance CPU and memories.
Inertial sensor 295—2or 3 Axis inertial sensors.
Compass sensor 296—2-3 Axis compass eSensor.
Display 297—LED or TFT display, modular element. (Can be removed in production for only slave unit). 3 LED indicators.
Soft Keys buttons 298—3 control buttons.
Power management circuit 299—LDOs, power save circuit. Battery charge circuit.
Hidden on/off switch 292'—hidden (non-convenient access) power switch.
Li ION rechargeable battery 291'
Micro switch 293'—off the LCD and button on slave attached mode to smart device.
Buzzer 294'—used to find reader by smart application More Example for Application
This section lists more applications that could be established on top of the described technology platform:
ADT silent alarm
App: identify and notify the user of items being moved in the house. As a product or as a hook in for service provider like ADT.
Medication container tagging and reminders
App: reminder to take pills, reminder when leaving house that you are leaving without the pills you have to take in 1 hour
Wine collectors
App: tag wine, guide collector to bottle on demand or on system trigger (bottle reached its ideal timing). Alert on temperature or humidity
Other collectors: DVD, cd, books, comics
Same app and considerations as wine
Ski kits weather proof tags
Runners/Tirathlones
Tag all needed stuff for a race/practice—shoes/socks/clothes/watch/cap/energy gels/registration etc.
Adventure competition
Running/biking/navigating in relations to others, in relations to tagged items etc (tough mudder, etc Gaming extension to Wii or Kinect that extends the interaction to items like a ball, a bat, a gun etc Social find App: find users in a public place, accurate in door find, dating scene etc.

Sports app:

Automatic score loggers and "recorders"—not a video image capture—but digital recorder of items and users location that did what and was where when.

Basketball: reader on the hoop, tags in the ball

App: automatic score and stats board

App: auto digital recorder in your iPhone/smartphone of game for playback, logging, analysis and Facebook or alike upload Players may wear tagged wrist bands etc Baseball App: speed of ball, angle of impact, distance of ball, glove to ball analysis Tags or readers may be in gloves, club, balls etc Golf
a. Where is the ball
b. How far are we from the hole
c. How fast did I hit it?
d. Automatic logger Tennis Auto score logger Blow by blow playback Smart Home automation Smart home event creations App: using the reader and tags location to create events that effect smart home operation. Examples:
i. Turn on TV on my channel when I walk in the media room
ii. Turn on my music when I walk in Low cost flower pot humidity measurement, reminder to water house flow pots.

Specialized tags

Forward calls to the room I'm in

B2B and organizations apps

Libraries asset retrieval w finder

App: find titles on the shelves

Titles are books DVD CDs magazines

Museum location based audio guide

The user carries a reader and gets info per each art piece through his/her smartphone based on the user location Each art piece location is individually tagged Museum customized tour The user app asks for users to define his/her areas of interest and then guides the user through a tour based on repetitive "find" to next tag Large store supermarket item locator In a Large store find the aisle ("Mexican food") or category ("imported cheeses") or brand ("Malka beer"). Tagging the store isle or shelf and putting reader on the cart, cloud app translates item to location and finds the relevant tag Find a product based on search—tells you where to find it In mall store locator tagged stores Same as in supermarket Potential tag forwarding for distance considerations Any small shop or SOHO or room/space in big company inventory management Find using store owned reader Value added buyer interaction data (what product was most moved)

Children and pets

Children monitor:
a. 1-3 year baby monitor—mom/dad is aware where the baby is located.
b. Alarms if distance from reader>then threshold
c. 0-2 year—add wet diaper monitor.
d. Alarm in case—baby cry, baby stop breathing etc Children gardens or school bus or at tour—
a. Monitor that all children at the garden square or all children belong to the group are not lost.
b. All kids that came off the bus later came back on the bus (a form of sphere)
c. Record incoming and outgoing log Theme park finder and kids control
a. App associates tags (bracelets) to each other, and enable reader cloud to be accessed from appx for tags y and z only
b. Examples: if parent has tag x, child has tag y and parent uses app z on a smartphone
c. The Parent (smart device app z) sets an alert that child (tag y) is missing, the readers will all look for tag y, and will show the child to the parent smart phone only
d. The exit guard will only let child leave the premise when accompanied by parent (the system will alert if a child leaves w/o parent or w no tag)

Accurate location Pet monitor

Inform when pet gets out of the house yard.

Combine with triggering event like electric shocks and array of low cost reader.

Low cost solution for accurate of navigation of robots.

Find tags or triangulate multiple tags to establish location

Smart case—very similar like PGA sphere concept with the difference that the reader is attached or built in the case or bag etc. will create alarm whenever item is "out of the case".

Smart Shopping Bag.

The bag has a built in reader with barcode or RFID capabilities and associate a software tag for each item that is in the bag that were identified, and removed it when its take out Military smart dust. Examples:
a. Platoon auto numbering.
b. Auto inventory of relative big items—like shells of canons, tanks etc, Agriculture wireless sensors.

Industry—locator of tools (do not forget) in big Hangars. (Like Boing hangar).

Industry—CCM—cold chain management.

Aviation (similar to 32). FOD is Foreign Object Damage to planes often caused by misplaced tools after maintenance.

Aviation: tag passengers and baggage to know all are on board, at the gate etc'. For security, tag handbags so when found can be identified and also make sure a passenger stays with his handbag during stay in the terminal.

Lost and found apps:

Basic app with basic "name tag" readable to any reader. If you tag your gear with these cheap tags, can provide a secure and trusted service, over the cloud, to re-claim lost items left behind as long as there is a reader there.

Single Reader Positioning

Current systems built for identifying the position of a certain item usually focus on estimating the position of the item relative to several "readers" or "hubs", each of which is at a known position. The GPS system is a simple example of that concept (the station or "the item" estimates its position relative to the satellites, while the position of the satellites is known). This is also the concept of current RTLS, or Real Time Location Systems, where each of the readers is usually fixed in space to a known position.

In order to estimate the position of the item vs. each of the "readers" one needs to estimate the distance and/or the angle between the item and each of the "readers". The estimation could be absolute or differential (i.e. estimation of distance could be done with ToA or DToA). Current systems usually require at least 3 different readers in order to provide an estimate.

Naturally, the error in the estimation of distance and/or angle results in inaccurate calculated position: Specifically, instead of deriving a location of a single point, the calculated position estimation will vary inside of either an area (2D) or a volume (3D) the dimensions of which depend on the reader to items distance and/or angle estimation errors.

Distance estimation could be done using time of flight techniques (RF, optical, Ultrasound etc), measurement of received signal strength (RSSI) or any other relevant technique.

Angle estimation is usually based on reception of a signal by several antennas and estimation of the received signal angle by comparing the signal phase of each of the different antennas. The main disadvantage of that approach is the space required between the different antennas, causing the reader size to increase Single Mobile Reader Concept The approach described below enable the use of a single, small & mobile reader in order to estimate the position of an item. Being small and mobile—this reader implementation is suitable for integration as part of, or working alongside mobile instruments such as a mobile smart phone etc. The position estimation of the item (distance and angle) is given relative to the mobile reader The concept of operation is to perform several distance measurements over time, while tracking the movement trajectory of the reader. This way the reader gets distance estimations to the item from several different locations. As the reader knows the relative position of the measurement locations and assuming the item is stationary within the measurements period, the reader can generate an estimation of the range and angle of the item, relative to the reader location after a minimum of 3 consecutive distance estimations.

Figure 30:
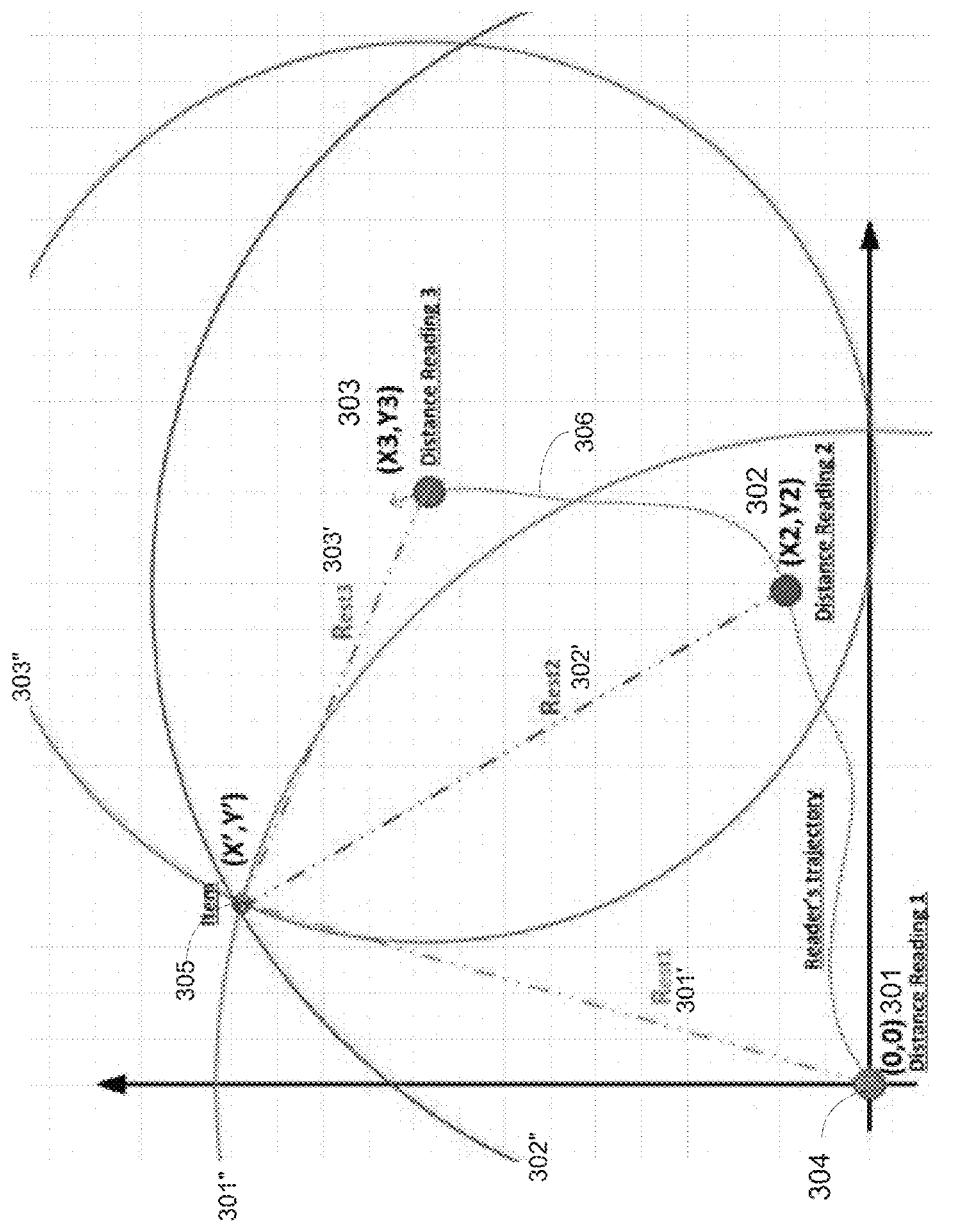
FIG. 30 illustrates various distance measurements and a path of a wireless tag according to an embodiment of the invention.

FIG. 30 illustrates the process—the location (301) of the first distance measurement is marked as the origin. After that the reader 304 is moving (from first location 301 to second location 302, and its trajectory 306 is tracked. The reader performs additional distance measurements over time. Using the tracked trajectory, the reader can then map the locations of the distance measurements—(X1,Y1)=(0,0), (X2,Y2), (X3,Y3) and potentially more (Xn,Yn). Per each measurement position the reader measures the distance Rest(n).

The crossing of the circles 301" (first measurement), 302" (second measurement) and 303" (third measurement) with Radius Rest(n) 301', 302' and 303' and center locations (Xn,Yn) is the estimated position of the item (X',Y'). Since the Cartesian system illustrated is determined by the initial reader position and initial movement direction the estimated location of the item is relative to the reader's position(s).

If one wants to show on a screen the estimated direction of the item relative to the reader, the orientation of the screen or the user relative to the first reading needs to be tracked as well over the movement trajectory.

The estimation could use 3 or more measurement positions. More positions may result in better accuracy but also in higher computation so the system can "reset" the origin every once in a while or move a "sliding window" of positions, using a constant number of positions while older ones are being discarded as new measurement are being done. Measurements could be weighted according to a quality metric, outliers could be completely discarded Tracking the Movement Trajectory and Orientation In order to track the movement trajectory of the reader, it may use common sensors (inertial and others) such as gyroscopes, accelerometers, E-compass and others. Those sensors are commonly use in smartphones and other "smart devices". If the reader resides inside a smart phone or a smart device (like a notebook or a tablet etc) it may use them directly, if it is external, and moves alongside the smart device it may get the information from the smart device. Another option is for the reader to track its absolute location using RTLS system or GPS system or a location based on communication with Wifi AP (fingerprinting, ToF, RSSI etc) or similar, proximity based system or similar positioning system. On this case the reader uses as a hub or and extender enabling the estimation of the location of items that cannot communicate directly with that positioning system The reader may include, in addition the system described above, an antenna array enabling it to estimate the AoA (Angle of arrival). This could enhance the accuracy and speed of the "item" position estimation.

Depended on the item distance and user preference, the reader may give a rough estimate of angle and distance (for example, 90 degrees granularity, or 45 degrees granularity etc), in order to make the information simpler for user to understand. This can be done no by real triangulation but by identifying the change in measured distance vs. the distance the reader traveled (example—if the reader move 1 m and the measured distance reduces by 1 m, the item is straight ahead)

Figure 43:
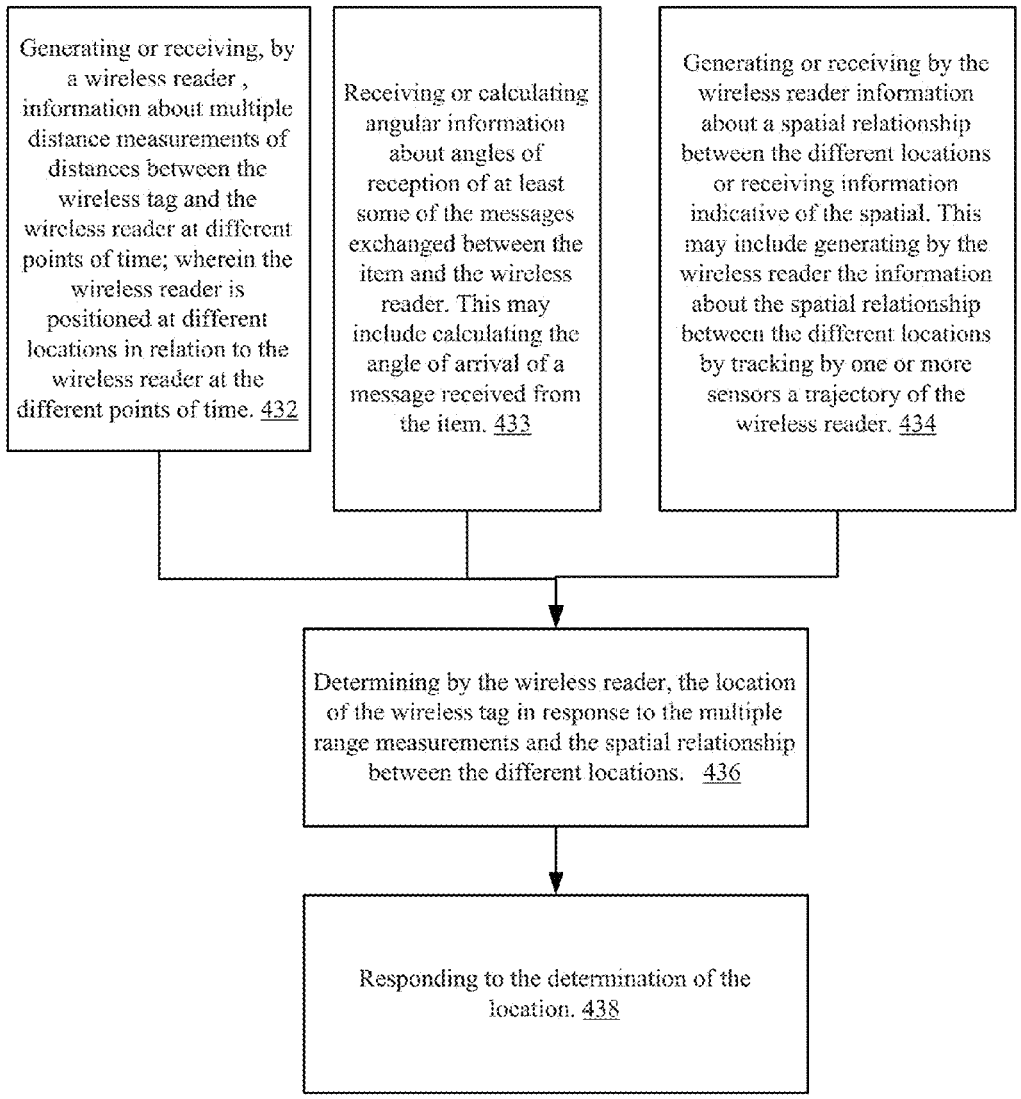

FIG. 43 illustrates method 430 according to an embodiment of the invention.

Method 430 is for determining a location of a wireless tag.

Method 430 may start by stages 432 and 434. It may also include stage 433.

Stage 431 includes generating or receiving, by a wireless reader, information about multiple distance measurements of distances between the wireless tag and the wireless reader at different points of time; wherein the wireless reader is positioned at different locations in relation to the wireless reader at the different points of time.

The different points in time may be selected out of a larger group of points in time. For example—the different points in time may be included in a time window and wherein the method may include ignoring distance measurements obtained outside the time window. The time window may be a sliding time window.

Stage 433 (dashed box) may include receiving or calculating angular information about angles of reception of at least some of the messages exchanged between the item and the wireless reader. This may include calculating the angle of arrival of a message received from the item.

Stage 433 may include receiving the message by antennas of an antenna array of the wireless reader.

Stage 434 includes generating or receiving by the wireless reader information about a spatial relationship between the different locations or receiving information indicative of the spatial. This stage may include generating by the wireless reader the information about the spatial relationship between the different locations by tracking by one or more sensors a trajectory of the wireless reader.

Stages 432, 433 and 434 may be followed by stage 436 of determining by the wireless reader, the location of the wireless tag in response to the multiple range measurements and the spatial relationship between the different locations. If stage 433 is executed than stage 436 may be responsive the angular information.

The location of the wireless tag can be a relative location (distance from wireless reader, direction to the wireless reader) or an absolute location (exact location, coordinates).

This stage may include assigning the same weight or different weights to different distance measurements. The weights (same or different from each other) may be according to a criterion like: RSSI, estimated SNR, complexity of an estimated channel response (number and/or order of reflections).

Stage 436 may be followed by stage 438 of responding to the determination of the location.

Stage 438 may include at least one out of: (i) Generating by the wireless reader location information about the location of the wireless tag; (ii) displaying on a display an indication about the location of the wireless tag, wherein the displaying is responsive to the information about the location of the wireless tag and an orientation of the display; (iii) providing a rough estimate of a location of the item based upon a spatial relationship between a subset of the different locations.

PGA and Solving Location Ambiguities

There is provided a Tags-and-Phone-only or "reader-less" system that is using tags for triangulation. The user does not need to carry anything but a regular smartphone (that is BLE or "BLE+" enabled phone). The function of establishing the distance and direction between the phone and each tag is embedded in the tag's network that is being created Ad-hoc. As long as 3 tags are static, the user may use them as triangulation points Reader-less System Structure using Ad-Hoc Tags' network.

The approach described below enable the use of a reader-less system. The system is built of a mobile phone that has a BLE/BLE+ connection and a minimal set of tags (4 or more). Optionally, A single (or few) Super-tag(s) may as well be a part of the system. Assuming such super-tag exists, the system functionality may be enhanced.

Figure 31:
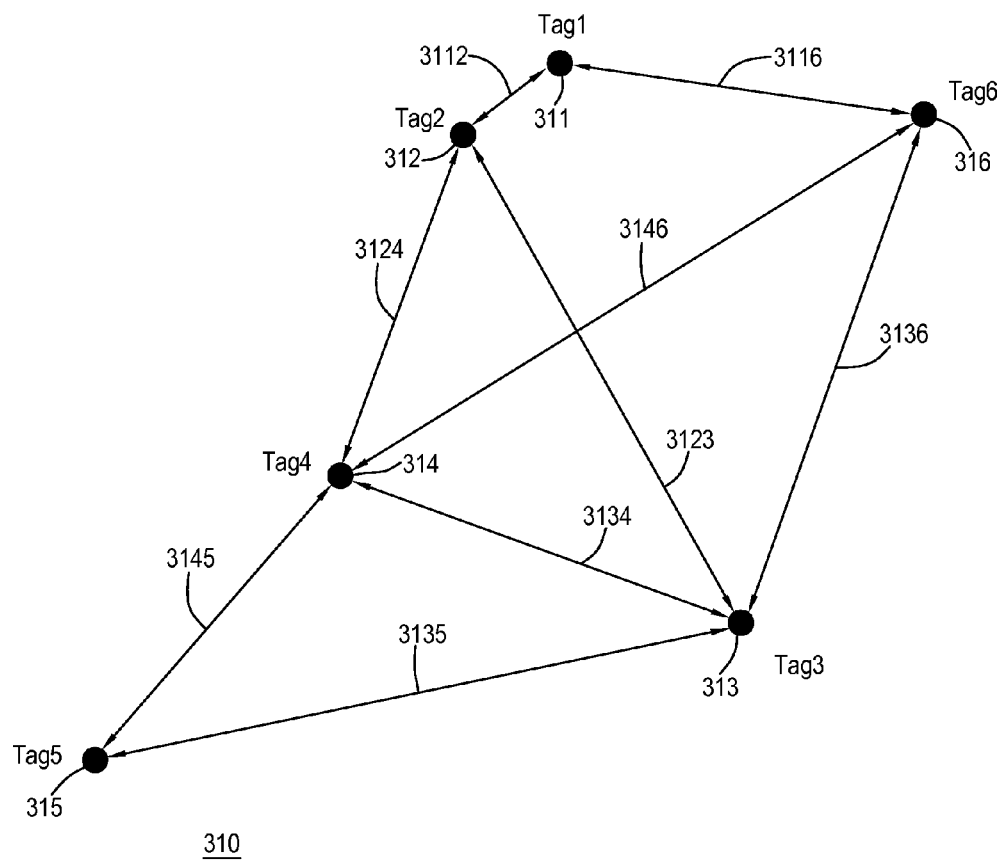
FIGS. 31-35 illustrate maps of wireless tags according to various embodiments of the invention.

Tags are used to locate and identify items that the user wishes to track. They can be located while attached to the user belongings (like purse, wallet, notebook, cloths etc.). There are no requirements for specific positions of tags. The concept of operation is to perform classical triangulation between tags' triplexes subsets of the tags network within a certain location. Once the user wants to locate an item, or once the system wants to log the status of the tags, all tags are woken up (either by the phone, or by a timed event of the tag network itself). A mesh network is created and the distance between each tag and few (4-5) other tags is measured. The process is repeated until all tags in the network have at least 3 or 4 distance measurements from other tags and the measurement data is sent to either the phone or a specific tag or a processing unit or a storage unit for a later processing. Using the connected triangles created by those measurements, a 3D estimated structure (or map) of the tags' locations can be generated. A 2D illustration is shown in FIG. 31 (only few distance measurements are shown). FIG. 31 illustrates first till sixth tags 311-316 and distances 3112, 3116, 3123, 3124, 3134, 3135, 3136, 3145 and 3146, wherein distance 31xy indicates the distance between tag x to tag y—for example distance 3112 is the distance between tags 1 and 2.

As generally there are no tags with pre-known location, the structure orientation has 3D tilt and elevation ambiguity that need to be resolved. In addition, if the user is around the area of the tags, there is a need to show the location of the user within the area of the tags.

Solving Orientation Ambiguity—Use of User Tag

Solving the orientation ambiguity can be done in several ways. This section covers the case where the user carries a tag. The carried tag is not unique in any way, and behaves as any other tag. The only requirement is for the tag to move with the user and for the system to become aware that this is the "user tag". It is also assumes that the user carries a phone, uses the phone's screen and the system has access to the phone IMU sub-system (accelerometers, gyro meters, compass etc., if those exist). Once the initial tag map is generated (and the user's tag is one of the tags in this map) the user starts moving (the system can either guides him to move or just wait for him to move).

After certain movement, the map is regenerated by repeating the process described above. If the tags (other than the user tag) are static, the system has enough information to create a map of a subset includes 4 of the tags, including the user tag. Crossing the two maps (only user tag is moving) with the information coming from the phone compass can solve the ambiguity, to the level of radial symmetry around the movement path. If the user now moves in a somewhat different direction, (i.e. on a direction other than a straight line continuation of the first movement) then the level of ambiguity further decreases to binary symmetry relative to the surface define by the trajectory of the user movements.

Generally, two non-identical movements will solve the ambiguity on 2D system and 3 non-identical movements will solve it for 3D system. This way static (for the period of the measurement) tags, serve as ad-hoc reference points for the triangulation. There are scenarios, where additional information is knows and fewer movements are required. Once the orientation is solved, the system can generate a vector for the user (direction and range) to any desired tag.

Figure 32:
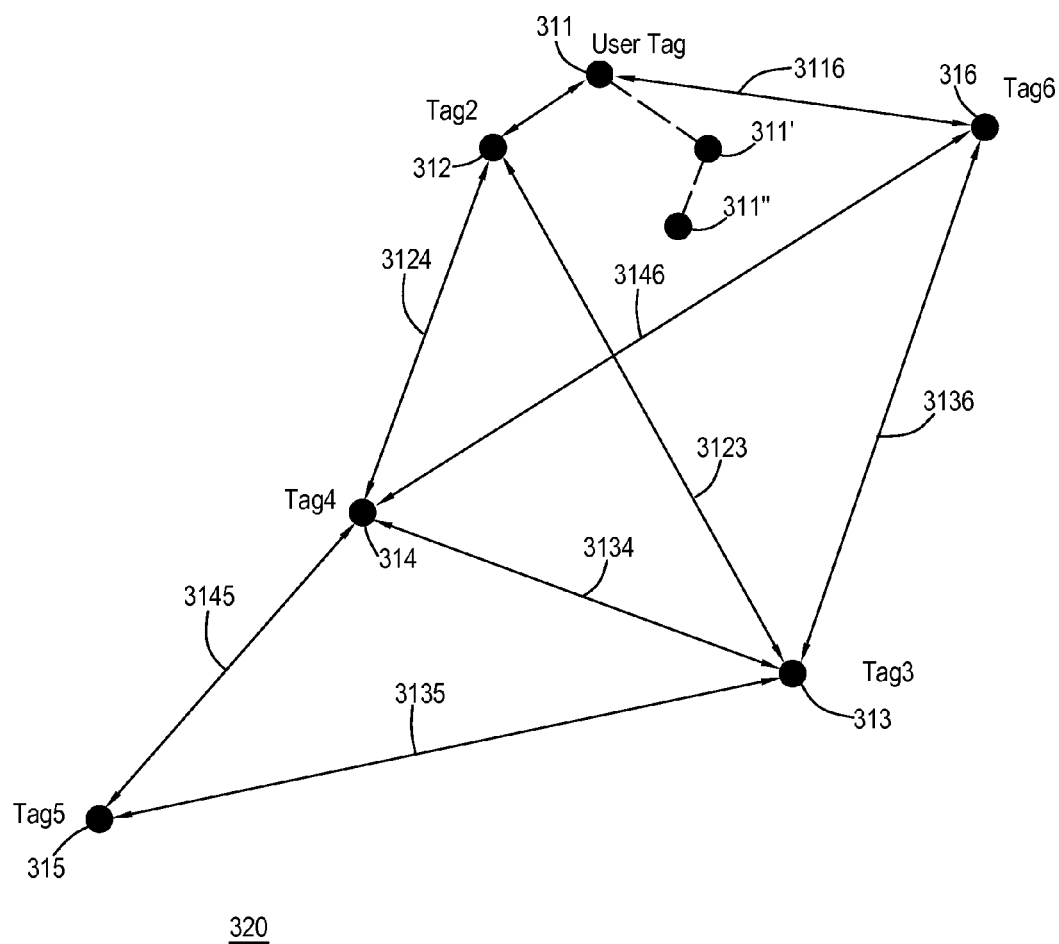

FIG. 32 illustrates that tag 1 311 is moves to a second location 311' and a third location 311" and in each location distance measurements are made—updating distance 3112 between tag1 and tag 2 and distance 3116 between tag 1 and tag 6. In addition to following the movements of tag 1—thus allowing determining the orientation of the map illustrated in FIG. 31.

Solving Orientation Ambiguity—Pattern Matching with Prior Knowledge

To the left, there is a baseline tag map that was generated with its orientation at a certain time. If the user wishes to repeat the process at a later stage, the system repeats the initial stage generating the map without solving the orientation. This is shown on the right diagram. As can be seen, tag 1 is missing on this case (for example, it is out of range) and tag 6 has moved since the previous procedure.

Figure 33:
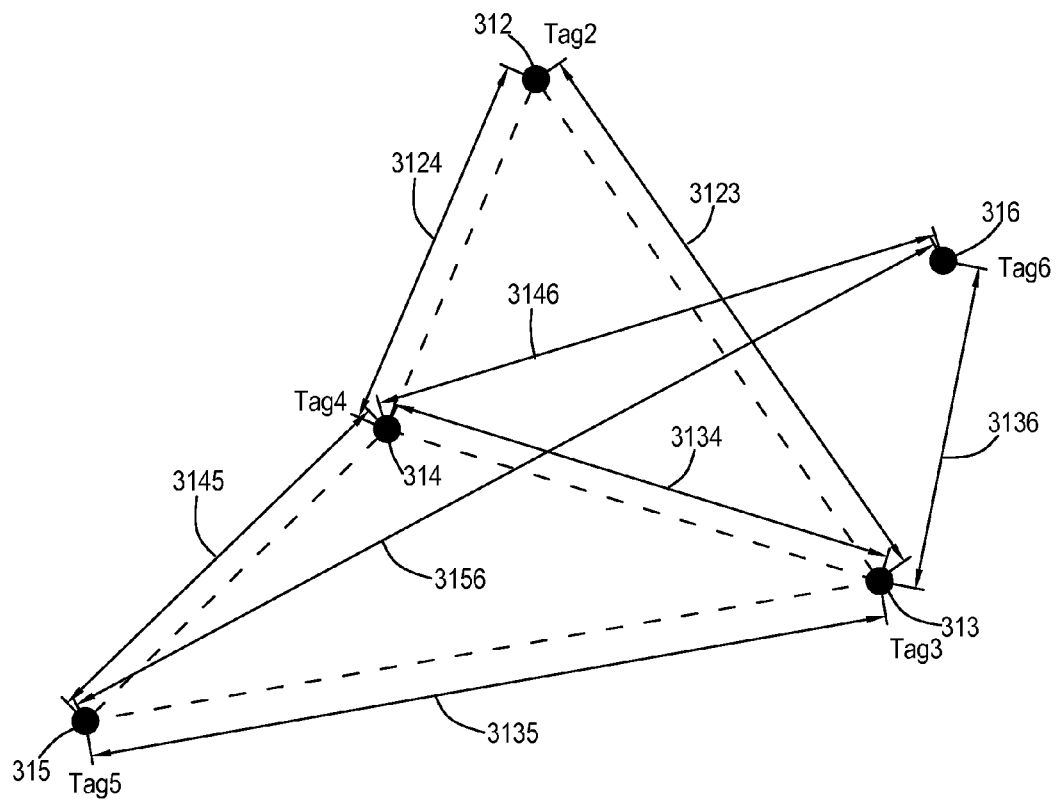

Accordingly—in FIG. 33 there are no distances 3112 and 3116 and distances 3336, 3346 and 3356—between tag 6 and tags 3, 4 and 5 respectively have been added or updated. Nevertheless, the distances 3123, 3124, 3134, 3145 and 3135 remain the same and can allow As the identity of the tags involved in the process is known to the system. It can compare the current structure with the previous one, looking for matching of patterns (distances 3123, 3124, 3134, 3145 and 3135 between tags 2,3,4 and 5). If it finds a matching pattern of subset of tags, it can simply use the orientation of the subset as it was solved last time (assuming that the orientation of the map of FIG. 31 was solved). In this example, tags 2,3,4,5 have not moved since the previous procedure. The system can identify this pattern and use the known orientation of the subset for the entire generated structure. Hence, in this case the ambiguity is known and need not be solved.

Figure 46:
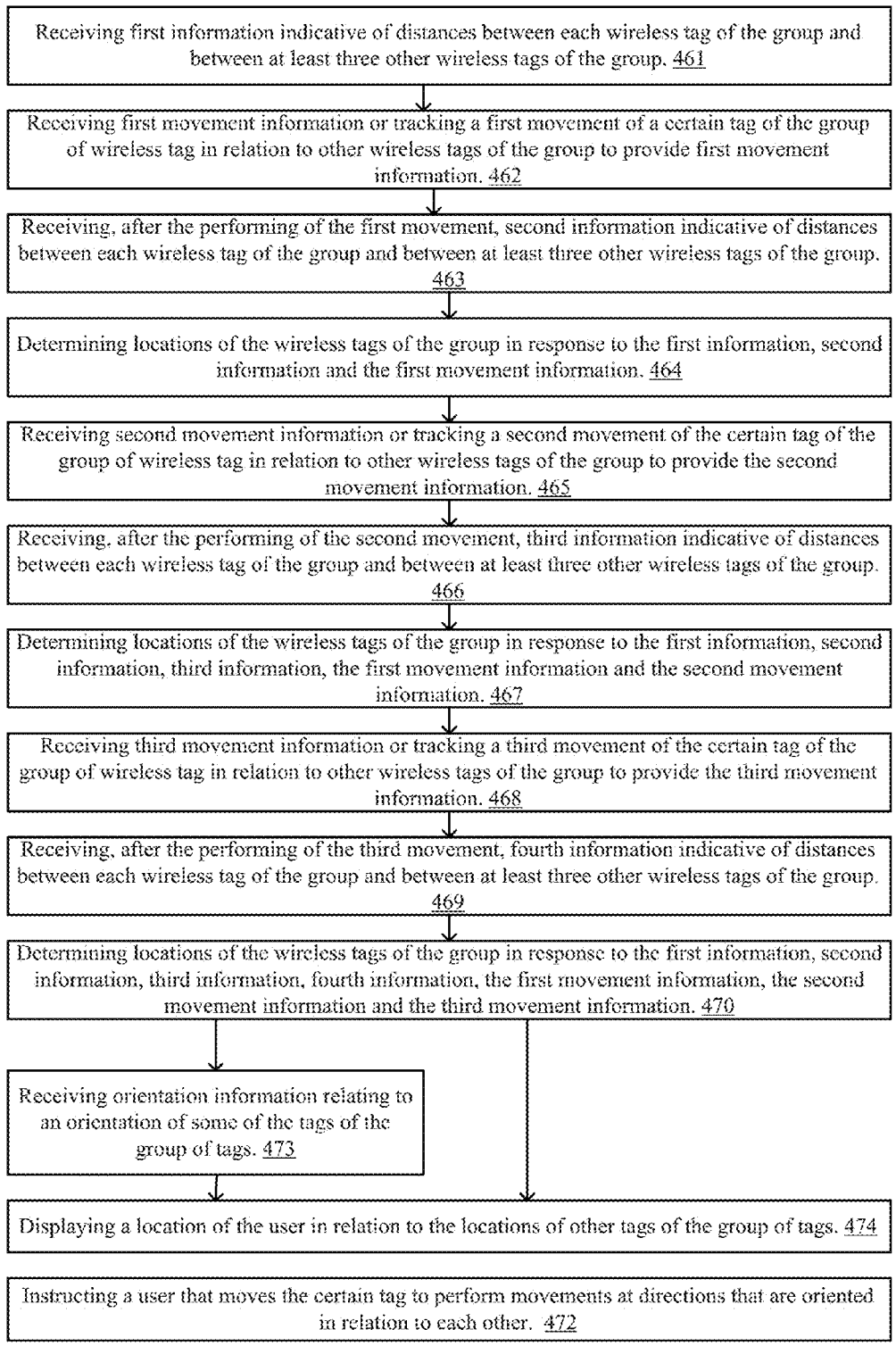

FIG. 46 illustrates method 460 according to an embodiment of the invention.

Method 460 is for determining a location of a group of wireless tags.

Method 460 includes multiple decision stages (stages 464, 467 and 471). It is noted that the method can include only one decision stages, some decision stages or all.

Method 460 may start by stage 461.

Stage 461 may include receiving first information indicative of distances between each wireless tag of the group and between at least three other wireless tags of the group.

Stage 461 may be followed by stage 462 of receiving first movement information or tracking a first movement of a certain tag of the group of wireless tag in relation to other wireless tags of the group to provide first movement information.

Stage 462 may be followed by stage 463 of receiving, after the performing of the first movement, second information indicative of distances between each wireless tag of the group and between at least three other wireless tags of the group.

Stage 463 may be followed by stage 464 of determining locations of the wireless tags of the group in response to the first information, second information and the first movement information.

Stage 464 may be followed by stage 465 of receiving second movement information or tracking a second movement of the certain tag of the group of wireless tag in relation to other wireless tags of the group to provide the second movement information.

Stage 465 may be followed by stage 466 of receiving, after the performing of the second movement, third information indicative of distances between each wireless tag of the group and between at least three other wireless tags of the group.

Stage 465 and 466 may be followed by stage 467 of determining locations of the wireless tags of the group in response to the first information, second information, third information, the first movement information and the second movement information.

Stage 467 may be followed by stage 468 of receiving third movement information or tracking a third movement of the certain tag of the group of wireless tag in relation to other wireless tags of the group to provide the third movement information.

Stage 468 may be followed by stage 469 of receiving, after the performing of the third movement, fourth information indicative of distances between each wireless tag of the group and between at least three other wireless tags of the group.

Stage 469 may be followed by stage 470 of determining locations of the wireless tags of the group in response to the first information, second information, third information, fourth information, the first movement information, the second movement information and the third movement information.

Method 460 may include stage 472 of instructing a user that moves the certain tag to perform movements at directions that are oriented in relation to each other. The user can follow the instructions so that the first, second and third movements are not along a same line.

Method 450 may include stage 473 of receiving orientation information relating to an orientation of some of the tags of the group of tags. Stage 473 may be followed by any one of stages 464, 467 and 471—and in this case these determinations will be further responsive to the orientation information.

The locations of the tags in the group can be absolute or relative location (for example relative to the user device).

The certain tag can be attached to a user or to a user device carried by the user. Method 460 may include stage 474 of displaying a location of the user in relation to the locations of other tags of the group of tags.

The user device may estimate its location based upon an exchange of signals between some tags of the group and the user device (that does not belong to the group).

Generating a Map with No User Tag

Figure 34:
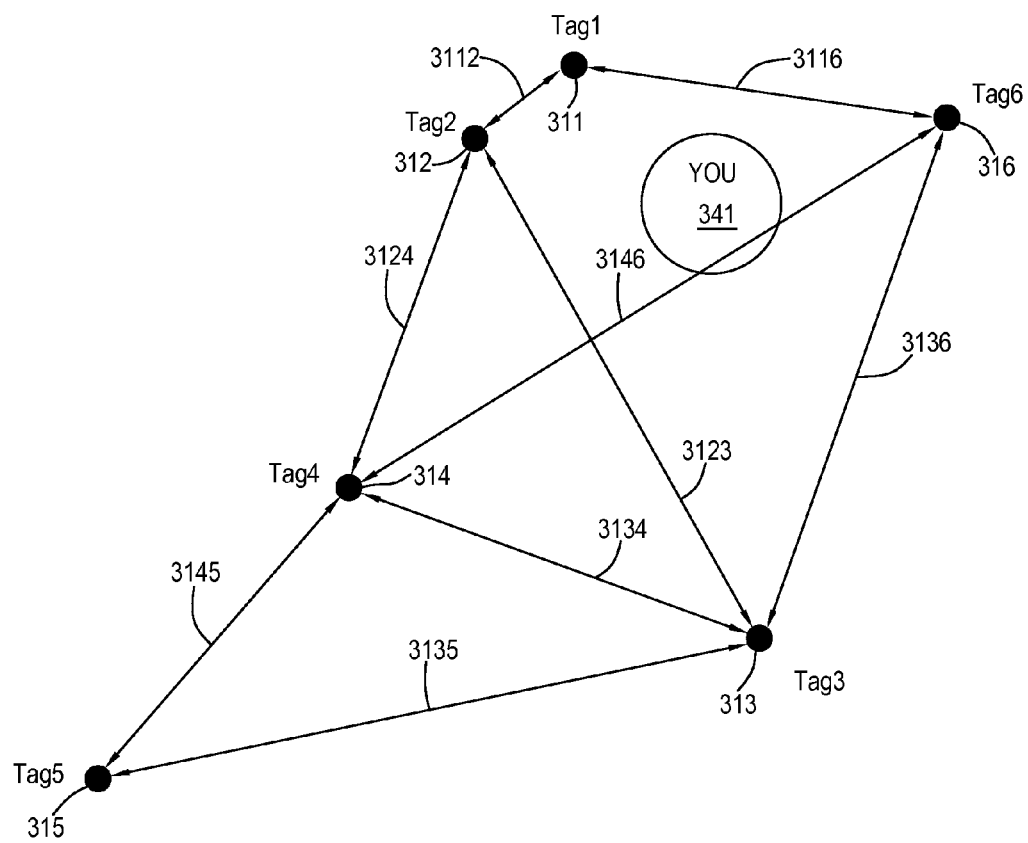

In this case, the user doesn't carry a tag but he carries a user device such as a smartphone that is capable of performing location measurements based on RSSI, or other locations based methods. Initiation of the tags' map generation is done as before, but in order to estimate the location of the user within the tags map (FIG. 34 illustrates map 310—including tags 1-6 301-306 and distances between the tags) and a user location indicator 341. The user device uses RSSI (Received Signal Strength Indication) information of BLE beacons or advertising, transmitted by the tags 301-306. By measuring RSSI information from all tags within range, and by knowing the relating positions of the tags in the map (this map is fed to the user device), an estimation of the location of the user device (phone) within the tags' map can be generated. As RSSI is less accurate, it is likely that the estimation will not be as good as the one with a user tag. Orientation can be solved with pattern matching or with movement, as described before.

The Case of Compact Grid of Tags

Figure 35:
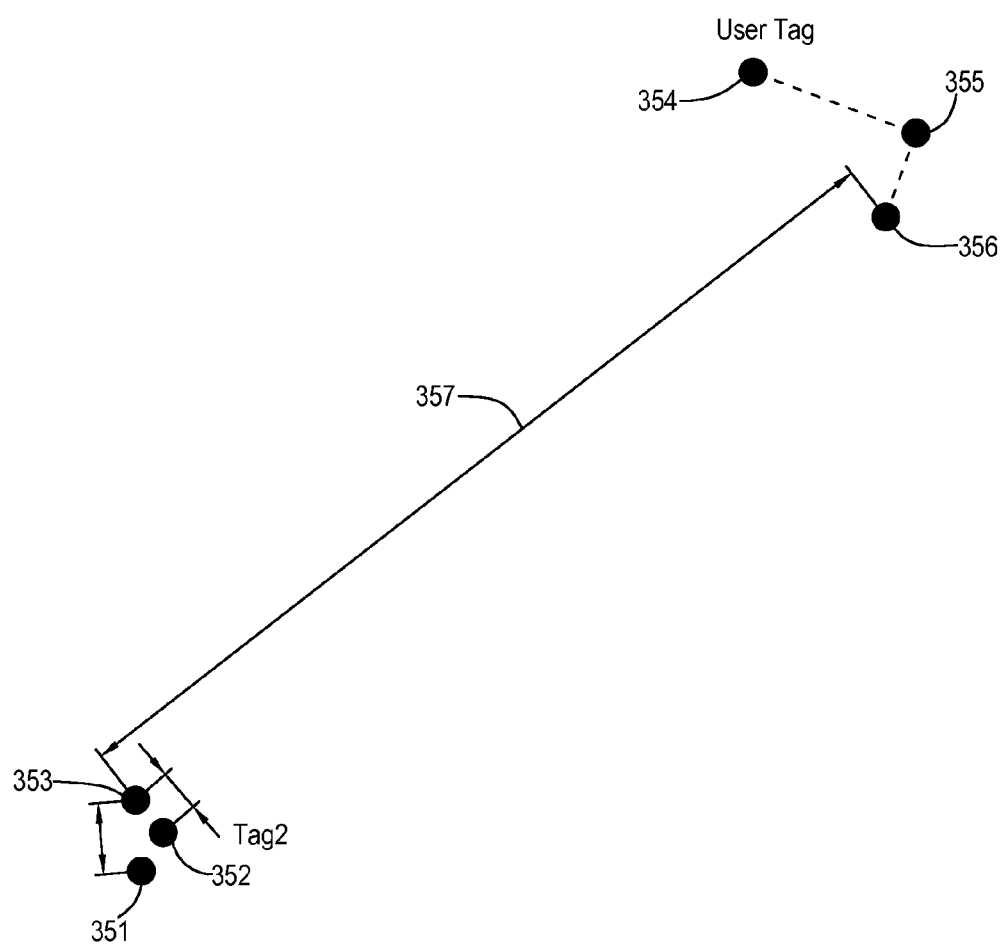

The system should provide a solution also to the case where there are only 2 tags (one is a user tag and another is a tagged item) or few tags that are packed together (for example, all items are inside a bag). In this case, where the distance between the tags is in the same order of magnitude of the range estimation error and/or the distance between the tags could be considered a single tag for the purpose of mapping. This scenario is described in FIG. 35—a triplet of tags 351, 352 and 353 are close to each other and stationary. A user tag moves between locations 354, 355 and 356. Assuming the user is carrying a tag with him, this scenario could be resolve using the approach described in the paper "Single Reader Concept", U.S. Provisional Patent Application No. 61/832,872, filing date 9 Jun. 2013.

The system will periodically measure the distance between the user tag and the other tag(s), and send this information to the phone over BLE channel. Using the IMU subsystem of the phone, the phone will track the movement path of the user and will perform triangulation over time as described in the paper (in this case the phone performs the computation and not a separate "reader")

Communication Concepts and System States

Each tag has a BLE (Bluetooth low energy) and BLE+ (a proprietary, enhanced communication protocol) subsystem and a range measurement subsystem. BLE is used for communication of phone with tags and BLE+ or BLE is used for tag to tag communication. The range measurements system is based either on UWB (IEEE802.15.4a) or any other accurate range measurement method. If the ranging technology is capable of supporting also data transfer (like IEEE802.15.4 for example), communication between tags could be done also using the ranging technology.

Waking up all tags is done by the phone using BLE. Alternatively, the phone can wake up a single tag using BLE and let is wake up the rest of the tags using BLE+. There is also an option to wake up in a mesh scheme while tags are waking up and communicating with other tags which are not necessarily within the communication range of the phone.

Once the system is awake, the phone can initiate the creation of the tags' map. Communication between the tags' mesh can be either done by BLE+ or by the ranging technology, if supported. Range measurements are being performed (generally between each tags pair, alternatively in a scheme ensuring each tag has 4 range measurements), and those measurements are being sent over the communication link (BLE+ or the ranking technology) to a tag (or few tags) communicating with the phone using BLE. The calculations are then made by the phone.

The system can also be initiated without the phone/user using a time driven event or another event. In this case the measurement data is stored in the tags or sent to an aggregator connected to the cloud or to a storage unit or a processing unit, if such exists.

The use of Super-Tag
  a. A Super-Tag is assumed to be static, with a known location to the user or to the system.
  b. It is assumed to have large or rechargeable battery or be connected to power supply or harvesting etc.
  c. Its known position helps the user understand the diagram.
  d. It can serve as a BLE to BLE+ bridge for tag wake up: phone connects to the super-tag only using BLE, super tag wakes up the tags using BLE+ and then the phone connects to the tags directly using BLE. This is useful, power consumption wise for sleep mode (another issue with BLE/BLE+ is Sphere)
  e. It can also serve as a Wifi to bridge. This means the user can access the tag network from anywhere (through a server service) to generate the above diagram which will be sent back to the phone (actually the raw measurements are sent, the diagram is generated by the location engine in the application).

Sphere Using Ad-Hoc Tags' Network

A sphere is a set of tags that the user wishes to keep with him/her i.e. continuously monitor their existence in the immediate vicinity. The system periodically generates communication to all "kept" tags. In case a tagged item is forgotten or lost, the communication to its tag is lost and as a result a lost event is generated and the user is notified. BLE supports such functionality using proximity profile, but the functionality is limited because of high power consumption and the limited number of tags that can be supported concurrently.

The approach described here eliminates those limitations. The idea is to create a BLE+ network or mesh (with minimum number of 2 tags) that tracks the existence of all members of the mesh. The phone is being notified through BLE communication only once a "lost item" event is identified. In addition, the phone can get an OK update on a very low duty cycle. An example for such operation: the tags are initiated using BLE, or a specific tag is initiated and then initiates the other tags using BLE+.

Figure 36:
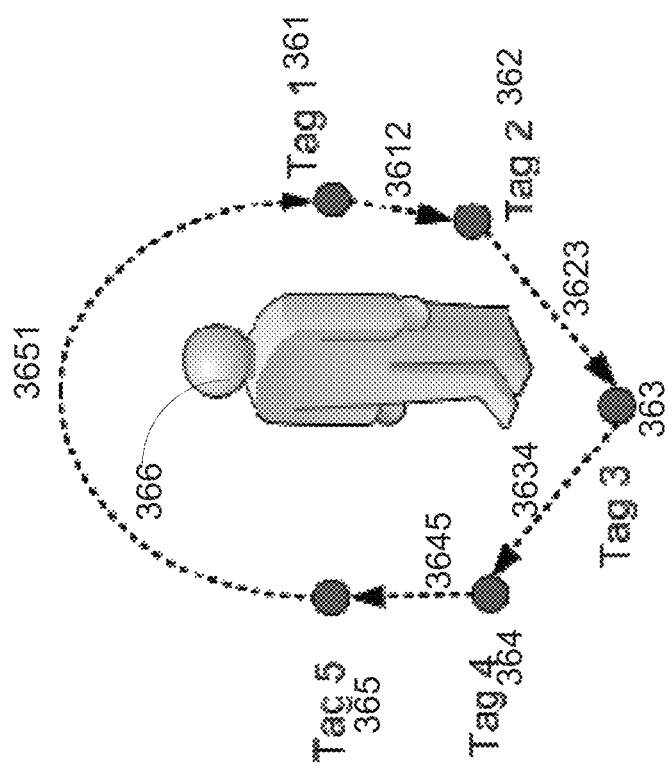
FIGS. 36-37 illustrate a sphere of wireless tag according to various embodiments of the invention.

The concept is to create a self-contained network chain which periodically checks and validates the existence of all tags in the chain. The FIG. 36 illustrates a user 366 and six tags 361-366 that (with or without a user attached tag—not shown) for a sphere. Each period, a token 3612 is being delivered from tag 1 361 to tag 2 362, a token 3623 is being delivered from tag 2 362 to tag 3 363, a token 3634 is being delivered from tag 3 363 to tag 4 364, a token 3645 is being delivered from tag 4 364 to tag 5 365, and a token 3651 is being delivered from tag 5 365 to tag 1 361—thus closing a loop.

Figure 37:
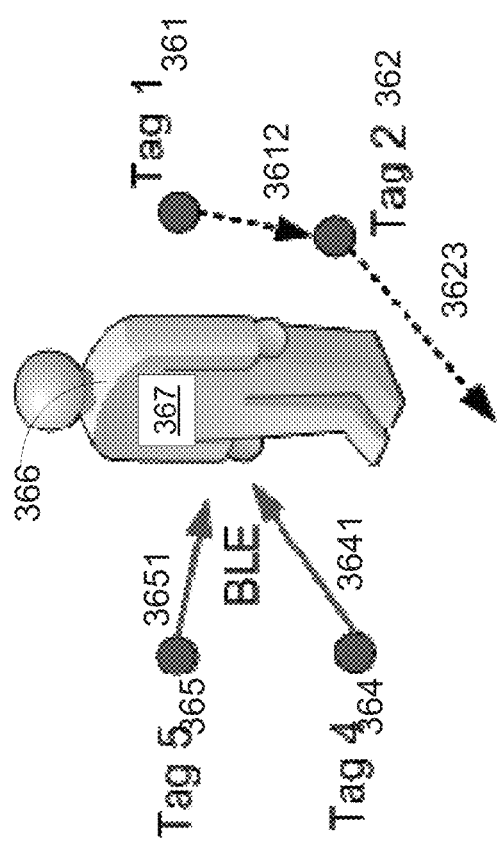

As the tags expect the reception of the token every period, if a timeout passes without reception, all tags which have not received the token starts initiating BLE transmissions (advertising) to the phone. By identifying the advertising tags the phone can identify the lost item. In FIG. 37, tag 3 363 is lost, the chain is broken and tags 364 and 355 initiate BLE communication 3641 and 3651 to the user device 367.

The weakness of the system if a scenario where all items are lost at once (no tag can trigger the phone). One solution is to carry one tag on the phone or on the user. So the scenario cannot take place. Alternatively, the phone can get, on a low duty cycle, an "OK" BLE advertising message from the tags, just to verify the chain is there. In order to balance power consumption the advertising will be done by another tag each time. This will not generate an immediate trigger but will trigger the user eventually. Such a scenario (all tags are lost at once) can also happen in the phone itself is lost. So in case no lost even occur and chain existence message is lost, after no response from the user the phone will assume.

Figure 44:
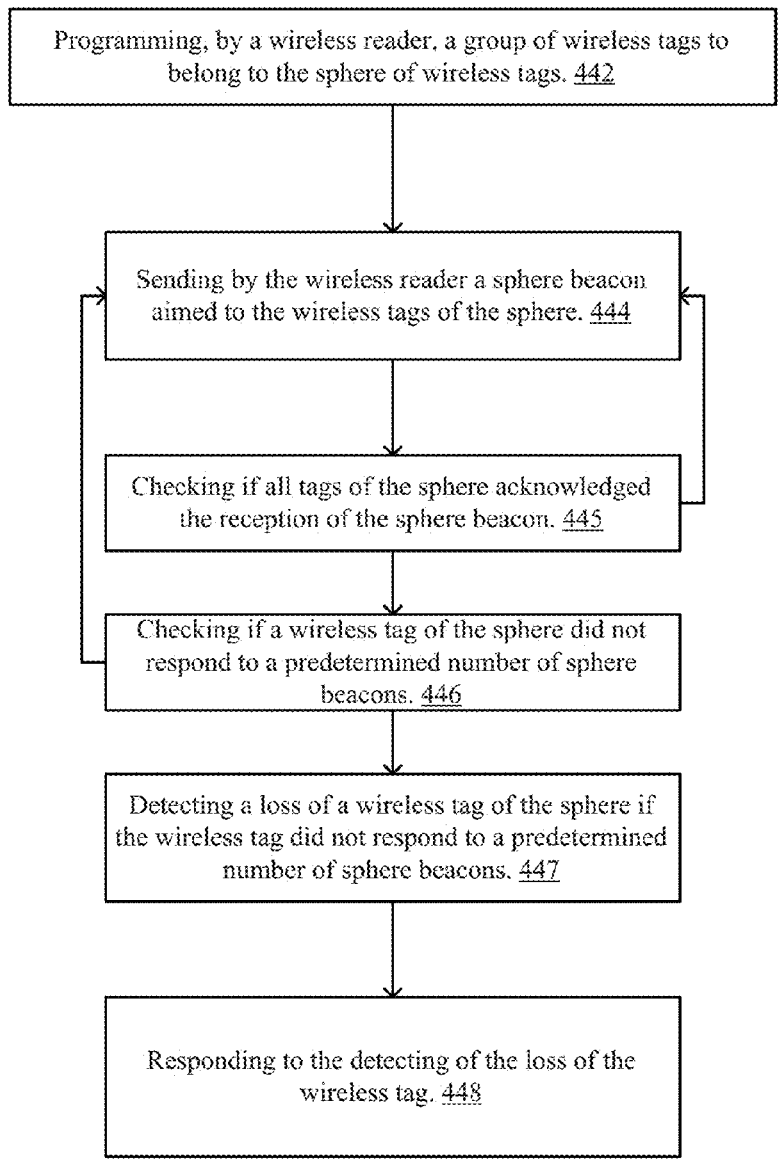

FIG. 44 illustrates method 440 according to an embodiment of the invention.

Method 440 is for managing a sphere of wireless tags.

Method 440 may start by stage 442 of programming, by a wireless reader, a group of wireless tags to belong to the sphere of wireless tags.

Stage 442 may include programming each wireless tag of the sphere to increase a wireless tag reception window for detecting a sphere beacon after the wireless tag failed to receive a predefined number of sphere beacons.

Stage 442 may include programming the wireless tags of the sphere to enter a first operational mode during reception window s that correspond to expected timing of transmission of the sphere beacons and to enter a second operational mode after responding to the sphere beacons, wherein the second operational mode is characterized by a lower power consumption than the first operational mode.

Stage 442 may include calculating or receiving information about distances between the wireless reader and multiple wireless tags; and selecting the wireless tags of the sphere out of the multiple wireless tags to be within a predetermined distance from the wireless tag.

Stage 442 may include programming the wireless tags to belong to the sphere only during predetermined time periods.

Stage 442 may include instructing a wireless tag to transmit wireless tag identification information even without receiving beacon messages aimed to the wireless tag.

Stage 442 may be followed by multiple repetitions of a sequence that includes stages 444, 445, 446 and 448.

Stage 444 may include sending by the wireless reader a sphere beacon aimed to the wireless tags of the sphere.

The repetition of stage 444 may cause sphere beacons to be transmitted according to a predetermined schedule, be responsive to events and the like. It may include periodical transmission of sphere beacons.

Stage 445 includes checking if all tags of the sphere acknowledged the reception of the sphere beacon.

If the answer is yes—jumping to stage 444.

If the answer is no—jumping to stage 446 of checking if a wireless tag of the sphere did not respond to a predetermined number of sphere beacons.

If the answer is no—jumping to stage 444.

If the answer is yes—jumping to stage 447 of .detecting a loss of a wireless tag of the sphere if the wireless tag did not respond to a predetermined number of sphere beacons.

Stage 445 is followed by stage 448 of responding to the detecting of the loss of the wireless tag.

FIG. 45 illustrates method 450 according to an embodiment of the invention.

Method 450 is for operating a wireless tag that belongs to a sphere of wireless tags.

Method 450 may start by stage 452 of participating in multiple sphere check cycles; and operating at an energy saving mode between the multiple sphere check cycles.

A participation of the wireless tag in a sphere check cycle of the multiple sphere check cycles may include: (i) searching (453), by the wireless tag and during a time window, for a preceding wireless tag token from a preceding wireless tag; and transmitting (454), by the wireless tag, a lack of reception indication indicative of a failure to receive the preceding wireless tag token during the time window.

The participation may also include transmitting (455) a wireless tag token by the wireless tag and to a next wireless tag. The wireless tag token transmitted by the wireless tag is treated as a preceding wireless tag token by the next wireless tag. The transmitting of the tag token can be executed (a) only if receiving the preceding wireless tag token; (b) only if not receiving the preceding wireless tag token, or (c) regardless of a reception of the preceding wireless tag token The participation may also include transmitting (456) by the wireless tag an acknowledgement message in response to each reception (or multiple receptions) of the preceding wireless tag token.

Hybrid Mode of Operation

According to an embodiment of the invention there may be provided a hybrid operation solution. This communication and location Hybrid solution combines a narrowband and wideband communication methods in order to leverage the advantages of each of those methods while minimizing the impact of the disadvantages of those methods. The hybrid solution is designed to serve as the infrastructure for "internet of things" where "things" can economically, long lasting and economically—communicate with each other and—offering combination of ease of communication combined with accurate location.

The concept is applicable to any wireless system that involves indoor ranging (distance, direction or location measurement). The wideband signal is being used in order to achieve good spatial resolution even in real life scenarios which usually involve reflections or multiple responses. Generally communication between network elements could be divided to two types
 a. General communication: in this state there is a wireless communication between different elements of the network (two or more) which does not involve ranging. For example: association, transfer of data etc.
 b. Ranging: In this state there is a ranging and possibly direction estimation effort which is active between two or more elements.

Many ranging and location systems make use wideband signals (for example pulse UWB) which impose several challenges on the system. For example: power consumption could be higher compared to narrow band schemes. In addition, it is difficult and time consuming to synchronized a very narrow signal in time. (like a pulse UWB signal)

A hybrid solution includes both wideband as well as narrow band transceiver (this could be implemented as two operation modes of the same transceiver).

The approach suggested is to use common narrow band communication methods (as an examples: Bluetooth, Zigbee etc) and have a narrow band transceiver or transceiver's narrow band operation mode for:
 a. All "general communication" modes which do not involve accurate ranging estimation;
 b. Rough Ranging estimation
 c. Set up of the link prior to ranging measurement, and transfer data between nodes after and during the ranging measurement.

Figure 38:
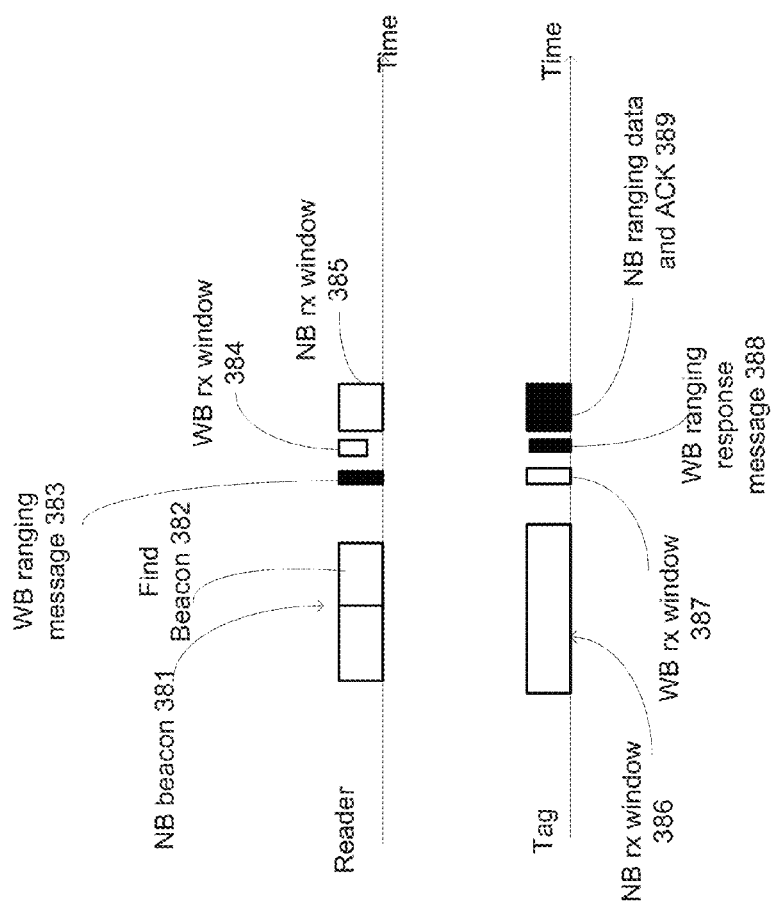
FIG. 38 is a timing diagrams according to an embodiment of the invention.

The approach suggested in this paper is to use the wide band transceiver or transceiver's wideband operation mode for the ranging measurement itself only FIG. 38 provided an example of the hybrid operation. One node (wireless tag) initiates a connection aiming to perform a range/location measurement to another node using a ranging signal and time of flight (TOF) measurement of that signal. As mentioned, the process involves two kind of communication signal:
 a. "Narrow band"—those are used for communication. An example could be Bluetooth, 802.15.4 ("Zigbee") etc
 b. "Wide band"—those are used for the ranging signal, leveraging the fact that wide band signal can achieve better spatial resolution—this could be pulse UWB, wideband WLAN signal (like 802.11n or 802.11ac) etc Ranging Process Description This initiating node (can be implemented as "reader") brings the other node (can be implemented as "Tag") or nodes to "ranging state" by sending an appropriate commands. This is done using narrowband scheme.

A ranging "beacon" 361 could be a narrow band (NB) signal which contains for example the following information:
 a. The node ID.
 b. RSSI information of the node reception—this helps the node calibrating its circuits for the ranging signal.
 c. Timing information (coarse) on when the initiating node (for example a "reader" will send the wideband (WB) ranging signal. By sending that information the other node (for example a "Tag") or nodes (for example "Tags") can open a very short reception window for the ranging signal, (resolution may be a fraction of a narrow band symbol length) reducing its power consumption and implementation complexity.
 d. Additional information that can help the other node(s).
 e. A command 382 to the tag to find a future transmitted wideband (WB) ranging message.

The ranging signal (WB ranging message 383) is a wide band signal which is sent at a fixed delay after the ranging beacon has been sent. It contains the following:
 a. It may contain an ID.
 b. It may contain a correlation sequence which is known to all participating nodes.

In FIG. 38 the tag receives the ranging beacon (NB beacon 381) and prepares its wide band circuitry to open a wideband reception window 387 to receive the WB ranging signal based on the ranging beacon parameters.

After successful correlation the tag sends back to the reader the same (or other) WB ranging signal (WB response message 388), which the reader (which opens a WB reception window 384) correlates. Following that, the tag sends a NB ranging data message (NB ranging data and ACK 389) that may include:
 a. Timing information from the tag that may contain—the tag processing time from correlation to ranging signal send completion.
 b. The estimation of the correlation time error.

c. The tag->reader->tag estimated flight time if a double two way TOA measurement is used.

d. A "Tag" ID as an Ack.

e. Additional data required by the "Reader".

Figure 42:
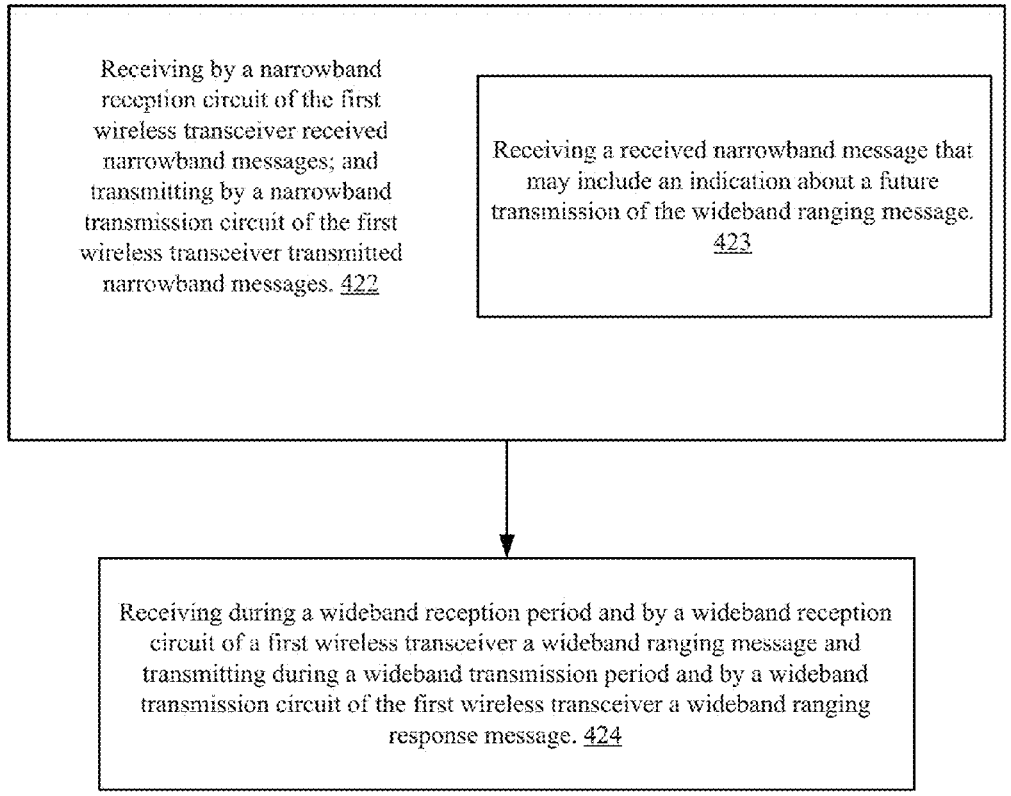

FIG. 42 illustrates method 420 according to an embodiment of the invention.

Method 420 is for hybrid operation of wireless transceivers.

Method 420 starts by stage 422 of receiving by a narrowband reception circuit of the first wireless transceiver received narrowband messages; and transmitting by a narrowband transmission circuit of the first wireless transceiver transmitted narrowband messages. Stage 422 may include maintaining wideband reception and/or transmission circuits in a low power mode (shut down, idle and the like).

Stage 422 may include stage 423 of receiving a received narrowband message that may include an indication about a future transmission of the wideband ranging message.

The indication may include timing information about timing of the wideband reception period.

The indication may include at least one wideband reception parameter associated with a reception of the wideband ranging message.

Stage 422 may be followed by stage 424 of receiving during a wideband reception period and by a wideband reception circuit of a first wireless transceiver a wideband ranging message and transmitting during a wideband transmission period and by a wideband transmission circuit of the first wireless transceiver a wideband ranging response message.

The transfer from stage 422 to stage 424 may occur after a predetermined delay period lapsed from the receiving of the received narrowband message that may include the indication about the future transmission of the wideband ranging message.

The wideband ranging response message may include timing information about a time difference between the receiving of the wideband ranging message and the transmitting of the wideband ranging response message.

The wideband ranging message may be transmitted by a second wireless transceiver and the wideband response message may include timing information about an estimated time difference between a transmission of the wideband ranging message by the second wireless transceiver and a reception of the wideband ranging response message by the second wireless transceiver.

Stage 424 may include causing the wideband reception circuit to search for the wideband ranging message within the wideband reception period that is defined in response to the indication.

Stage 424 may be followed by stage 422.

Indoor Navigation

The following text describes various embodiments of the invention for indoor navigation. For simplicity of explanation it is assumed that the indoor space is a store of a retailer.

The system locates the phone within the store, based only on received signal strength (RSSI) of few beacons (this method is sometimes called "RF fingerprint") by the phone and an auto-mapping procedure of the beaconing tags. Therefore, the user doesn't have to own any hardware beyond his smartphone and the store/retailer benefits from a very low cost of ownership, as there is no need for indoor mapping of the beacons. Standard implementation of similar systems suffers from inherent inaccuracy of RSSI method leading to an unreliable system. This solution mitigates that by a cellular approach, as described below.

Figure 39:
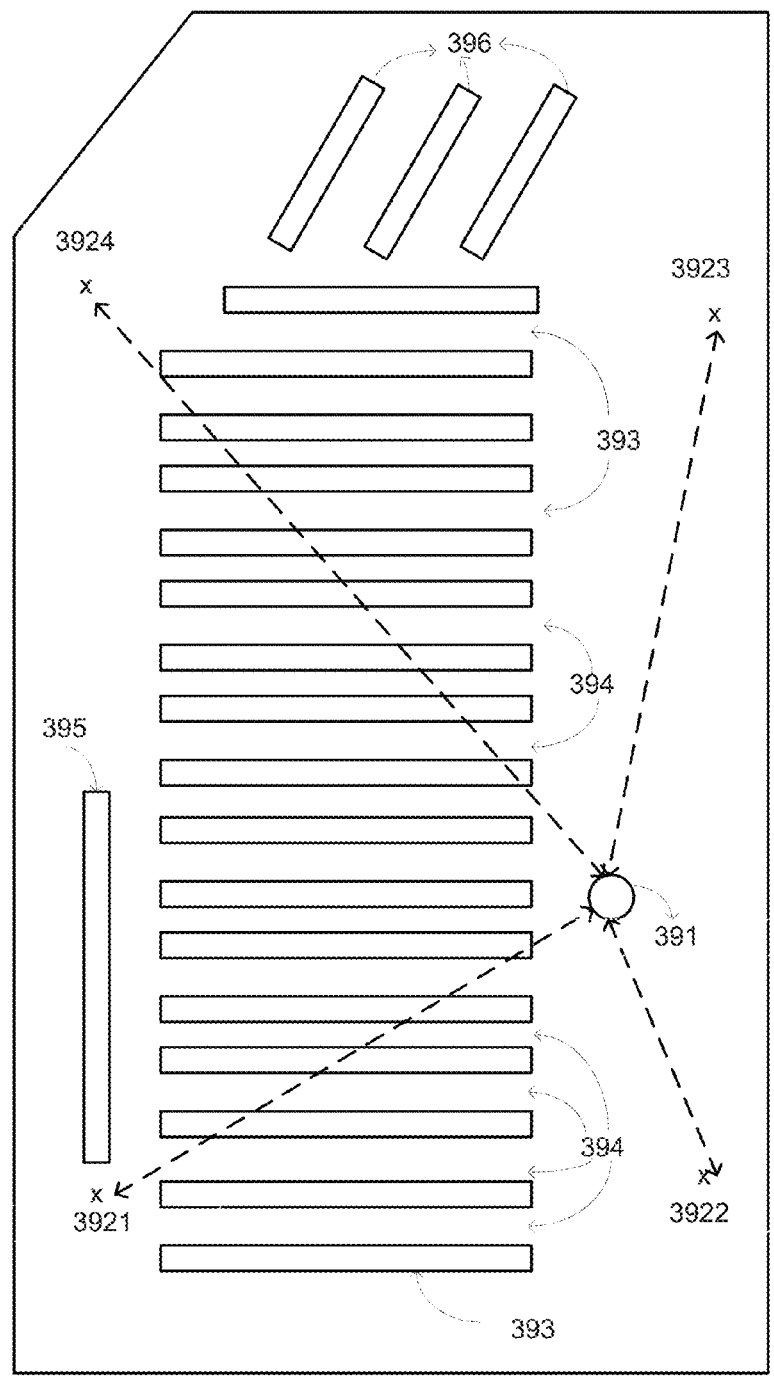
FIG. 39 illustrates a prior location tracking scheme.

Prior art solution (FIG. 39) aim to solve the need for indoor location and navigation of a person inside a large store or a supermarket (i.e. "retailer"). A common prior art solution includes using several (at least 3) static nodes (sometimes referred as "readers") with known locations and measure the distance of the user to those readers. This is illustrated in FIG. 39—the "readers" 3921, 3922, 3923 and 3934 are marked with X. Once the distance from the user 391 to those readers is known, the location of the user relative to the readers can be calculated. If the location of the readers in store (or on a map) is known, the location of the user in the store can now be calculated.

This approach requires (i) an accurate measurement of the distance from the user to the "readers", and (ii) accurate knowledge on the location of the readers in the store.

Inaccuracy on either of those will lead to inaccuracy in the estimation of the position of the user.

Estimating the distance from the user to the reader

There are several approaches to estimate the distance. The most common ones are based on received signal strength (RSSI) and measuring the time of flight (ToF) of an RF signal.

RSSI—With this approach, the "readers" transmit periodically a beacon with a unique ID. The receiver estimates the signal strength of the received signal. Assuming the transmit power is known, it can estimate the range by fitting those figure into a RF propagation model. RSSI main advantage is the fact it can be implemented using Wi-Fi or Bluetooth, which are supported by most phones today. This leads to a system which requires no extra hardware carried by the user. In addition, as there is no network connection between the readers and the phone (readers are transmitting beacons, phone is only receiving) the system is easily scalable and there are no capacity issues. The main disadvantage of this approach is accuracy. As signal strength is heavily impacted from physical blockers, a non-line-of-sight (LOS) estimation is very inaccurate and even a LOS scenario could have significant error due to reflections and fading. This results in accuracy in the range of 3-5 m. In order to try and mitigate that, a more sophisticated approach is to match a set of RSSI received from several sources to a pre-measured or estimated "map" (this is called finger printing). This approach yields better results in a controlled environment (still couple of m accuracy) but in practice it also suffers from blockers or interferers that were not there during the "mapping procedure" (walking people for example)

ToF—With this approach, the "readers" measure the propagation time of an RF signal from the reader to the user. This method could be unidirectional (DTOA) if the readers are synchronized or bi-directional if they are not. Assuming sufficient RF signal bandwidth is used this method is robust and accurate also in the presence of reflections and blocking and accuracy can be as good as 30 cm and below. The main disadvantage is the fact that current smartphones do not support such approach meaning the user must carry a special hardware with him. In addition a bi-directional system needs to cope with collisions and user access to the readers and a uni-directional system needs to synchronize all the readers. Both impose technical challenges which complex the system Estimating the Location of the Readers In many cases, the readers are located indoor, where GPS usage is impossible. In practice, the mapping of those readers is usually done manually—measure where they are and feed it to a database. Tracking if a reader has moved is problematic and the cost of ownership is high The proposed method uses both RSSI as well as ToF. It uses "tags" which are capable for Bluetooth or Bluetooth-low-Energy (BLE) communication as well as for ToF measurement using wideband signal (as described in U.S. provisional patent Ser. No. 61/729,601 filing date Nov. 25 2012 and U.S. provisional patent Ser. No. 61/803,534 filing date March 20.

The idea is to locate the user in a small "cell" using RSSI, and auto-create an accurate map of those cells using ToF measurements. The concept of operation is illustrated in FIGS. 40 and 41.

Figure 40:
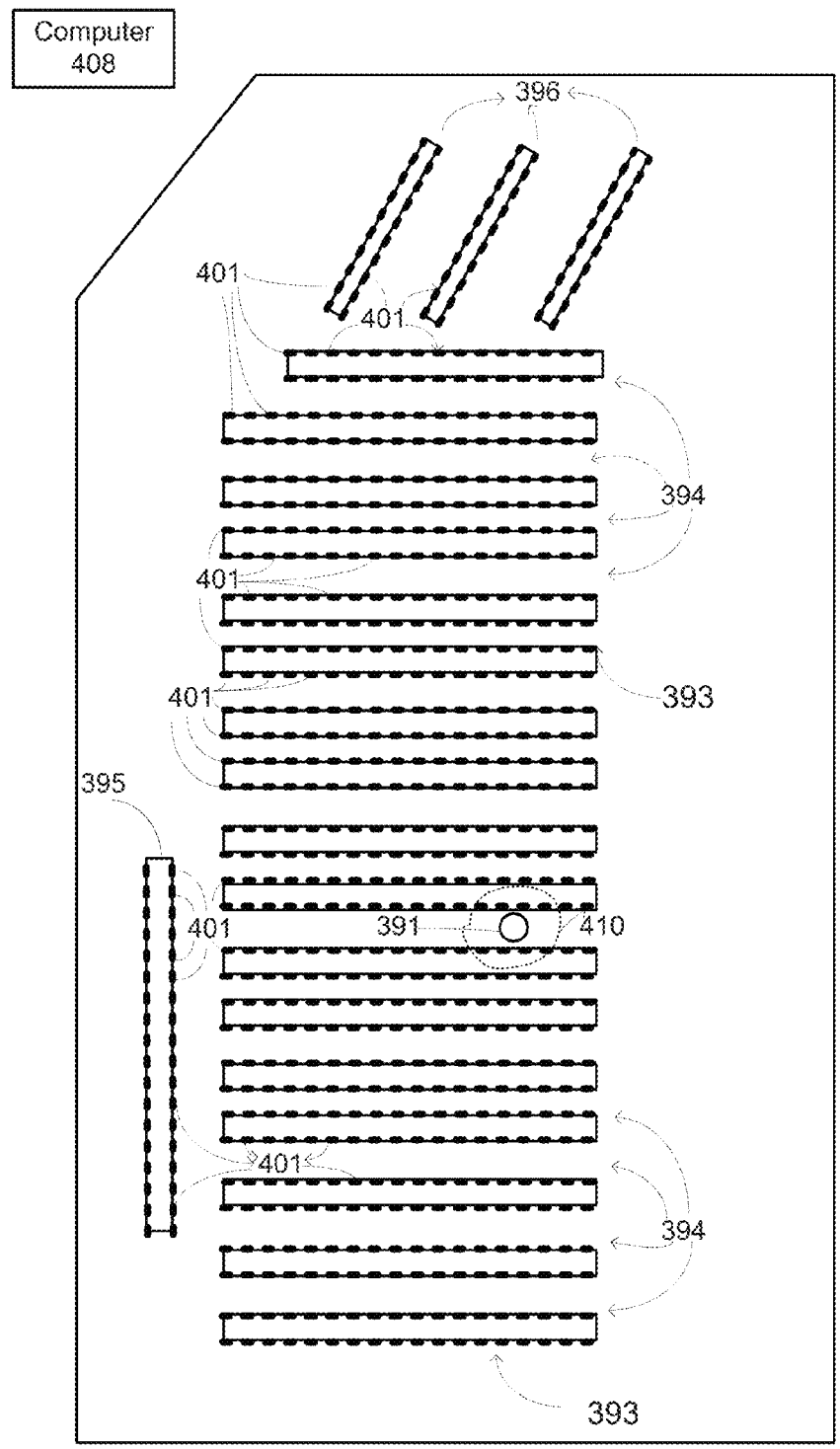
FIGS. 40-41 illustrates multiple wireless tags positioned in an indoor space, a user device located within a virtual cell and a computer according to various embodiments of the invention.
Figure 41:
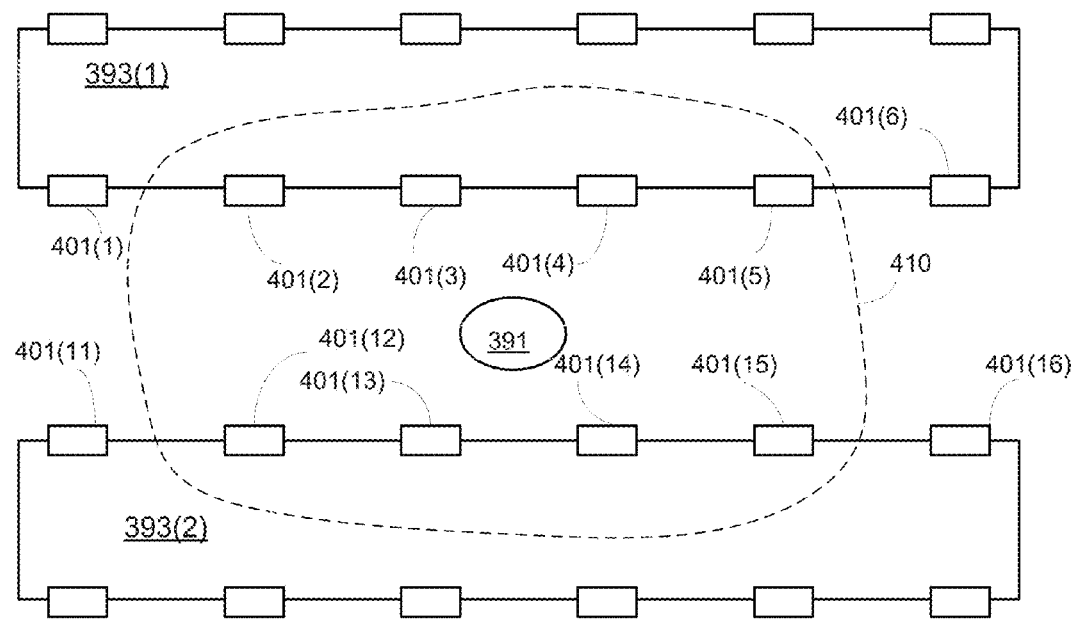

FIG. 40 illustrates the indoor space as including multiple shelves 393, 395 and 396. The majority of shelves (393) are spaced apart by passageways 394 and are parallel to each other. A large number of wireless tags 401 are attached to shelves 393, 395 and 396.

Cellular Structure

The store installs tenths to hundreds of tags 401. These tags could use for applications which are already being used such as BLE proximity for coupons or for smart shelf labeling (which install a tag per product category). This is illustrated in FIG. 40. Due to the larger number of tags, a "cellular" approach can be used. Each cell includes of 3-10 tags (or even a larger number, depended on the spacing between the tags). Each tag 401 periodically transmits a tag beacon with a tag ID—each tag has a unique ID.

The user device 391 receives transmissions from a subset of the tags (or selects only the strongest transmissions it receives). These tags (of the subset) form a cell 401 that is proximate to the user device. The user device may use RSSI or other method to determine its location within the "cell'

Referring to FIG. 41—the user device 391 includes transmissions from tags 401(2)-401(5) and 401(12)-401(15) within cell 410 and ignores transmissions from other tags (such as tags 401(1), 401(6), 401(11) and 401(16). These tags are attached to shelve 393(1) or shelve 393(2).

As indicated above—Within this cell the method uses RSSI reception or RF-fingerprinting in order to estimate the location of the user in the cell (this means the tags periodically transmit beacons with unique ID). A cell is illustrated in FIG. 40. This method is superior compared to the existing approach since:

Inside the cell there are no blockers such as shelves etc.

Statistically, the scenario of true LOS (no blockers, no interference from people) is more likely since the cell area is small.

Since the cell is small, the slope of signal strength/distance which is logarithmic is higher compared to a large hall. This results in better noise immunity As the structure of the cell is known, and expected interference is limited the system can leverage the cell structure information to rule out outlier data Auto-Mapping Assuming the solution for the location of the user within the cell is done, there is a need to locate the cell referenced to the store map or to the rest of the tags. This is done by creating a mesh network and mesh mapping as described in U.S. provisional patent 61/868,591 filing date Aug. 22 2013. The procedure can be done periodically (once a day, or few times a day) so the map of tags, which refers potentially to the map of products will get updated in case a product (and a tag has moved). The ambiguity of the map (setting the north) needs to be resolved once (manually or automatically). As most of the tags are static from map to map creations, ambiguity solution will be done using pattern matching as described in U.S. provisional patent 61/868,591 filing date Aug. 22 2013. The map is accurate since it is using ToF measurements; therefore the database generating the cell structure is accurate as well.

By combining the two methods (cellular RSSI and auto-mapping) the system performance and cost of ownership is optimized:

a. The system uses RSSI to locate the user, leading to no need for additional HW for the user besides his phone b. As it works in small simple "cells" with high probability for LOS conditions, it mitigates the main problem of RSSI approach which is accuracy in a NLOS scenarios c. The tags auto-map themselves avoiding the need for manual measurement of the location of the "reader" which is costly and inaccurate d. As the auto-mapping process is done periodically, the system is self-maintained, and any change in location of an item is updated automatically.

e. This results in a low cost of ownership as there is no need for any human intervention after the first installation The generation of tags map and the determining of the locations of the different tags can be done by a server (such as computer 408 of FIG. 40) that can receive information from the wireless tags either directly, via user device, vie intermediate communication elements and the like.

Server

The server stores the auto-mapping data. The mesh measures the relevant distances (as described in any of the mentioned above methods) and sends a distance matrix to the server (through a tag that has an IP connection, as mentioned in any of the mentioned above methods). The server builds the map from the distance matrix and solves the north ambiguity. As the measurement of distances is done periodically, the server also updates the map of products periodically. This also enable the back office to track location and existence of items, amount of changes etc.

Client

The client operates on the user phone. When the user gets into the store it gets from the server the list of IDs of all tags and the map of those tags. It uses now the RSSI of the signals it receives in order to identify the cell he is, and estimate his location within the cell Once those tasks are completed, and having the map from the server, the client now has his location on the map. This is processed locally but can be sent back to the server so the server can track and log user's movement and potentially guide them through desirable paths.

FIG. 47 illustrates method 477 according to an embodiment of the invention.

Method 477 includes stage 478 of generating, by multiple wireless tags, distance information about distances between the multiple wireless tags, the multiple wireless tags are positioned within the indoor space by applying a first type of distance estimation process that may include wirelessly transmitting messages between the multiple wireless tags.

Stage 478 is followed by stage 479 of transmitting by the multiple wireless tags ranging beacons, wherein wireless tags ranging bacons transmitted by a wireless tag comprise a unique identifier of the wireless tag.

Figure 48:
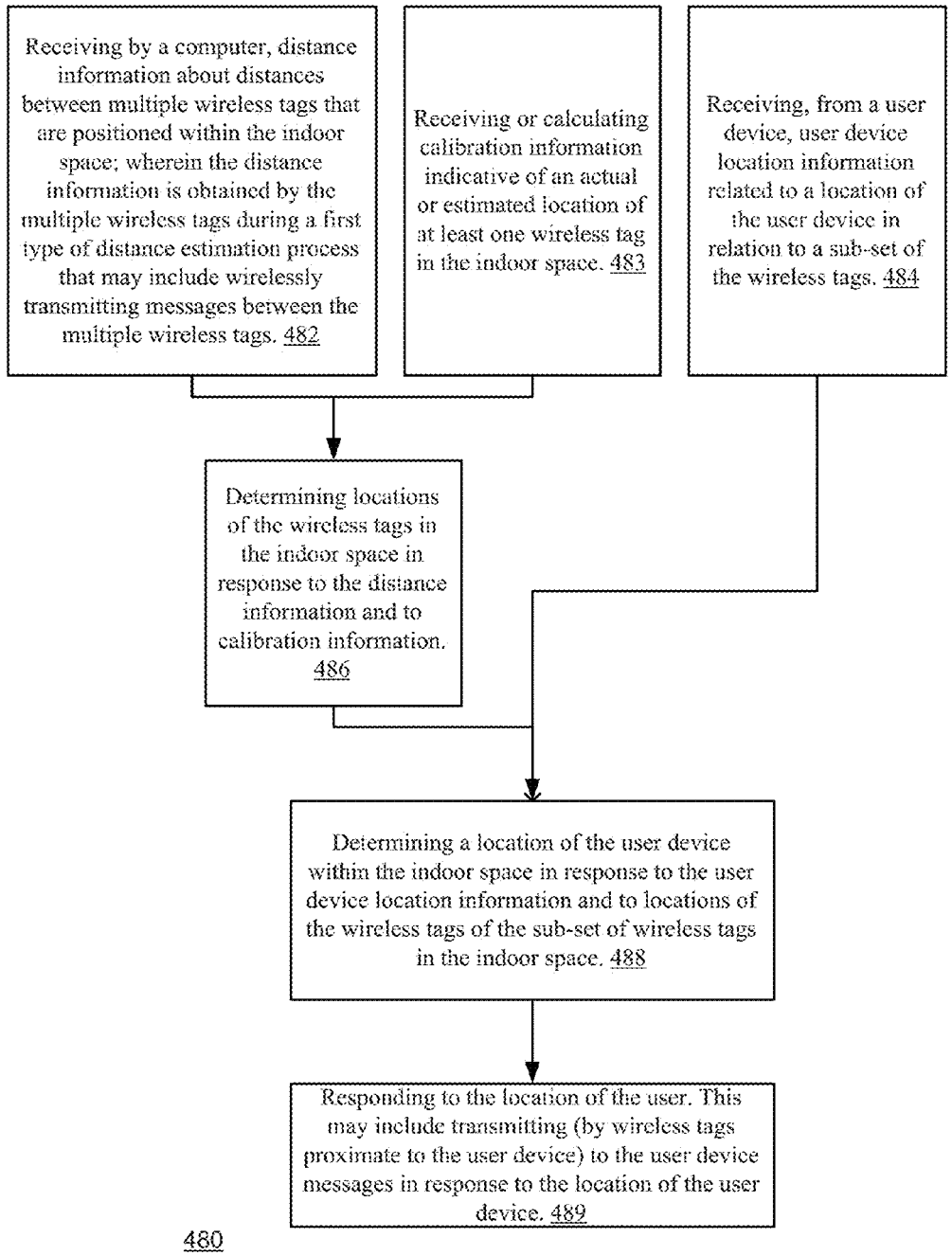

FIG. 48 illustrates method 480 according to an embodiment of the invention.

Method 480 is for locating a user within an indoor space. Method 480 may start by stages 482, 483 and 484.

Stage 482 may include receiving by a computer, distance information about distances between multiple wireless tags that are positioned within the indoor space; wherein the distance information is obtained by the multiple wireless tags during a first type of distance estimation process that may include wirelessly transmitting messages between the multiple wireless tags.

There may be many wireless tags that may be arranged in multiple dense groups. FIG. 40 illustrates wireless tags 401 that are ordered in dense groups-two dense group per side of a shelf. For example, the multiple wireless tags comprise at least one hundred wireless tags and wherein a distance between adjacent wireless tags positioned on a same side of an object does not exceed centimeters.

The first type of distance estimation process may include wirelessly transmitting Bluetooth low energy messages between the multiple wireless tags.

The first type of distance estimation process may include wirelessly transmitting wideband and narrowband messages between the multiple wireless tags.

Stage 483 may include receiving or calculating calibration information indicative of an actual or estimated location of at least one wireless tag in the indoor space.

Stage 483 may include calculating the calibration information. This may include receiving a map of the indoor space, the map is indicative of shapes and orientations of multiple objects within the indoor space to which wireless tags are attached; determining spatial relationships between the multiple wireless tags based upon the distance information; and calculating the calibration information based upon similarities between a shape and an orientation of at least one object and between spatial relationships between objects that are attached to the at least one object.

Stages 482 and 483 may be followed by stage 486 of determining locations of the wireless tags in the indoor space in response to the distance information and to calibration information.

Stage 484 may include receiving, from a user device, user device location information related to a location of the user device in relation to a sub-set of the wireless tags.

The user device location information may be obtained by applying a second type of distance estimation process that differs from the first type of distance estimation process. The second type of distance estimation process may be based upon received signal strength indication (RSSI) measurements of beacons transmitted from the wireless tags of the sub-set of wireless tags; and wherein the first type of distance estimation may be based upon tome of flight measurements.

Each wireless tag of the multiple wireless tags may have a unique identifier that is included in messages transmitted by the wireless tag during the second type of second type of distance estimation process.

Stages 484 and 486 may be followed by stage 488 of determining a location of the user device within the indoor space in response to the user device location information and to locations of the wireless tags of the sub-set of wireless tags in the indoor space.

Stage 488 may be followed by stage 489 of responding to the location of the user. This may include transmitting (by wireless tags proximate to the user device) to the user device messages in response to the location of the user device.

Figure 49:
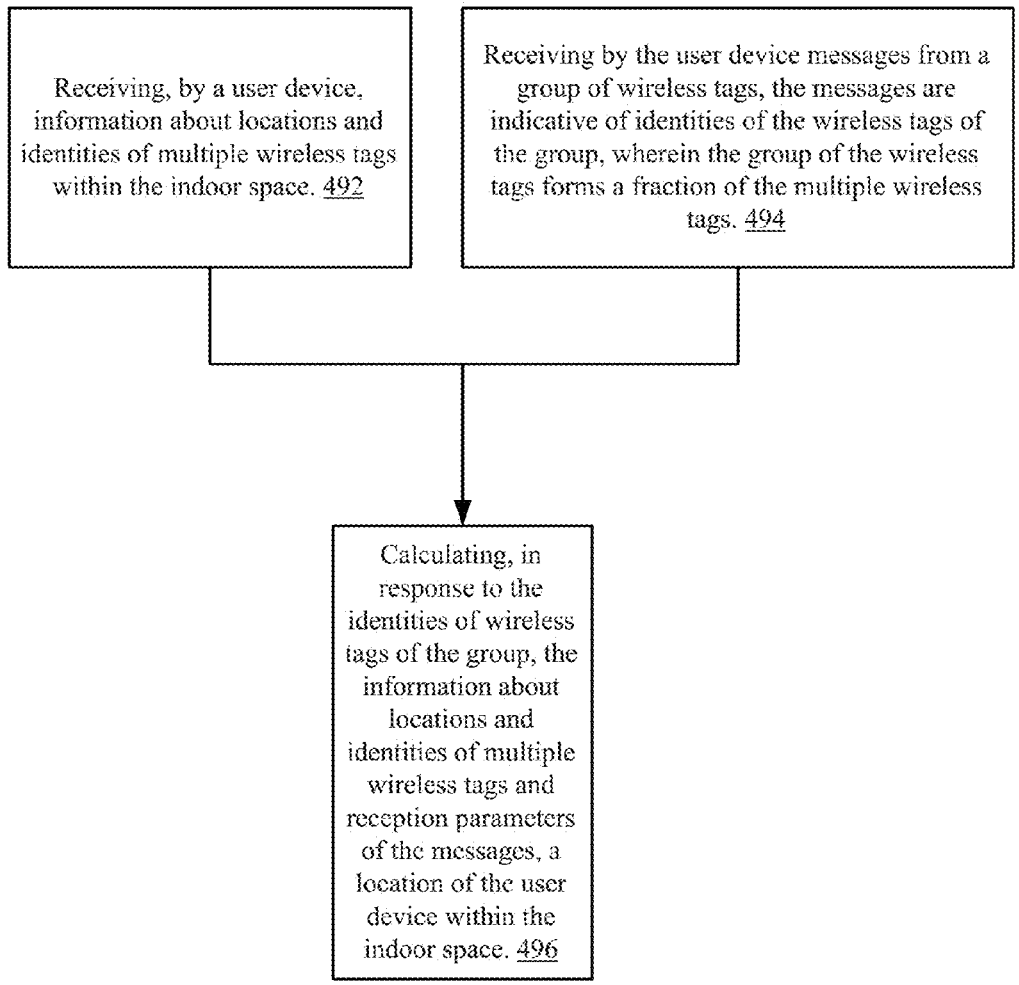

FIG. 49 illustrates method 490 according to an embodiment of the invention.

Method 490 is for locating a user within an indoor space.

Method 490 may start by stage 492 of receiving, by a user device, information about locations and identities of multiple wireless tags within the indoor space.

Stage 492 may be followed by stage 494 of receiving by the user device messages from a group of wireless tags, the messages are indicative of identities of the wireless tags of the group, wherein the group of the wireless tags forms a fraction of the multiple wireless tags.

Stage 494 may be followed by stage 496 of calculating, in response to the identities of wireless tags of the group, the information about locations and identities of multiple wireless tags and reception parameters of the messages, a location of the user device within the indoor space.

Stage 496 may include calculating a rough estimate of the location of the user device in response to the identities of wireless tags of the group and the information about locations and identities of multiple wireless tags.

Stage 496 may include calculating a fine estimate of the location of the user device in response to the reception parameters of the messages.

The reception parameters of the messages may be RSSI measurements related to the messages.

Smart Bag

There may be provided a smart-bag system for a consumer. The purpose of the smart bag is to help a traveler monitor and keep important belongings, be able to verify that all of the are inside the bag when he leaves, if something has been moved while he was away and also help the user locate a missing item.

Generally, prior art solutions for consumer systems that ensure the existence of an element within an area (or volume) use distance estimation based on received signal strength (RSSI) of an RF signal. The main issue of that approach is its inherent inaccuracy and susceptibility to physical blockers and interferers, making it non-suitable for any application that requires accuracy (like a smart-bag).

The proposed method uses distance measurements based on ToF from either a single of two fixed tags in the bag to the tagged items. A smartphone is used as the GUI for the user System structure The system is based on the approach described in U.S. provisional patent 61/868,591 filing date Aug. 22 2013. The user tags every item he wishes to monitor. In addition, the bag has a pocket or two pockets in it, where tags could be placed. The use of pockets is important since the location of the pockets in the bag is "optimized" for the use and could also be known to the application. A smart device (smartphone, tablet) communication with the tag (or just with the tag on the bag) is used as GUI for the user Mapping This is the process where the smart-bag (example of a tagged enclosure) or actually the tags on the bag create a "map" of the tagged items.

Single tag on bag case—in this case the bag has a single pocket for a tag. The ideal solution is at the center of the bag (impractical) or at the center of the bottom of the bag. Mapping on this case means measuring the distance from the bag's tag to the rest of the tags. We define a sphere with a radius that is the distance from the bag's tag (center of bottom) to an upper corner of the bag. The system collects all distances from the bag's tag the tagged items. "In the bag" is defined as item within the sphere and "out-of bag" is an item out of the sphere. False positive identification happen in the volume of the sphere which is out of the bag (assumed as a box)

Two tags on bag case—In this case the bag has two pockets for a tag. The ideal solution is at the centers of the opposite smallest sides of the bag (The bag is assumed to be a box). Mapping on this case means measuring the distance from the bag's two tags to the rest of the tags. We define a cylinder with a radius that is the distance from the bag's tag (center of small side) to a corner of that side. By measuring the distance to both tags we can determine if an item is inside or outside that cylinder. "In the bag" is defined as item within the cylinder and "out-of bag" is an item out of it. False positive identification happens in the volume of the cylinder which is out of the bag (assumed as a box). The false volume is smaller than the one in the single bag tag case The system can support the following use cases:
Are my things with me?
  a. When a person intends to leave the room with his bag he can "ask" the system "is everything in the bag"? A mapping procedure is followed, and binary indication ("in the bag" or "out of the bag") is generated for all item. Status is generated on the phone.
Has something moved while I was away?
  a. The user should enable that mode of operation before he leaves the room. Once enabled, the system periodically creates the map. It compares the "location" (2 distances in 2 tag's case) or distance (1 tag case) of all tags over times, and look for a change above a certain criteria bar. The comparison and logging is done on the bag tags (as the phone is away). There is no processing involved, just comparison of distance measurement over time. When something has moved, the event is logged with a time stamp. When the user returns to his room the phone can communicate with the bag tag(s) and get the log.
Where is something?
  a. Assuming something is identified as "out of bag" or is just lost, the system can assist the user to find it. In this case, a "real" map is created, as described in the document "PGA+ad-hoc network". If the user carries a tag with him (either on the phone or just a tagged item he takes in hand) ambiguity and direction relative to the user+ bag can be solved without a user movement.

Figure 50:
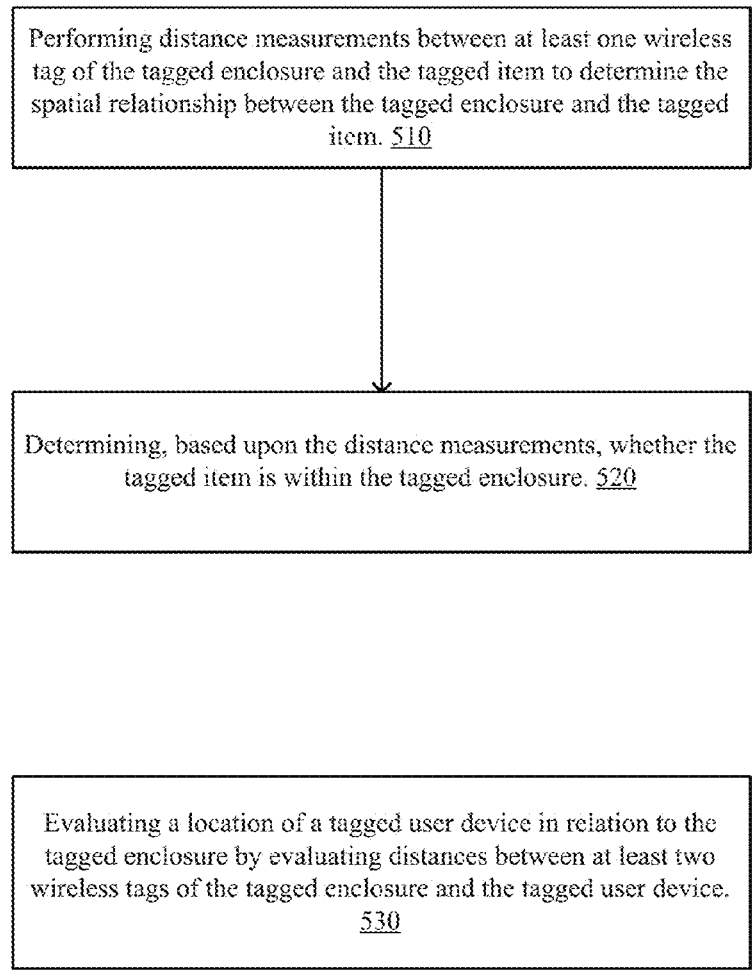

FIG. 50 illustrates method 500 according to an embodiment of the invention.

Method 500 is for detecting a presence of a tagged item within a tagged enclosure.

Method 500 starts by stage 510 of performing distance measurements between at least one wireless tag of the tagged enclosure and the tagged item to determine the spatial relationship between the tagged enclosure and the tagged item. The distance measurements may be based upon time of arrival, RSSI or any other ranging process illustrated above.

Stage 510 may be followed by stage 520 of determining, based upon the distance measurements, whether the tagged item is within the tagged enclosure. The one or more locations of the at least one wireless tag within the tagged enclosure are known, the shape and size of the tagged enclosure are known so that the distances between the tagged item and the one or more wireless tag can be deducted from the distance information and the mentioned above knowledge.

Stage 510 may include merely determining which wireless tags are able to communicate with the tagged item and determine, based upon the coverage area of the wireless tags—whether the tagged item is within the tagged enclosure or outside the tagged enclosure. See, for example, FIGS. 51 and 51 and the text below.

Method 500 may also include stage 530 of evaluating a location of a tagged user device in relation to the tagged enclosure by evaluating distances between at least two wireless tags of the tagged enclosure and the tagged user device.

Figure 51:
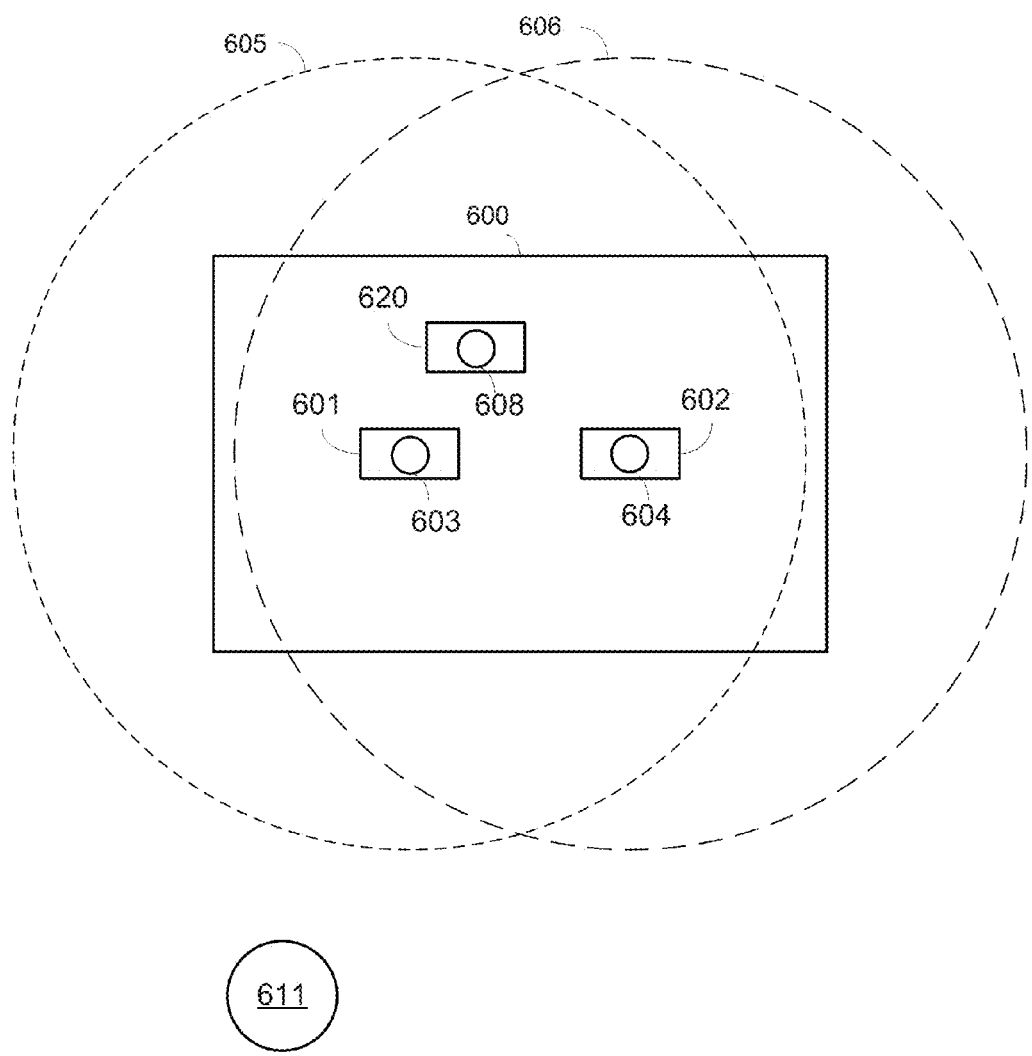
FIGS. 51-52 illustrate tagged enclosures according to various embodiments of the invention.
Figure 52:
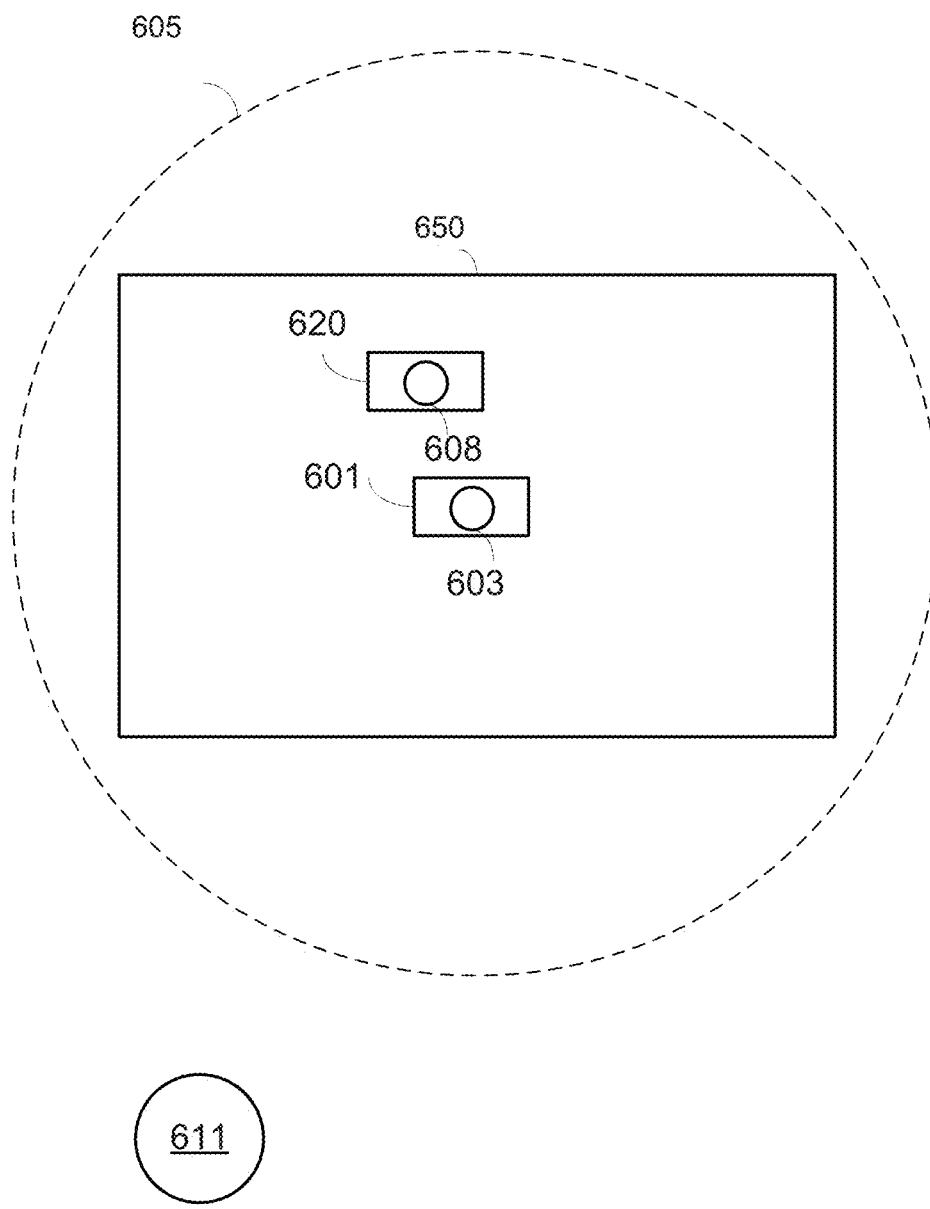

FIGS. 51 and 52 illustrate tagged enclosures 600 and 650 according to an embodiment of the invention.

Tagged enclosure 600 includes tagged enclosure pockets 601 and 602 in which wireless tags 603 and 604 are located. The coverage areas 605 and 606 of wireless tags 603 and 604 (respectively) are three dimensional spaces that define an area in which each wireless tag is able to communicate with another wireless tag. A tagged user device 630 can try to attempt to communicate with the wireless tags 603 and 604 in order to determine their locations—wherein the distance and/or location determination can be executed by any method, including any method disclosed in the specification. Yet for another example wireless tags 603 and 604 may attempt to communicate with an item of interest 620 that is associated (attached to, included in) with a wireless tag 608—and then may communicate to the user device 610 whether they receive the transmissions of wireless tag 608 or not. If both wireless tags manage to communicate with the wireless tag 608 then it may be determined that the item of interest is within the tagged enclosure. Else—it may be determined that the item of interest is outside the tagged enclosure 610. The tagged enclosure may be a suitcase, a bag, and the like. The tagged enclosure may include one wireless tag, three or more wireless tags and the like.

Tagged enclosure 650 of FIG. 52 includes a tagged enclosure pocket 601 in which wireless tag 603 is located. An item of interest is considered to be included in the tagged enclosure if wireless tag 603 can communicate with its wireless tag.

If there are three or more wireless tags in the tagged enclosure then a mapping between the estimate coverage area of the wireless tags and the volume of the tagged enclosure can be provided and decisions of whether a tagged item of interest is within the tagged enclosure can be determined based upon the wireless tags that communicate with the tagged item of interest and the mapping. For example—a tagged item of interest (such as 620) can be determined to be included in the tagged enclosure if a majority of wireless tags of the tagged enclosure communicate with it. Yet for another example—if a certain area of the tagged enclosure is "covered" by the coverage area of one or more certain wireless tags than the tagged item of interest is deemed to be included in the tagged enclosure if at least these one or more certain tags communicate with the tagged item of interest.

According to an embodiment of the invention there are provided methods, systems and non-transitory computer readable media for aligning a wireless tag reader with a map of one or more wireless tags.

The alignment involves aligning a map (of one or more wireless tags) axes system to a user device (such as a phone, a tablet, an overhead display, GOOGLE™ glass, computer and the like) axes system by a circular "scan" of the area under interest.

The user device is tagged and is configured to receive and/or generate and/or participate in the generation of a relative map of tagged items, including the user device.

The user device may be configured to align its axes system to the relative map axes system so the map can be correctly displayed on the user device screen.

Figure 53:
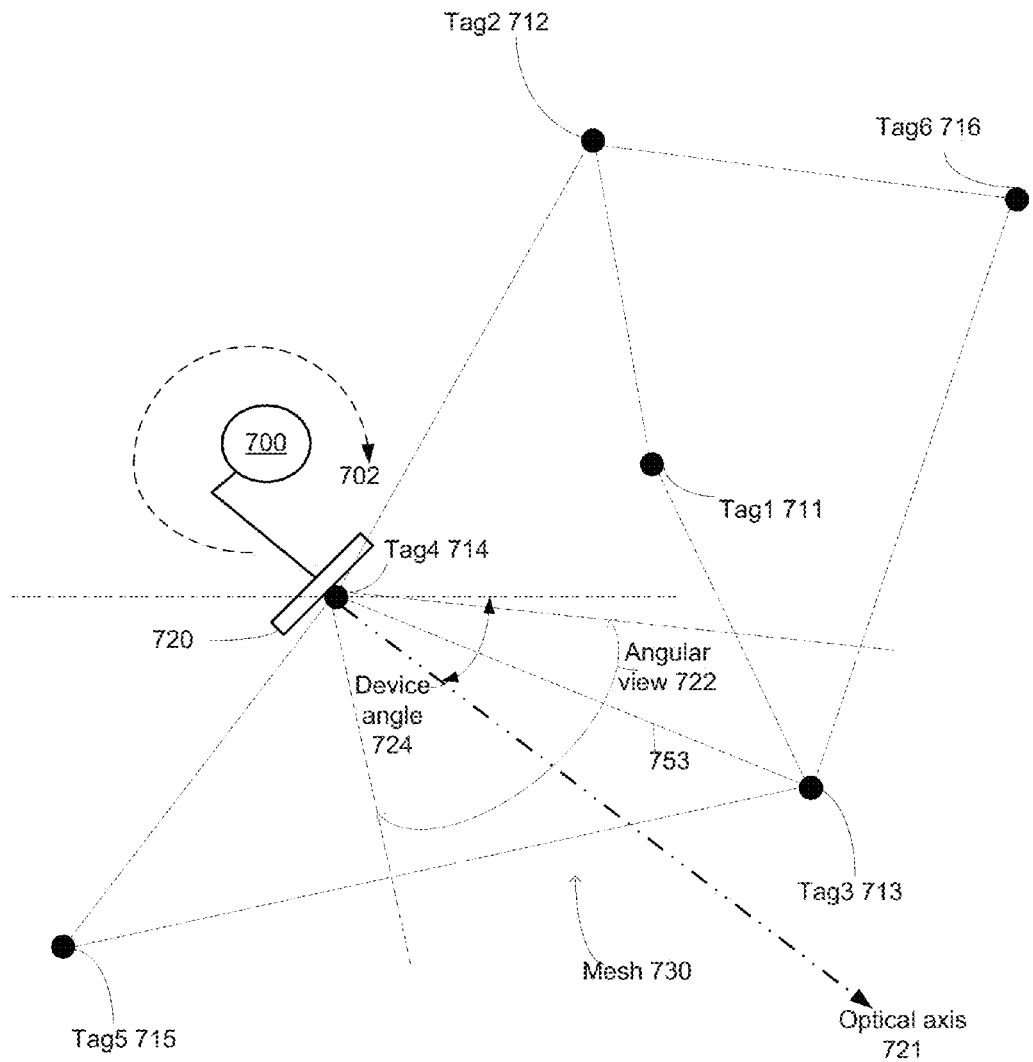
FIG. 53 illustrates a map of tags, a user device and a user according to an embodiment of the invention.
Figure 54:
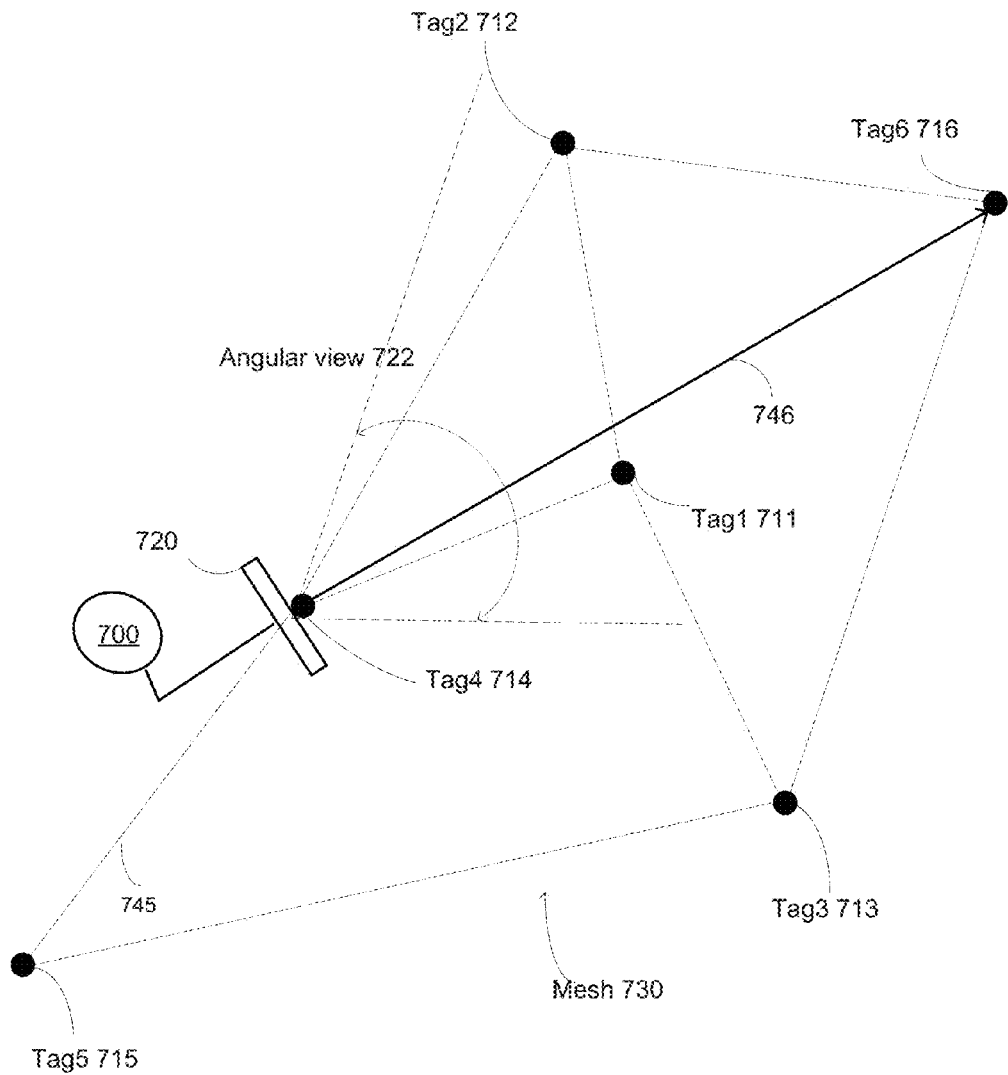
FIGS. 54, 55, 56, 57, and 58 illustrate alignments between the optical axis of the user device and various tags according to an embodiment of the invention.
Figure 55:
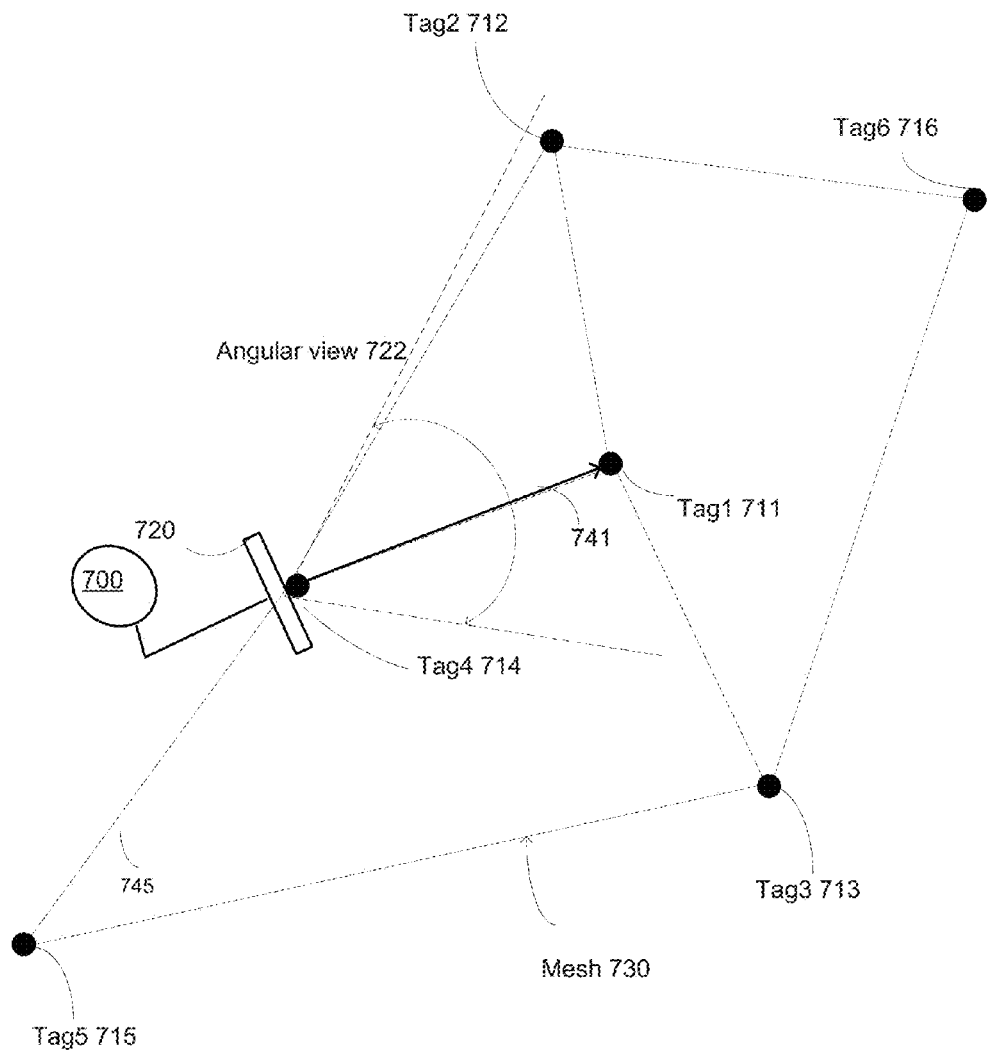
Figure 56:
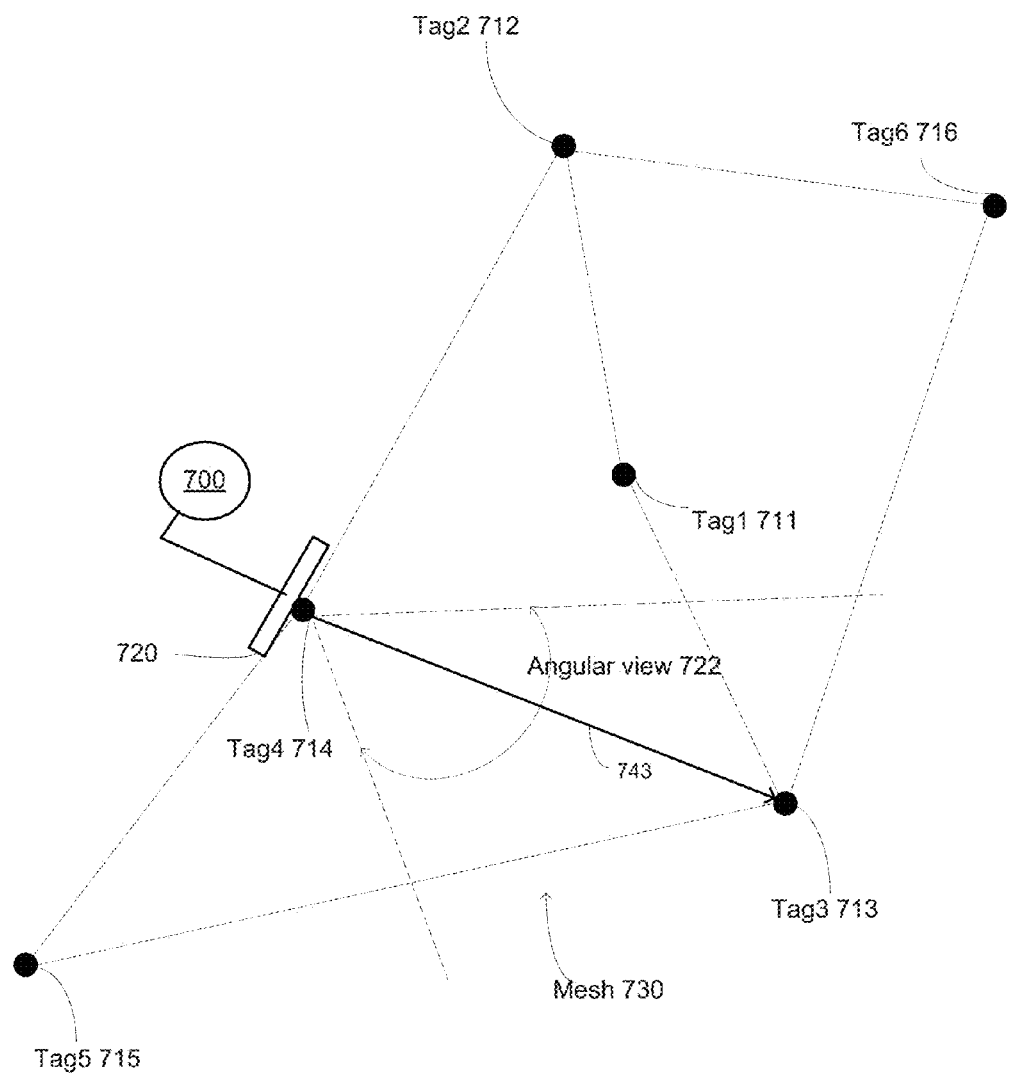
Figure 57:
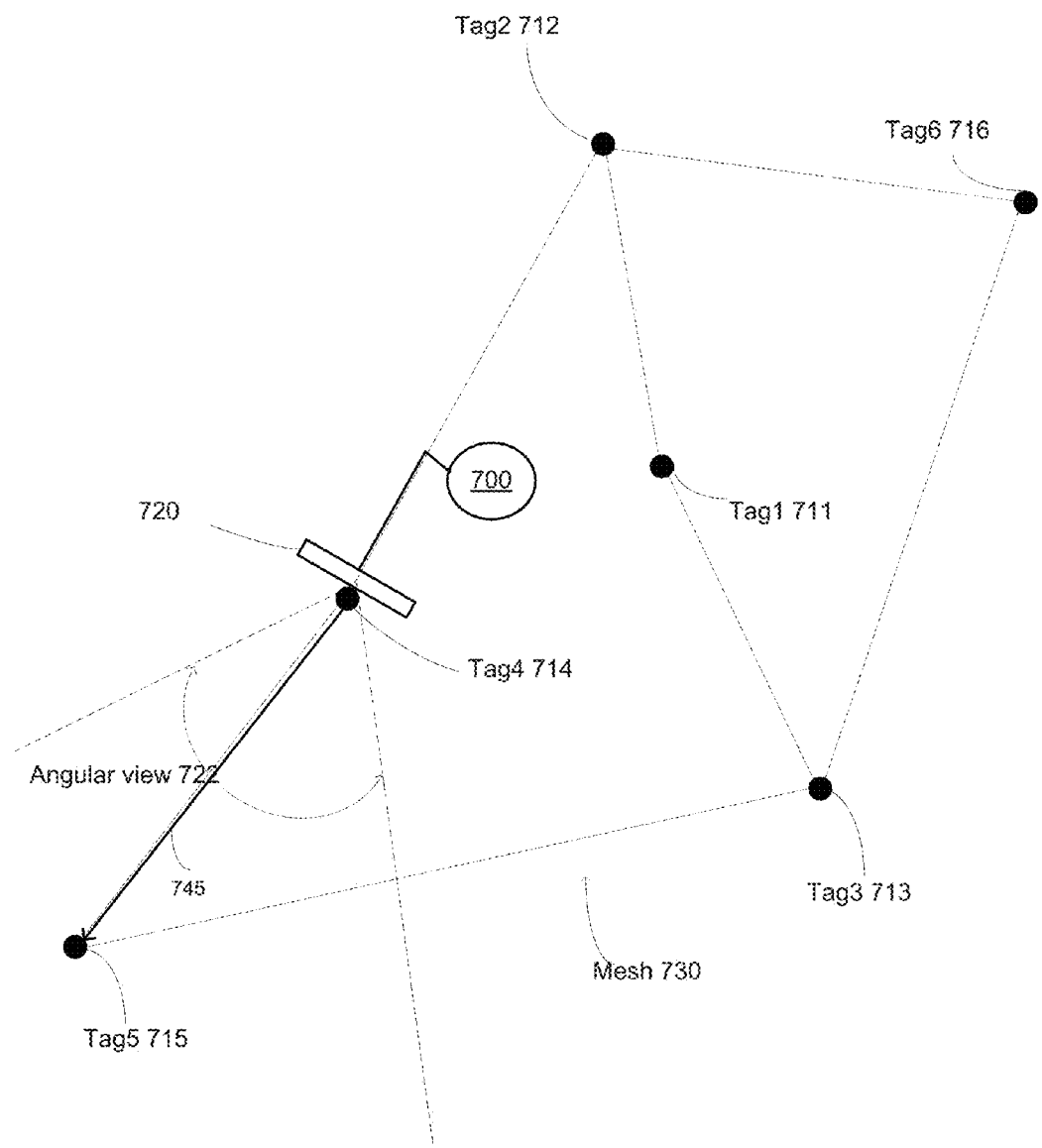
Figure 58:
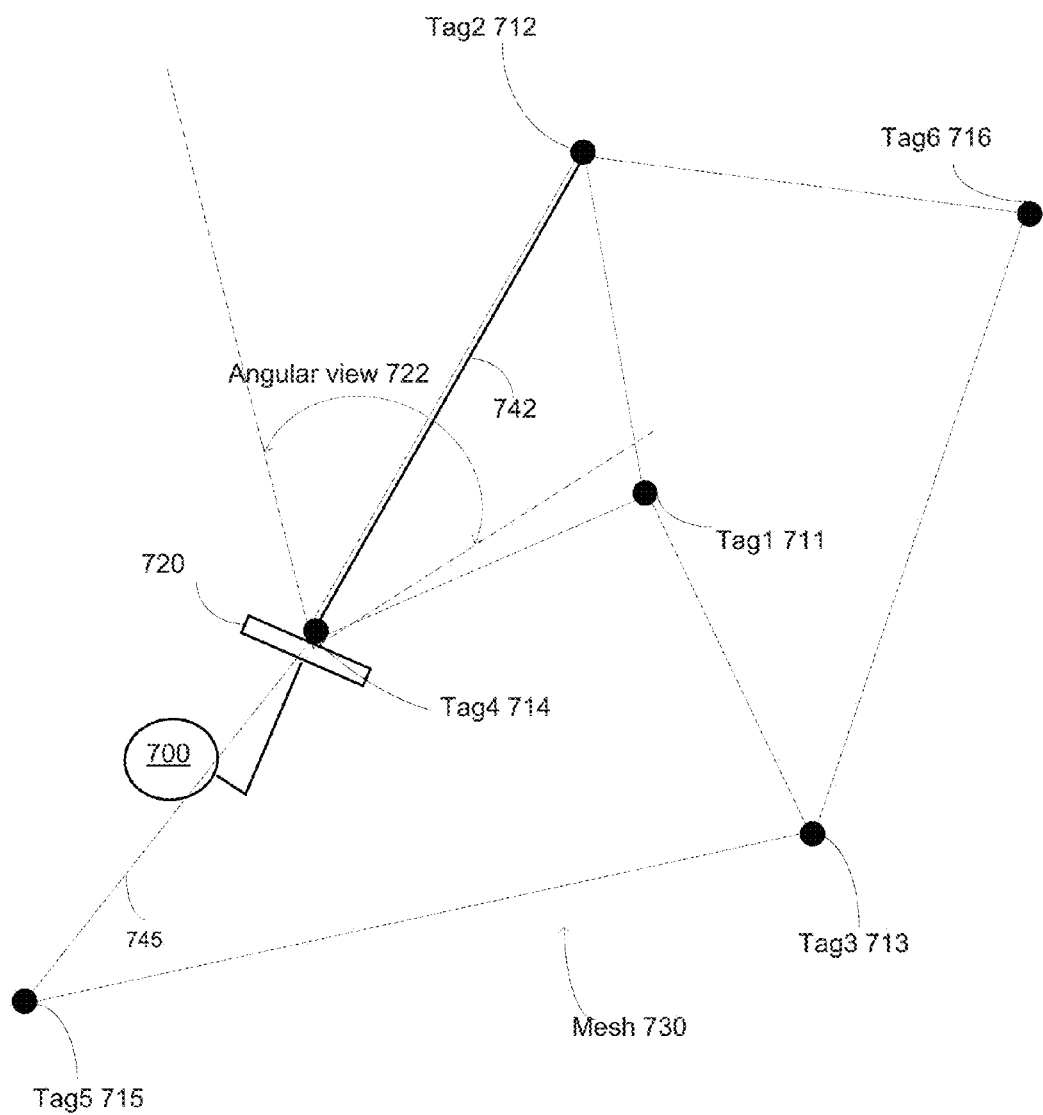

FIG. 53 illustrates a map of tags 730, user 700 according to an embodiment of the invention.

The map of tags is denoted mesh 730 and includes estimated locations of first till sixth tags Tag1-Tag6 711-716. Dashes lines virtually connect these tags and represent the estimated distance between these tags. User device 720 is tagged with fourth tag Tag4 714 and has an angular view (angular field of view) 722.

The first till sixth tags Tag1-Tag6 711-716 are positioned in a three dimensional space and may be located at different heights. Mesh 730 is a two dimensional representation of the locations of the tags. Accordingly—mesh 730 exhibits angular ambiguity. Mesh 730 also exhibits angular inaccuracies—especially the exact angle between (direction from) Tag4 (and users device) and each one of Tag1 711, Tag2 712, Tag3 713, Tag5 715 and Tag6 716 in relation to is unknown.

Mesh 730 may be represented in various manners—such as Cartesian representation or a polar representation. User device 720 can convert any representation to a polar representation in which Tag1 711, Tag2 712, Tag3 713, Tag5 715 and Tag6 716 are represented by their distance and angle in relation to Tag4 714 and the user device.

According to an embodiment of the invention user device 720 is configured to induce user 700 (by sending audio requests and/or visual requests) to change the angle of the user device in relation to Tag1 711, Tag2 712, Tag3 713, Tag5 715 and Tag6 716. During the alignment process user device 720 searches for minimum distance estimates towards one or more tags of Tag1 711, Tag2 712, Tag3 713, Tag5 715 and Tag6 716. An angle (direction) in which a minimum distance to a certain tag of Tag1 711, Tag2 712, Tag3 713, Tag5 715 and Tag6 716 is obtained is the real angle to that tag. This real angle can be used for aligning the user device axes system to the map axes system.

By finding the heading angle (such as device angle 724 of FIG. 53) of the user device once the minimum is achieved, and comparing it to the angle of the line connecting the phone's tag and the measured tag on the map axes system, an alignment between the two axes systems is achieved.

FIG. 53 illustrates that the user 700 performs a clockwise rotation. This clockwise rotation is wide enough to "cover" Tag1 711, Tag2 712, Tag3 713, Tag5 715 and Tag6 716—during this clockwise rotation the optical axis 421 of the user device (located at the center of the angular view) points directly to each one of Tag1 711, Tag2 712, Tag3 713, Tag5 715 and Tag6 716. Accordingly—the user device is expected to receive five minimum distance readings—one for each tag of Tag1 711, Tag2 712, Tag3 713, Tag5 715 and Tag6 716.

It is noted that the rotation may be counter clock wise and that the user device may complete only a part of this rotation in order to complete the alignment process.

FIGS. 54, 55, 56, 57, and 58 illustrate alignments between the optical axis of the user device (denoted 746, 741, 743, 745, 742, respectively) and Tag6 716, Tag1 711, Tag3 713, Tag5 715 Tag2 712 respectively—corresponding to five minimum distance readings.

In any one of FIGS. 53-58 user may hold the user device 720 in front of him. The user can hold the user device 720 in standard portrait position or in landscape in front of him. In that case the user device 720 can turn its camera and the user device 720 may display to the user the content (area) captured within the angular view 722. The user may perform a circular turn or scan of the area.

The user device 720 may guide the user 700 (visually or with audio etc) on the direction of the turn and the rate of the turn (angular speed). The user device may keep measuring the distances from the user device tag to one or more tags of Tag6 716, Tag1 711, Tag3 713, Tag5 715 Tag2 712.

Figure 59:
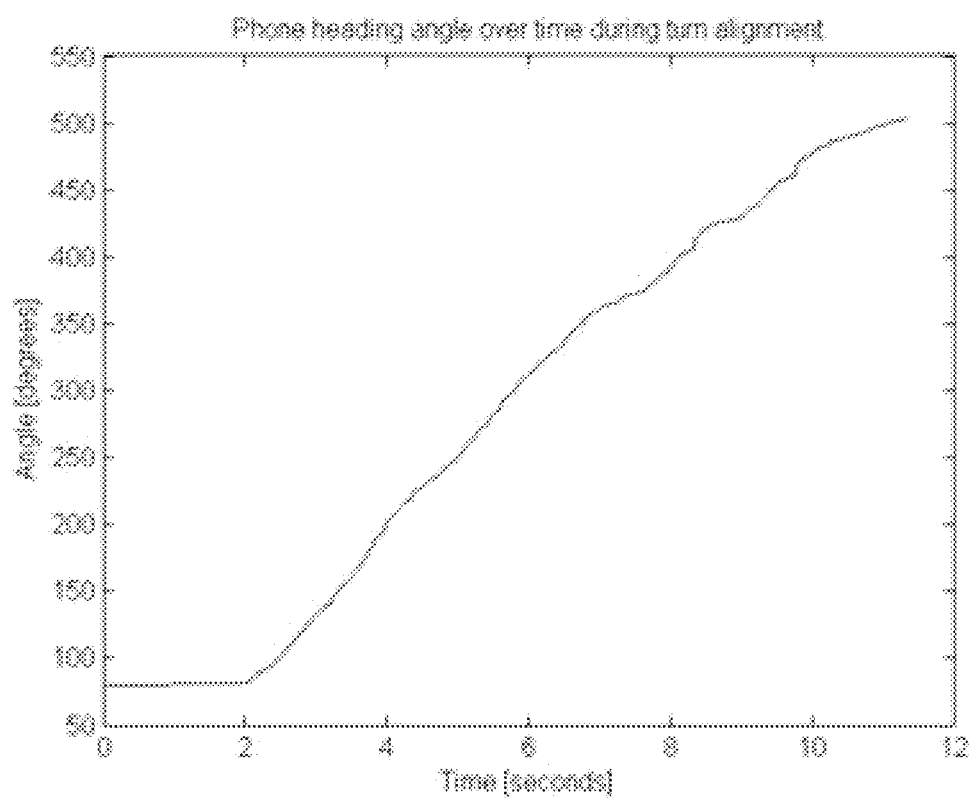
FIGS. 59 and 60 show measured data according to an embodiment of the invention.
Figure 60:
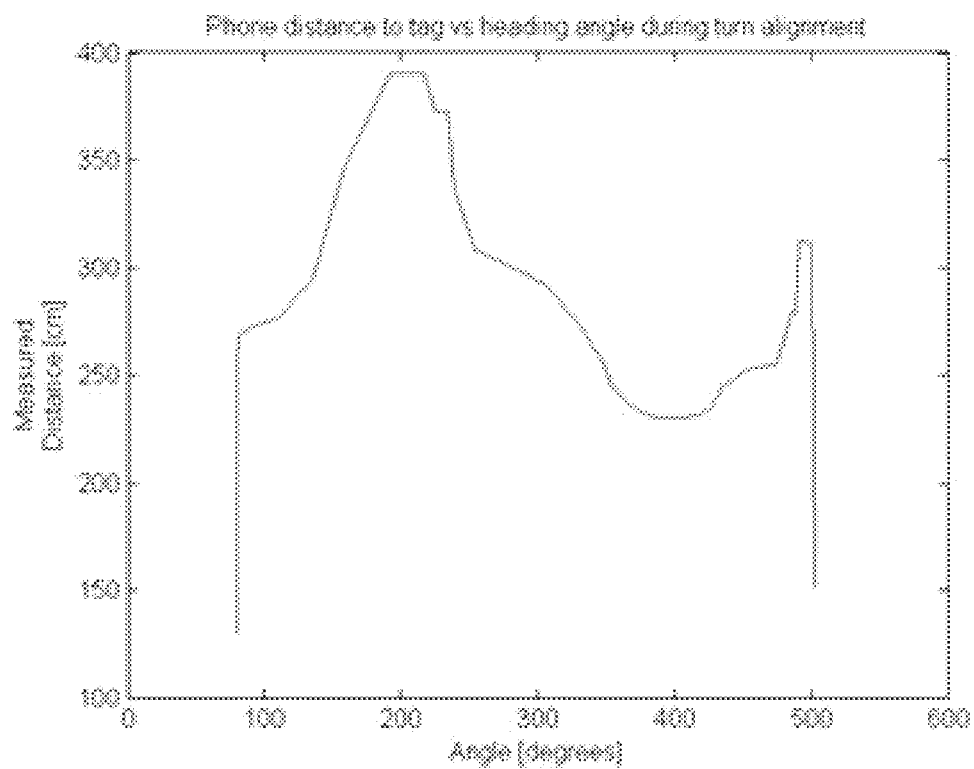

FIGS. 59 and 60 show measured data according to an embodiment of the invention.

Graph 900 of FIG. 59 illustrates the relationship between an angle of the user device and time according to an embodiment of the invention. FIG. 59 illustrates the rotational movement of the user. The x-axes of graph 900 represents the time. The y-axis of graph 900 represents the angle of the user device.

It is seen that the turning (of the user device) started after 2 seconds once heading was about 80° angular speed was fairly constant, full circle) (80+360=440° was achieved after about 9 seconds. The user kept turning for another about 60°.

Graph 910 of FIG. 60 shows the distance between Tag4 and Tag 3 versus the angle of the user device (unwrapped) during the user rotation illustrated in FIG. 53 (arrow 702) and graph 900 of FIG. 59 according to an embodiment of the invention.

It can be seen that after starting to turn, the distance between Tag4 and Tag 3 grew (tag was behind the user) maximum was achieved at an angle of about 220°, and after that distance started reducing until reaching a minimum at about 400°. The user kept turning and the distance start growing again It can be seen that the angular offset between the user device axes system and the map axes system can be determine by finding the angle of the minimal distance, and/or finding the angle of the maximum distance—it is 180° to the right direction.

Assuming that the angular offset is found by measuring the minimal distance between Tag 4 714 and Tag3 713. If only one angle is determined, there is an ambiguity around a symmetric axis determined the line 753 connecting Tag3 713 and Tag4 724.

This can be solved by measuring the angular offset to another tag. By determine two angles (finding two minima of two tags which are not specifying a single line with the phone's tag, the ambiguity is resolved. The drawback of this method is that the minimal angular scan/turn is larger since two minimum points should be identified.

Alternatively—this may be solved in a manner that minimizes the user movement/angular scan and by searching for a single first minimum.

Ambiguity on that case can be solved by determining the slope of distance vs angle of another tag: the system starts measuring distance to several tags, and the user is scanning, assuming scan is done clockwise.

Assume a minimum was identified for Tag3 (as illustrated in FIG. 53). At that point, the user device determines that during the approach towards Tag3 the distance between user device 720 and each one of Tag2 712, Tag6 716 and Tag1 711 increases while the distance between user device 720 and Tag5 715 decreased—indicating that Tag5 715 is located upstream of Tag 713 when performing a clockwise rotation and that Tag2 712, Tag6 716 and Tag1 711 are located downstream when performing a clockwise rotation. In this case the map illustrate din FIG. 53 is correct. Otherwise (during the approach towards Tag3 the distance between user device 720 and each one of Tag2 712, Tag6 716 and Tag1 711 decreases while the distance between user device 720 and Tag5 715 increased) the map 730 should be rotated by one hundred and eighty degrees over line 753.

Accordingly—user device 720 may track the slope of the distance versus angle to each one of Tag2 712, Tag6 716, Tag5 715 and Tag1 711.

Figure 61:
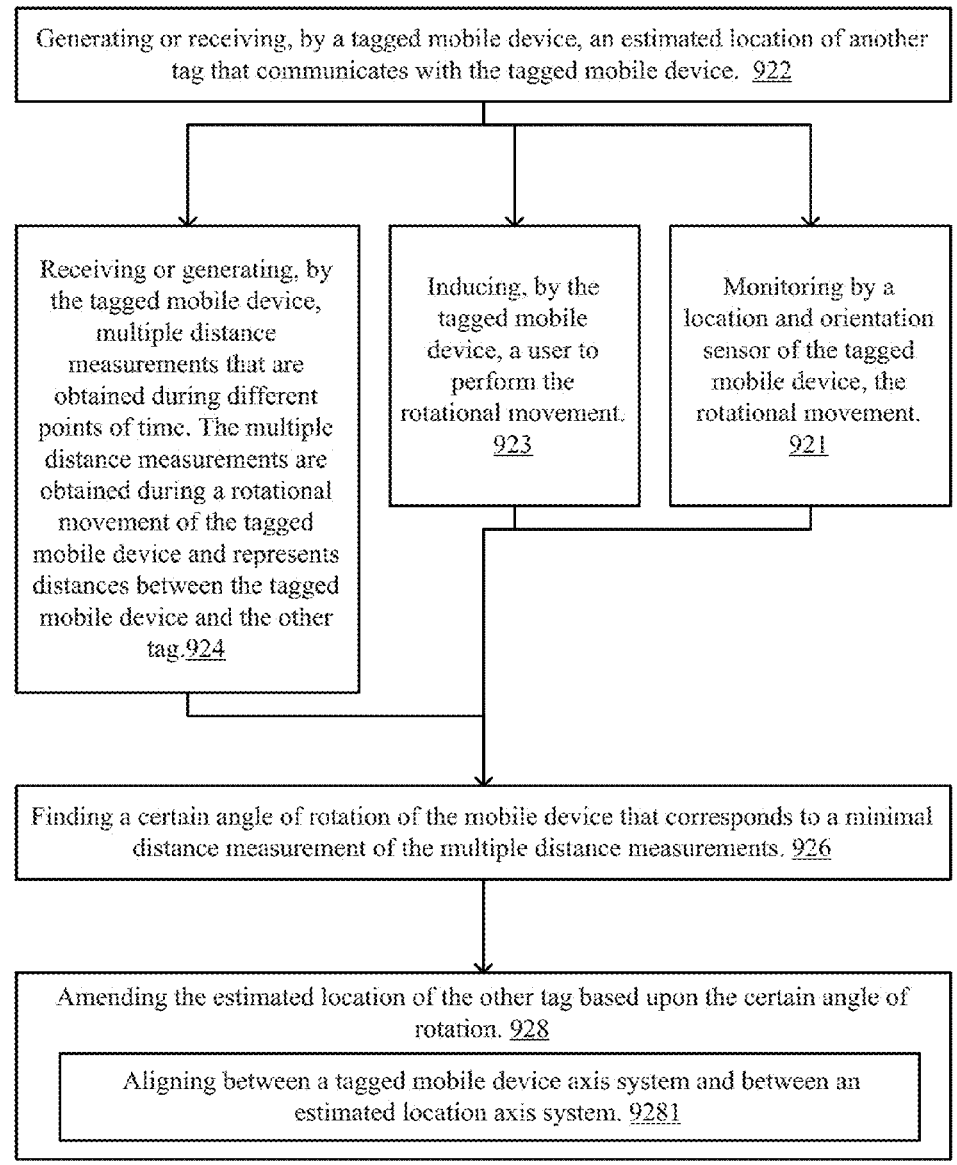
FIGS. 61-63 illustrate methods according to various embodiments of the invention.

FIG. 61 illustrates method 920 according to an embodiment of the invention.

Method 920 may start by step 922 of generating or receiving, by a tagged mobile device, an estimated location of another tag that communicates with the tagged mobile device. The estimated location can be received or generated in any manner, especially any manner illustrated in this specification.

Step 922 may be followed by step 924 of receiving or generating, by the tagged mobile device, multiple distance measurements that are obtained during different points of time. The multiple distance measurements are obtained during a rotational movement of the tagged mobile device and represent distances between the tagged mobile device and the other tag. An example of a rotational movement is illustrated in FIGS. 52-58.

Step 924 may be followed by step 926 of finding a certain angle of rotation of the mobile device that corresponds to a minimal distance measurement of the multiple distance measurements.

Step 926 may be followed by step 928 of amending the estimated location of the other tag based upon the certain angle of rotation.

Step 928 may include aligning (9281) between a tagged mobile device axis system and between an estimated location axis system.

Method 920 may include step 921 of monitoring by a location and orientation sensor of the tagged mobile device, the rotational movement.

Method 920 may include step 923 of inducing, by the tagged mobile device, a user to perform the rotational movement. This may include generating audio and/or visual requests to the user to rotate, may include providing feedback to the user—such as requesting the user to continue the rotation, to stop the rotation, to elevate or lower the tagged mobile device, to change the rate of the rotational movement, and the like.

Figure 62:
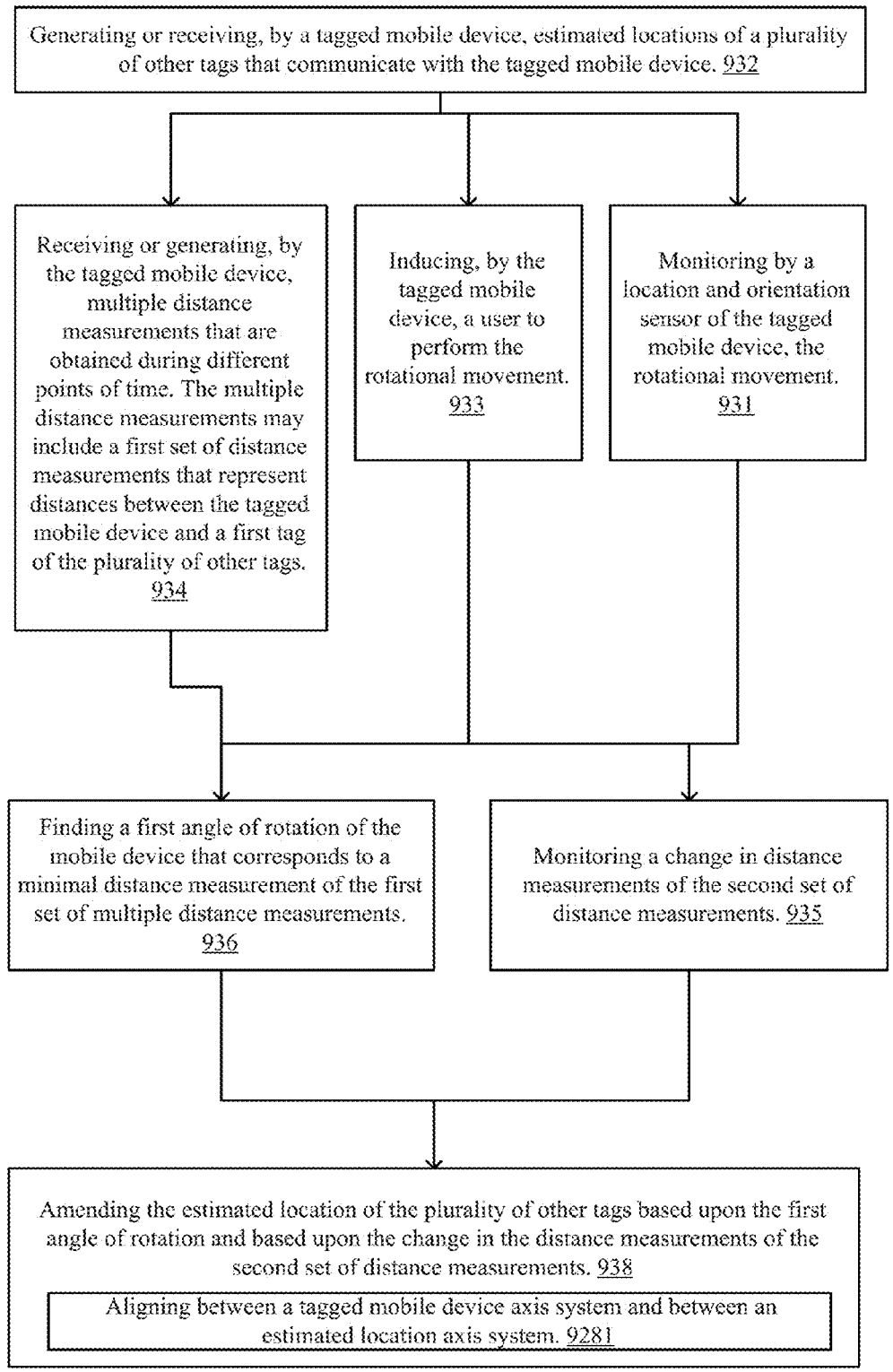

FIG. 62 illustrates method 930 according to an embodiment of the invention.

Method 930 may start by step 932 of generating or receiving, by a tagged mobile device, estimated locations of a plurality of other tags that communicate with the tagged mobile device. See, for example mesh 730 of FIG. 53 that represents the estimated locations of tags. Mesh 730 may not be aligned with the tagged user device axis system. The estimated location can be received or generated in any manner, especially any manner illustrated in this specification.

Step 932 may be followed by step 934 of receiving or generating, by the tagged mobile device, multiple distance measurements that are obtained during different points of time. An example of a rotational movement is illustrated in FIGS. 52-58.

The multiple distance measurements are obtained during a rotational movement of the tagged mobile device.

The multiple distance measurements may include a first set of distance measurements that represent distances between the tagged mobile device and a first tag of the plurality of other tags. For example, referring to the example set forth in FIG. 53, there may be up to five sets of distance measurements—corresponding to the distance between Tag4 714 and each one of Tag6 716, Tag1 711, Tag3 713, Tag5 715 Tag2 712.

Step 934 may be followed by step 936 of finding a first angle of rotation of the mobile device that corresponds to a minimal distance measurement of the first set of multiple distance measurements. See, for example, FIGS. 54-58.

Method 930 may also include step 935 of monitoring a change in distance measurements of the second set of distance measurements.

Steps 934 and 935 may be followed by step 838 of amending the estimated location of the plurality of other tags based upon the first angle of rotation and based upon the change in the distance measurements of the second set of distance measurements.

Step 934 may include stopping the rotation (or at least requesting the user to stop the rotation) after finding the first minimum distance.

Step 938 may include aligning (9381) between a tagged mobile device axis system and between an estimated location axis system.

Method 930 may include step 931 of monitoring by a location and orientation sensor of the tagged mobile device, the rotational movement. Non-limiting examples of such a sensor may include gyroscopes, accelerometers and the like.

Method 930 may include step 933 of inducing, by the tagged mobile device, a user to perform the rotational movement.

Figure 63:
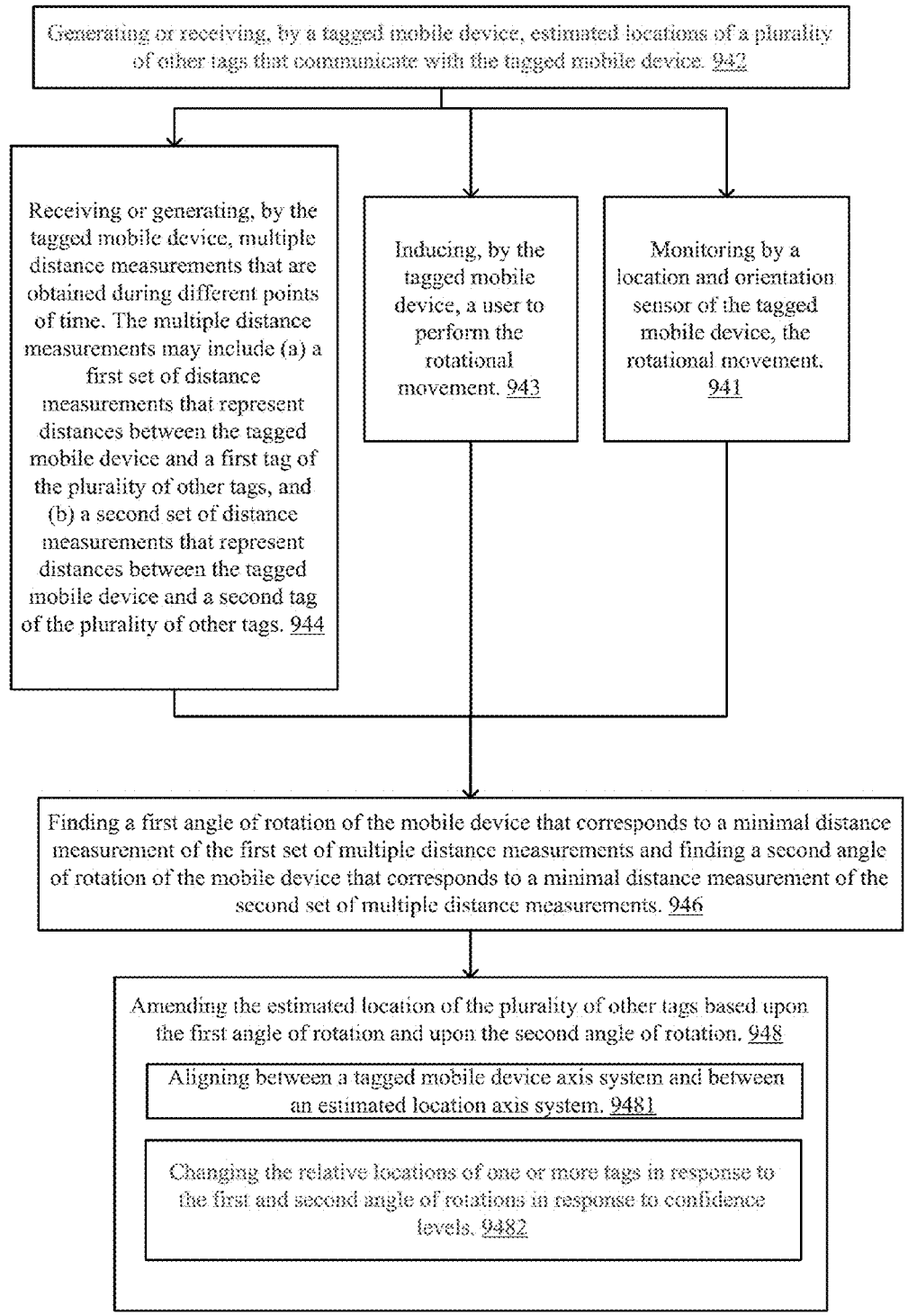

FIG. 63 illustrates method 940 according to an embodiment of the invention.

Method 940 may start by step 942 of generating or receiving, by a tagged mobile device, estimated locations of a plurality of other tags that communicate with the tagged mobile device. See, for example mesh 730 of FIG. 53 that represents the estimated locations of tags. Mesh 730 may not be aligned with the tagged user device axis system. The estimated location can be received or generated in any manner, especially any manner illustrated in this specification.

Step 942 may be followed by step 944 of receiving or generating, by the tagged mobile device, multiple distance measurements that are obtained during different points of time. An example of a rotational movement is illustrated in FIGS. 52-58.

The multiple distance measurements are obtained during a rotational movement of the tagged mobile device.

The multiple distance measurements may include a first set of distance measurements that represent distances between the tagged mobile device and a first tag of the plurality of other tags. The multiple distance measurements may include a second set of distance measurements that represent distances between the tagged mobile device and a second tag of the plurality of other tags.

For example, referring to the example set forth in FIG. 53, there may be up to five sets of distance measurements—corresponding to the distance between Tag4 714 and each one of Tag6 716, Tag1 711, Tag3 713, Tag5 715 and Tag2 712.

Step 944 may be followed by step 946 of finding a first angle of rotation of the mobile device that corresponds to a minimal distance measurement of the first set of multiple distance measurements and finding a second angle of rotation of the mobile device that corresponds to a minimal distance measurement of the second set of multiple distance measurements. See, for example, FIGS. 54-58.

Step 946 may be followed by step 948 of amending the estimated location of the plurality of other tags based upon the first angle of rotation and upon the second angle of rotation. The second angle of rotation may be used for solving ambiguities.

Step 948 may include aligning (9481) between a tagged mobile device axis system and between an estimated location axis system.

Step 948 may include changing (9482) the relative locations of one or more tags in response to the first and second angle of rotations in response to confidence levels. The changing of the location may include changing the angle between first and second tags that are associated with the first and second angle of rotation.

The change of the angle can be responsive to the certainty (confidence level) associated with the estimated locations and with the certainty (confidence level) associated with the finding of the first and second angles of rotation.

For example, the new (modified angle) may be a weighted sum (or any other function) of the expectation of the estimated angle and the expectation of the angular difference between the first and second angles of rotation.

The confidence level of the estimation locations can be set in response to the signal to noise ratio of one or more distance measurements, to the number of tags, to an accuracy of the tag location estimation, to the distances between the tags, and the like.

For example—more weight can be assigned to the measurements (first and second angle of rotation) when the signal to noise ratio at the first and second minimal distances (and optionally in proximity of up to 5-15 degrees from these angles) the signal to noise ration exceeds a predefined threshold (such as 5-20 db, and the like).

The confidence level assigned to the estimated locations can be higher when the tags are closer to each other.

The confidence level of the finding of the first and second angles of rotation may be responsive to the signal to noise ratio of the minimum distance measurements, or any other parameter.

If the confidence level of either one of (a) the estimated locations and (b) the finding of the first and second angles of rotation is not known—either a default confidence level can be assigned or the change of angle will be calculated while ignoring the confidence level. For example—the new angle can be an average between the estimated angle and the difference between the first and second angles of rotation.

If more than two angles of rotations are found that the new angles can be calculated in response to the more than two angles of rotation. One new angle can be calculated in response to another new angle. Various optimal or sub-optimal angular error algorithms may be applied.

For example—assuming that the estimated angle between two tags is 50 degrees. The first angle of rotation is 80 degrees and the second angle of rotation is 140 degrees. The angle between the first and second angles of rotation is 60 degrees.

If the confidence levels are not known (or are equal to each other) the new angle can be an average (50+60)/2=55 degrees.

Each angle may be amended by 55/2=27.5 degrees—getting a first angle of 82.5 degrees and a second angle of 137.5 degrees.

Figure 64:
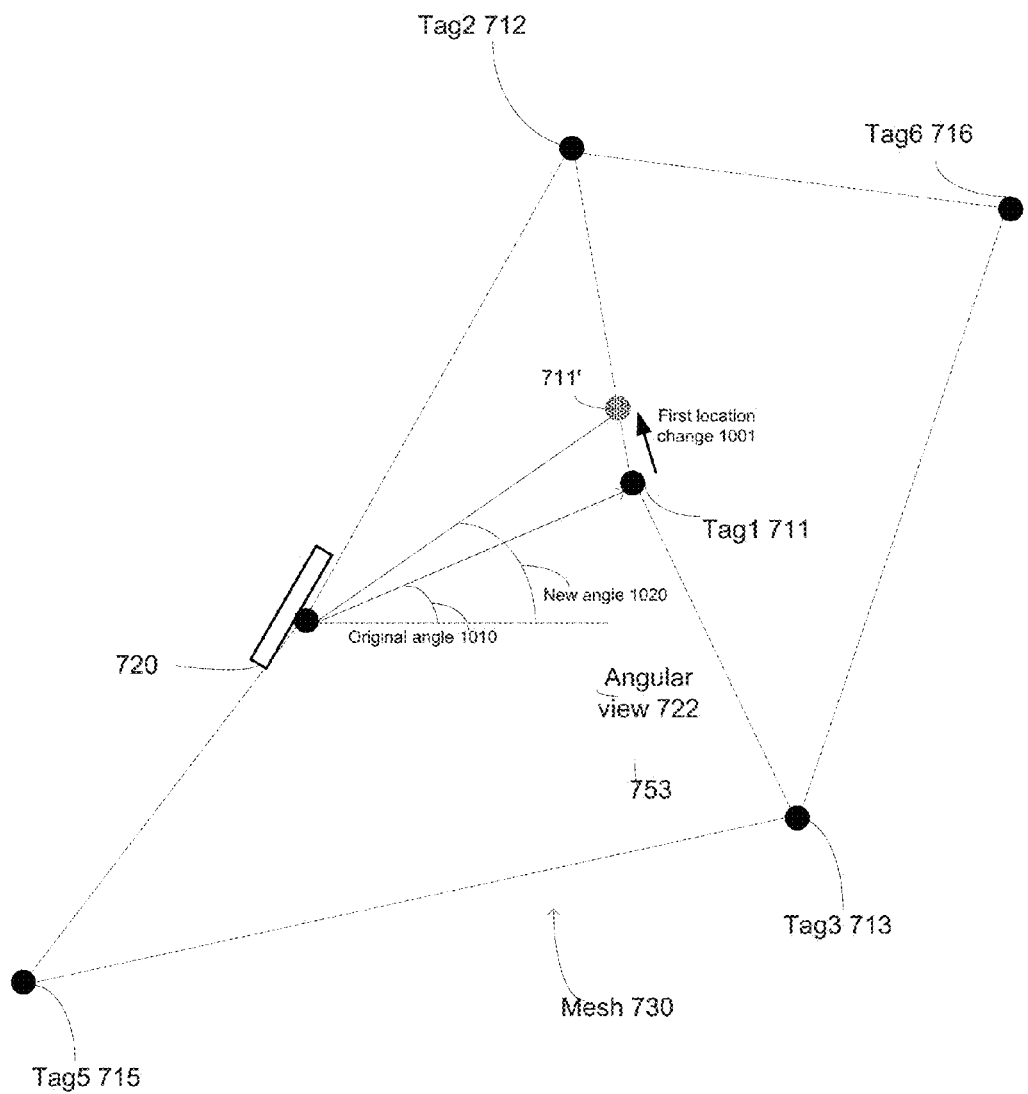
FIG. 64 illustrates an update of a location of a tag according to an embodiment of the invention.

FIG. 64 illustrates an update of a location of a tag according to an embodiment of the invention.

Tag1 711 that is located at a first angle 1010 is moved to another location (denoted 711') that is oriented at new angle 1020.

Method 940 may include step 941 of monitoring by a location and orientation sensor of the tagged mobile device, the rotational movement. Non-limiting examples of such a sensor may include gyroscopes, accelerometers and the like.

Method 940 may include step 945 of inducing, by the tagged mobile device, a user to perform the rotational movement.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD ROM, CD R, etc.) and digital video disk storage media; nonvolatile memory storage media including semiconductor-based memory units such as FLASH memory, EEPROM, EPROM, ROM; ferromagnetic digital memories; MRAM; volatile storage media including registers, memory units or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signal.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for determining a location of a wireless tag, the method comprising:
   generating or receiving, by a tagged mobile device, an estimated location of another tag that communicates with the tagged mobile device;
   receiving or generating, by the tagged mobile device, multiple distance measurements that are obtained during different points of time;
   wherein the multiple distance measurements are obtained during a rotational movement of the tagged mobile device and represent distances between the tagged mobile device and the other tag;
   finding a certain angle of rotation of the mobile device that corresponds to a minimal distance measurement of the multiple distance measurements; and
   amending the estimated location of the other tag based upon the certain angle of rotation.

2. The method according to claim 1 wherein the amending of the estimated location comprises aligning between a tagged mobile device axis system and between an estimated location axis system.

3. The method according to claim 1 wherein the amending of the estimated location comprises changing an estimated spatial relationship between estimated locations of two or more tags.

4. The method according to claim 1 comprising monitoring by a location and orientation sensor of the tagged mobile device, the rotational movement.

5. The method according to claim 1 comprising inducing, by the tagged mobile device, a user to perform the rotational movement.

6. The method according to claim 1 comprising displaying, by the tagged mobile device, an indication of the amended estimation location of the other wireless tag.

7. A method for determining a location of a wireless tag, the method comprising:
   generating or receiving, by a tagged mobile device, estimated locations of a plurality of other tags that communicate with the tagged mobile device;
   receiving or generating, by the tagged mobile device, multiple distance measurements that are obtained during different points of time;
   wherein the multiple distance measurements are obtained during a rotational movement of the tagged mobile device; wherein the multiple distance measurements comprise a first set of distance measurements that represent distances between the tagged mobile device and a first tag of the plurality of other tags;
   finding, a first angle of rotation of the mobile device that corresponds to a minimal distance measurement of the first set of multiple distance measurements; and
   amending the estimated location of the plurality of other tags based upon the first angle of rotation.

8. The method according to claim 7 wherein the multiple distance measurements comprise a second set of distance measurements that represent distances between the tagged mobile device and a second tag of the plurality of other tags.

9. The method according to claim 8 further comprising finding, a second angle of rotation of the mobile device that corresponds to a minimal distance measurement of the second set of multiple distance measurements; and wherein the amending of the estimated location of the plurality of other tags is also based upon the second angle of rotation.

10. The method according to claim 8 further comprising monitoring a change in distance measurements of the second set of distance measurements; and wherein the amending of the estimated location of the plurality of other tags is also based upon the change in the distance measurements of the second set of distance measurements.

11. The method according to claim 10 wherein the rotational movement does not include aligning the tagged mobile device with the second tag.

12. The method according to claim 10 wherein the monitoring of the change in distance measurements of the second set of distance measurements comprises comparing a distance measurement obtained at the first angle of rotation to another distance measurement.

13. The method according to claim 8 wherein the amending of the estimated location comprises changing an estimated spatial relationship between estimated locations of the first tag and the second tag.

14. The method according to claim 13 wherein the amending is responsive to a confidence level of the estimated locations of the first and second tags and with a confidence level of the first and second sets of distance measurements.

15. The method according to claim 14 comprising calculating the confidence level of the first and second sets of distance measurements in response to signal to noise ratio of the first and second sets of distance measurements.

16. The method according to claim 14 comprising calculating the confidence level of the first and second sets of distance measurements in response to a smoothness of the first and second sets of distance measurements.

17. The method according to claim 14 comprising calculating confidence level of a subset of the first set of distance measurements and a subset of the second set of distance measurements, wherein each subset comprises a minimal distance measurement.

18. The method according to claim 8 wherein the amending of the estimated location comprises aligning between a tagged mobile device axis system and between an estimated location axis system.

19. The method according to claim 8 comprising monitoring by a location and orientation sensor of the tagged mobile device, the rotational movement.

20. The method according to claim 7 comprising displaying, by the tagged mobile device, an indication of amended estimated locations of the first tag and the second tag.

21. A non-transitory computer readable medium that stores instructions that when executed by a computer cause the computer to execute the stages of: generating or receiving, by a tagged mobile device, an estimated location of another tag that communicates with the tagged mobile device;
   receiving or generating, by the tagged mobile device, multiple distance measurements that are obtained during different points of time;
   wherein the multiple distance measurements are obtained during a rotational movement of the tagged mobile device and represent distances between the tagged mobile device and the other tag;
   finding a certain angle of rotation of the mobile device that corresponds to a minimal distance measurement of the multiple distance measurements; and
   amending the estimated location of the other tag based upon the certain angle of rotation.

22. A tagged mobile device that comprises a wireless tag, a processor, and a display; wherein the tagged mobile device is configured to generate or receive, (a) an estimated location of another tag that communicates with the tagged mobile device, and (b) multiple distance measurements that are obtained during different points of time; wherein the multiple distance measurements are obtained during a rotational movement of the tagged mobile device and represent distances between the tagged mobile device and the other tag; wherein the processor is configured to find a certain angle of rotation of the mobile device that corresponds to a minimal distance measurement of the multiple distance measurements and to amend the estimated location of the other tag based upon the certain angle of rotation to provide an amended estimated location; wherein the display is responsive to display an indication of the amended estimation location of the other wireless tag.

* * * * *